United States Patent [19]

Davis et al.

[11] Patent Number: 5,935,190
[45] Date of Patent: *Aug. 10, 1999

[54] TRAFFIC MONITORING SYSTEM

[75] Inventors: Clint A. Davis, Bellaire; Gary L. Mee, Houston, both of Tex.

[73] Assignee: American Traffic Systems, Inc., Scottsdale, Ariz.

[ * ] Notice: This patent issued on a continued prosecution application filed under 37 CFR 1.53(d), and is subject to the twenty year patent term provisions of 35 U.S.C. 154(a)(2).

[21] Appl. No.: 08/967,245

[22] Filed: Nov. 5, 1997

Related U.S. Application Data

[63] Continuation of application No. 08/685,785, Jul. 24, 1996, abandoned, which is a continuation of application No. 08/252,587, Jun. 1, 1994, abandoned.

[51] Int. Cl.[6] .................................................. G06F 19/00
[52] U.S. Cl. ........................ 701/119; 340/936; 340/937; 342/66; 342/104; 346/33 D; 702/142; 702/143
[58] Field of Search ..................................... 340/936, 937; 342/66, 104; 346/33 D; 364/438, 565, 571.01; 701/119; 702/85, 96, 142, 143

[56] References Cited

U.S. PATENT DOCUMENTS

| | | | |
|---|---|---|---|
| 3,088,388 | 5/1963 | Tredopp | 95/31 |
| 3,122,740 | 2/1964 | Kruse et al. | 343/8 |
| 3,148,015 | 9/1964 | Weaver | 346/107 |
| 3,165,373 | 1/1965 | Scott | 346/107 |
| 3,195,126 | 7/1965 | Barker | 343/7 |
| 3,206,748 | 9/1965 | Miller | 342/104 X |

(List continued on next page.)

FOREIGN PATENT DOCUMENTS

| | | |
|---|---|---|
| 067905A1 | 12/1982 | European Pat. Off. . |
| 0188694A2 | 7/1986 | European Pat. Off. . |
| 0513628A2 | 11/1992 | European Pat. Off. . |
| 2549263 | 1/1985 | France . |
| 2549625 | 1/1985 | France . |
| 1078797 | 3/1960 | Germany . |

(List continued on next page.)

OTHER PUBLICATIONS

Michael Lamm, "Smile! You Just Got A Ticket," Popular Mechanics Dec., 1969, pp. 73–76.
Philips Intersection Controller Type 86 AD/82, Philips Telecommunication Review, vol. 33, No. 1, Mar. 1975.
John Gosch, "Europe Gets 'Thinking' Traffic Lights," Electronics, May 1, 1975, pp. 70–71.

(List continued on next page.)

Primary Examiner—Edward R. Cosimano
Attorney, Agent, or Firm—Tobor, Goldstein & Healey, L.L.P.

[57] ABSTRACT

A traffic monitoring system has a common housing for a Doppler radar transceiver, a video camera, and a digital computer for processing the Doppler signal. The system also includes a video cassette recorder, a high-speed photographic camera, and a laptop computer for downloading control settings and a program from a diskette or memory card to the digital computer. The digital computer performs an initial self-test by injecting a calibration signal in lieu of a Doppler signal into an electronic interface between the radar transceiver and the digital computer. The radar transceiver generates a Doppler signal having two channels, and the phase between the channels indicates whether a vehicle is approaching or receding from the radar transceiver. The two channels are recorded on the left and right audio channels of the video cassette. Recorded with the video signal is a push-down stack of speeds of vehicles detected on the system, in order to present a record of prevailing traffic conditions when prosecuting a speed violator. The recorded picture may also include a series of successive speed measurements for each vehicle. Although an operator could listen to the Doppler signal, it is preferred that the digital computer activates an audio annunciator to emit a click sound when the system detects a vehicle, and a warbly sound when a detected vehicle exceeds a specified speed limit.

19 Claims, 22 Drawing Sheets

U.S. PATENT DOCUMENTS

| | | | |
|---|---|---|---|
| 3,243,806 | 3/1966 | Handschin | 343/8 |
| 3,382,785 | 5/1968 | Melhart | 95/53 |
| 3,438,031 | 4/1969 | Fathauer | 343/8 |
| 3,522,611 | 8/1970 | Maronde | 346/107 |
| 3,554,102 | 1/1971 | Maronde | 95/1.1 |
| 3,579,236 | 5/1971 | Piechocki | 343/8 |
| 3,581,647 | 6/1971 | Maronde | 95/53 E |
| 3,603,227 | 9/1971 | Maronde et al. | 95/1.1 |
| 3,618,084 | 11/1971 | Balsiger | 343/7 A |
| 3,626,413 | 12/1971 | Zachmann | 343/8 |
| 3,680,043 | 7/1972 | Angeloni | 340/33 |
| 3,689,921 | 9/1972 | Berry | 342/115 |
| 3,754,253 | 8/1973 | Balsiger | 343/7 ED |
| 3,816,841 | 6/1974 | Maronde et al. | 95/10 CD |
| 3,849,784 | 11/1974 | Holzapfel | 346/107 VP |
| 3,858,223 | 12/1974 | Holzapfel | 346/107 VP |
| 3,866,165 | 2/1975 | Maronde et al. | 340/31 C |
| 3,930,735 | 1/1976 | Kerr | 356/167 |
| 4,051,499 | 9/1977 | Kondo | 354/234 |
| 4,053,909 | 10/1977 | Shinoda et al. | 354/105 |
| 4,173,010 | 10/1979 | Hoffmann | 340/31 C |
| 4,192,595 | 3/1980 | Wakazono et al. | 354/133 |
| 4,229,726 | 10/1980 | Deaton et al. | 340/38 R |
| 4,236,140 | 11/1980 | Aker et al. | 343/8 |
| 4,258,430 | 3/1981 | Tyburski | 364/DIG. 2 |
| 4,335,383 | 6/1982 | Berry | 343/8 |
| 4,344,685 | 8/1982 | Milatz et al. | 354/173 |
| 4,386,862 | 6/1983 | Kittel et al. | 400/144.2 |
| 4,408,857 | 10/1983 | Frank | 354/234 |
| 4,444,479 | 4/1984 | Johnson et al. | 354/413 |
| 4,479,704 | 10/1984 | Masunaga | 354/137 |
| 4,500,868 | 2/1985 | Tokitsu et al. | 340/52 F |
| 4,527,894 | 7/1985 | Goede et al. | 356/28 |
| 4,591,823 | 5/1986 | Horvat | 340/53 |
| 4,634,254 | 1/1987 | Ogihara et al. | 354/403 |
| 4,664,494 | 5/1987 | Hughes et al. | 354/234.1 |
| 4,717,915 | 1/1988 | Goede | 342/66 |
| 4,761,666 | 8/1988 | Goto | 354/133 |
| 4,789,904 | 12/1988 | Peterson | 358/310 |
| 4,796,109 | 1/1989 | Sordello et al. | 360/45 |
| 4,799,112 | 1/1989 | Bremmer et al. | 360/31 |
| 4,809,030 | 2/1989 | Takagi et al. | 354/414 |
| 4,866,438 | 9/1989 | Knisch | 340/936 |
| 4,884,072 | 11/1989 | Horsch | 340/937 |
| 4,887,080 | 12/1989 | Gross | 340/937 |
| 4,890,129 | 12/1989 | Mody | 354/234.1 |
| 4,922,339 | 5/1990 | Stout et al. | 358/108 |
| 4,942,415 | 7/1990 | Felle et al. | 354/234.1 |
| 4,949,186 | 8/1990 | Peterson | 358/335 |
| 4,984,003 | 1/1991 | Matsumoto et al. | 354/235.1 |
| 4,988,994 | 1/1991 | Loeven | 340/936 |
| 5,005,042 | 4/1991 | Sato et al. | 354/412 |
| 5,041,828 | 8/1991 | Loeven | 340/937 |
| 5,082,365 | 1/1992 | Kuzmick et al. | 356/28 |
| 5,177,691 | 1/1993 | Welles et al. | 364/576 X |
| 5,221,956 | 6/1993 | Patterson et al. | 356/28 |
| 5,239,296 | 8/1993 | Jenkins | 340/936 |
| 5,239,336 | 8/1993 | Matsui et al. | 354/416 |
| 5,250,946 | 10/1993 | Stanzcyk | 340/936 |
| 5,257,056 | 10/1993 | Kazumi | 354/234.1 |
| 5,291,237 | 3/1994 | Tagami et al. | 354/413 |

FOREIGN PATENT DOCUMENTS

| | | |
|---|---|---|
| 1172066 | 6/1964 | Germany . |
| 1597378 | 4/1970 | Germany . |
| 1574126 | 10/1971 | Germany . |
| 2211462B2 | 3/1973 | Germany . |
| 2365331 | 8/1974 | Germany . |
| 2356909 | 5/1975 | Germany . |
| 2802448C2 | 7/1979 | Germany . |
| 2817846A1 | 10/1979 | Germany . |
| 3034161A1 | 4/1982 | Germany . |
| 3220434A1 | 12/1983 | Germany . |
| 3306040A1 | 8/1984 | Germany . |
| 3422764A1 | 1/1986 | Germany . |
| 3535588A1 | 4/1987 | Germany . |
| 4214595A1 | 11/1993 | Germany . |
| 49-13730 | 6/1974 | Japan . |
| 414210 | 12/1966 | Sweden . |
| 470674 | 5/1969 | Switzerland . |
| 945693 | 1/1964 | United Kingdom . |
| 1480981 | 7/1977 | United Kingdom . |
| 1494945 | 12/1977 | United Kingdom . |
| WO96/01615 | 3/1986 | WIPO . |

OTHER PUBLICATIONS

"Orbis III—A New Concept in Traffic Surveillance," LTV Aerospace Corporation, Dallas, Texas 1975.

"Mobile Orbis III Speed Enforcement Demonstration Project in Arlington, Texas," Final Report, vol. I—Program Evaluation, National Highway Traffic Safety Administration, Department of Transportation, Contract No. DOT–HS–346–3–692, Jun. 30 1976.

John Hewer, "High Technology Instrument Foils Hasty,"— *Canadian Electronics Engineering,* Aug. 1979, pp. 28–31.

"Multafot—Fully Automatic Red Light Surveillance System," Zellweger Uster Ltd., Uster, Switzerland, 1979.

Glanz et al., "Technology for use in 'Automated' Speed Enforcement," DOT HS–805 545, Midwest Research Institute, Kansas City, Missouri, Interim Report, Jun. 1980.

Werner Kullik, Traffipax–Microspeed–Ein neues, supermodernes Radargerät für die Geschwindigkeitsüberwachung—(Traffixpax–Microspeed—a new highly modern radar apparatus for speed monitoring), Polizei, Verker und Technik: Fachzeitschrift für Verkehrs–und Polizeitechnik, Jan. 1982, pp. 49–53.

"Philosophy of application and benefit of the radar speed meters manufactured by Zellweger Uster Ltd.," Zellweger Uster, Ltd., Uster, Switzerland (Apr. 1983).

Blackburn et al., "Pilot Tests of Automated Speed Enforcement Devices and Procedures," DOT HS–806 573, Midwest Research Institute, Kansas City, Missouri, Final Report, Feb. 1984.

"Zellweger Uster Traffic Electronics Multanova®—Radar 6F Photo–exposure type–radar equipment with integrated allocation of measured value," Brochure No. E/10.85/2500, Zellweger Uster Ltd., Uster, Switzerland, 1984.

Dr. Ulrich Löhle, "Genauigkeit polizeilicher Verkehrsüberwachungs–methoden (Accuracy of traffic monitoring methods by the police)," Deutsches Autorecht: Rechtszeitschrift des Allgemeinen Deutschen Automobil Clubs, Dec. 1984, pp. 394–409.

Claus–H. Lührs, "Geschwindigkeitmessung im Strassenverkehr," Forschungsbericht MA–3, Vorträge des 65. PTB–Seminars, Braunschweig, Feb., 1986. (Talks given during the 65th PTB seminar on traffic speed measurements, edited by Claus–H. Lyhrs, Federal Institute for the Standardization of Physical Measures).

Dickerson, "Speeders Will Get Photo Finish," The Friendswood Weekend Journal, May 30, 1986.

"New Device to Trap Speeders," Dun's Business Month, Jun. 1986.

"LM Man Sells Photo–Radar," The LaMarque Times, Jul. 9, 1986.

"La Marque Utilizing Photographic Radar to Catch Speeders," Houston Chronicle, No star edition, Section 1, p. 25, Oct. 24, 1986.

Mark Toohey, "Pioneering Photo Radar/Area Police Try New Technology to Nab Speeders," Houston Chronicle, 2 Star Edition, Business Section, p. 2, Nov. 16, 1986.

"Traffixpax—Radar Measurement in Moving Traffic—Traffipax unit type VM with digital tachometer and micro speed 09," Traffixpax–Vertrieb, Düsseldorf, Germany, Sep. 1987.

"Traffic Electronics—Multafot–Front—Fully–automatic red Light Surveillance System with Frontal Photographs," Zellweger Uster AG, Uster, Switzerland, 1987.

"Truvelo M4$^2$ Speed Measuring Device,"Brochure, Apr. 15, 1988.

"Truvelo Traffic Law Enforcement Camera System," Brochure, Apr. 16, 1988.

Pigman et al., "Evaluation of Unmanned Radar Intallations," 14th International Forum on Traffic Records Systems, Jul. 1988.

Freedman, et al., "Public Opinion Regarding Photo Radar," *Insurance Institute for Highway Safety*, Arlington, VA 1989.

"Film analyzing simplified—Multascope," Multanova Brochure No. 007 2/492/500, Zellweger Uster Ltd., Uster, Switzerland, 1989.

"Multascope," Multanova AG Brochure No. 23 5a 007–2112.89/1500, Zellweger Uster Ltd., Uster, Switzerland, 1989.

"Multacard System—Your 6F–radar measurements at a glance," Multanova AG Brochure No. 23 50 006–2/9 89/2000, Zellweger Uster Ltd., Uster, Switzerland, 1989.

"Multanova® Fully Automatic Radar Equipment 6FA," Multanova AG Brochure No. 23 50 009/11 91/1000, Zellweger Uster Ltd., Uster, Switzerland, 1989.

"Traffipax—Traffiphot—The Photographic Red–Light Monitor," Le Marquis Audio International, Inc., Garden City, New York, Mar. 1989.

"Data Recording Magazine with the DE–32 Module for Data Recording DM–100/200," Victor Hasselblad Inc., Fairfiled, N.J., Sep., 1989.

Blackburn et al., "Update of Enforcement Technology and Speed Measurement Devices," DOT HS 807584 Final Report, National Highway Traffic Safety Administration, U.S. Department of Transportation, Dec., 1989.

"PhotoCop™ Accident Reduction Program," Brochure, Traffic Monitoring Technologies, Friendswood, Texas 1990.

"PhotoCop™ Speed Control Accident Reduction Program," Brochure, Traffic Monitoring Technologies, Friendswood, Texas 1990.

"Photoradar—Automated Speed Enforcement," U.S. Public Technologies, Inc., Los Angeles, CA 1990.

"Traffipax Memory Card System," Traffipax–Vertrieb, Düsseldorf, Germany, Sep. 1990.

"Traffiscan—The Video System for Efficient Exploitation of Films" Traffipax–Vertrieb, Düsseldorf, Germany, Sep. 1990.

"Click! GTEL SPIE System Gives You the Numbers You Need," Brochure, GTEL Corporation, Wilmington, Delaware, 1991.

"Multistat—Stationary speed measuring system," Multanova AG, Uster, Switzerland, 1991.

"Traffipax Speedophot—Traffic Radar Unit with Automatic Recording," Traffipax–Vertrieb, Düsseldorf, Germany, Mar. 1991.

"Multanova—Moving Radar MR–6F," Multanova AG, Uster, Switzerland, Apr. 1991.

"PhotoCop® Speed Control Accident Reduction Program," prepared by Traffic Monitoring Technologies for West Valley City, Utah, Photo–Radar Review Committee, Apr. 1991.

"Traffipax—The Company," Traffipax–Vertrieb GMBH, Düsseldorf, Germany, Jul. 19, 1991.

Insurance Institute for Highway Safety Status Report, vol. 26, No. 8, Insurance Institute for Highway Safety, Arlington, Virginia, Sep. 14, 1991.

"Traffipax—Traffiphot–S, Stationary Speed Measuring Unit with Automatic Photo Recording" Traffipax–Vertrieb GMBH, Düsseldorf, Germany, Nov. 11, 1991.

"Multascope—Film analysing simplified," Multanova AG, Uster, Switzerland, 1992.

"Multagraph VT11—Traffic Monitoring with Video," Multanova AG, Uster, Switzerland, 1992.

Community Accident Reduction Effort Photo–Radar West Valley Police Brochure, West Valley City, Utah, 1992.

"Traffipax Traffic Surveillance Systems," Traffipax–Vertrieb, Brochure No. PMP 4.621, Dusseldorf, Germany Apr. 1992.

"Multanova 6FA Automatic–Radar installed on the motorway BAB9 'Nürnberg—München'" Multanova AG, Uster, Switzerland, Apr. 8, 1992.

"Multanova Speed measurement and red light control together in one unit," Multanova AG, Uster, Switzerland, Apr. 8, 1992.

"Automated Crash Reduction Systems—Overview—Services and Products," American Traffic Systems, Scottsdale, Arizona Nov. 1992.

"New Zealand Police Request for Tender 92/93/405 Vehicle Surveillance Equipment and Systems," American Traffic Systems, Scottsdale, Arizona (Jun. 17, 1993).

"Auto Patrol System," American Traffic Systems, Scottsdale, Arizona, submitted to Oxnard Police Department, Oxnard, California on Dec. 28, 1993.

"New Zealand Police Request for Tender 93/94/188 Static Vehicle Surveillance Equipment," American Traffic Systems, Scottsdale, Arizona (Feb. 4, 1994).

"Gatso Radar, Type 24," Gatsometer B.V., Overveen, Netherlands.

"Golden River Speed Enforcement System," Golden River Traffic Limited, Oxfordshire, England.

"Multacard System," Zellweger Uster Ltd., Uster, Switzerland.

"Multanova® Fully Automatic Radar Equipment 6FA," Zellweger Uster Ltd., Uster, Switzerland.

"Multanova® Road Safety System," Zellweger Uster Ltd., Uster, Switzerland.

"Photo–Radar Automated Crash Reduction System," American Traffic Systems, Scottsdale, Arizona.

The PhotoCop Photo–Radar System, Traffic Monitoring Technologies, Friendswood, Texas 77546.

"Photo–Cop Photo–Radar Instruction Manual," Traffic Monitoring Technologies, Friendswood, Texas 77546.

"Traffipax—Traffiphot—The Photographic Red–Light Monitor," Le Marquis Audio International, Inc., Garden City, New York.

"Traffipax—Traffic Radar Unit—Le Marquis–Micro Speed," Le Marquis Audio International, Inc., Garden City, New York.

"Vehicle Speed Radar," AWA Defence Industries Pty. Ltd., Adelaide, South Australia.

"Radar Control RC 110," Trafikanalys AB, Gävle, Sweden. (Brochure with radar unit on cover).

"Radar Control RC 110," Trafikanalys AB, Gävle, Sweden. (Brochure with roadway on cover).

"Automatic Radar Control ARC 110, "Trafikanalys AB, Gävle, Sweden.

"Autopatrol™ Photo–Radar Speed Enforcement," Brochure, American Traffic Systems, Scottsdale, Arizona.

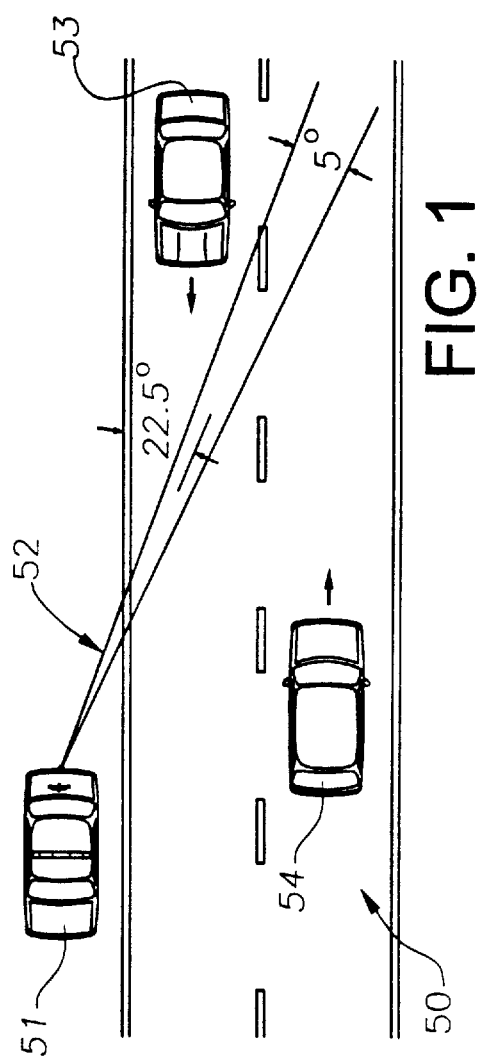
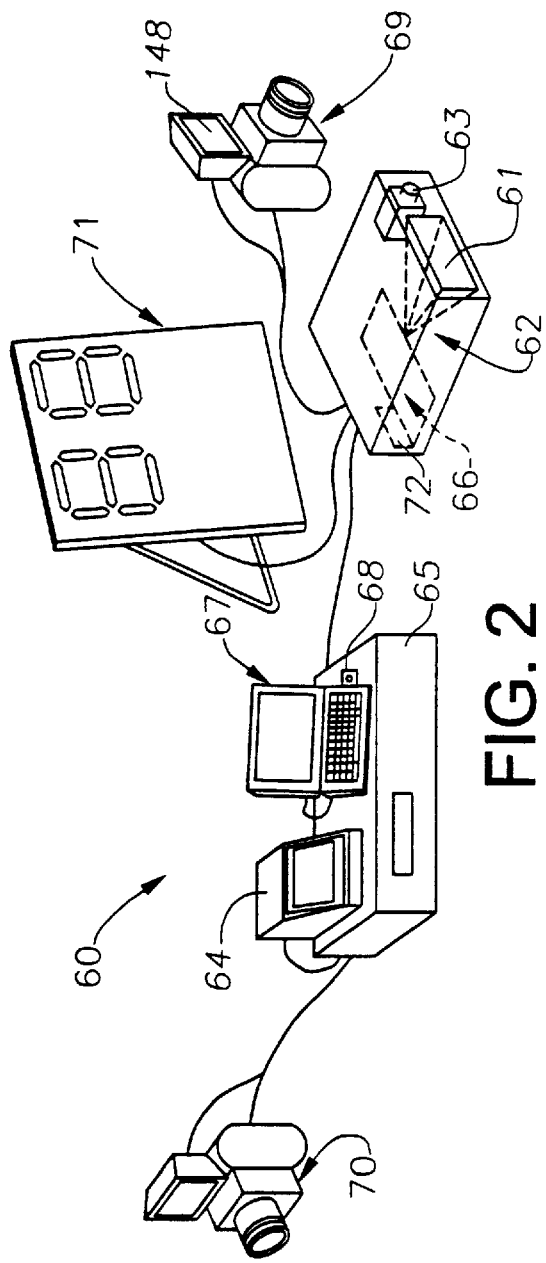

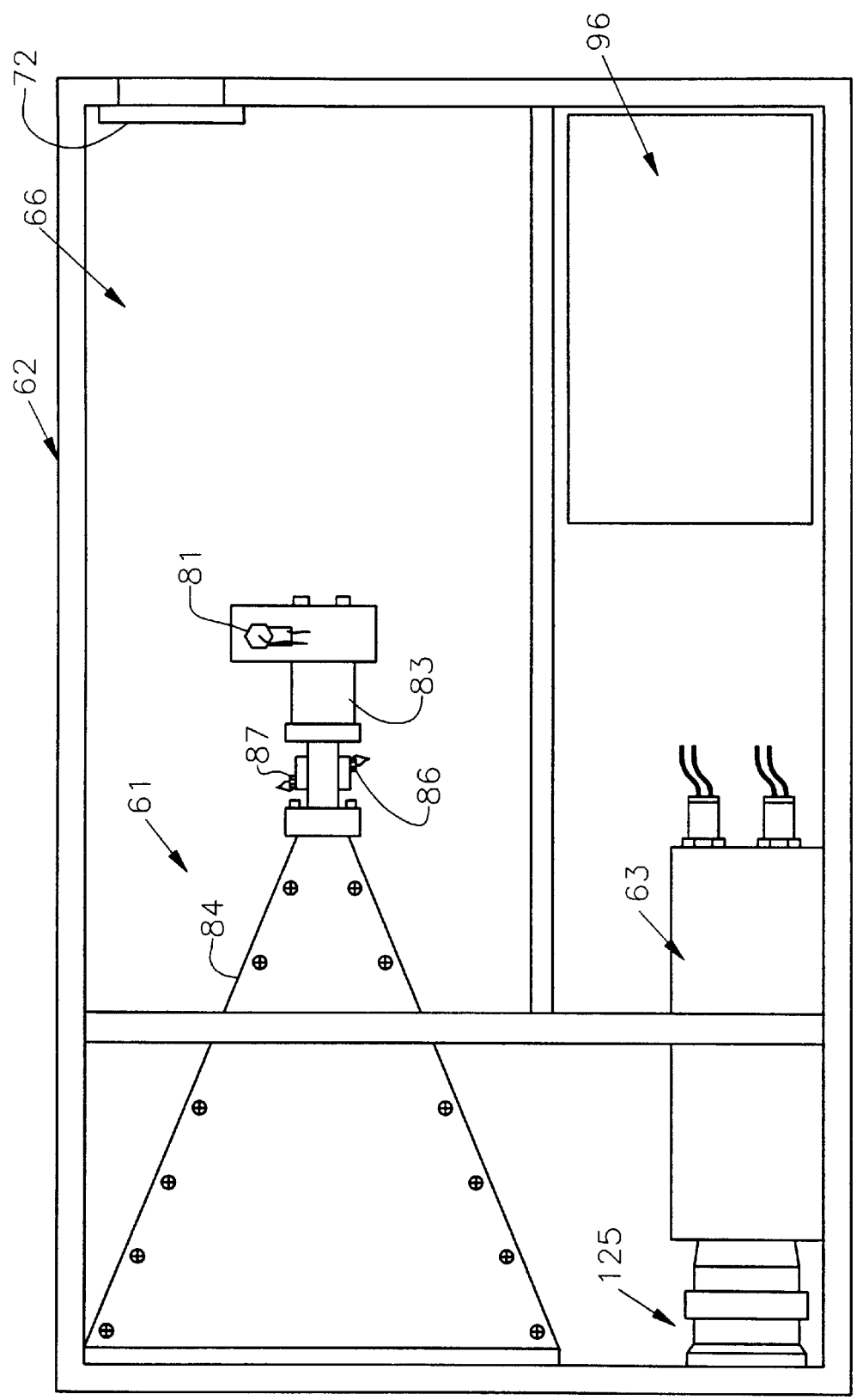

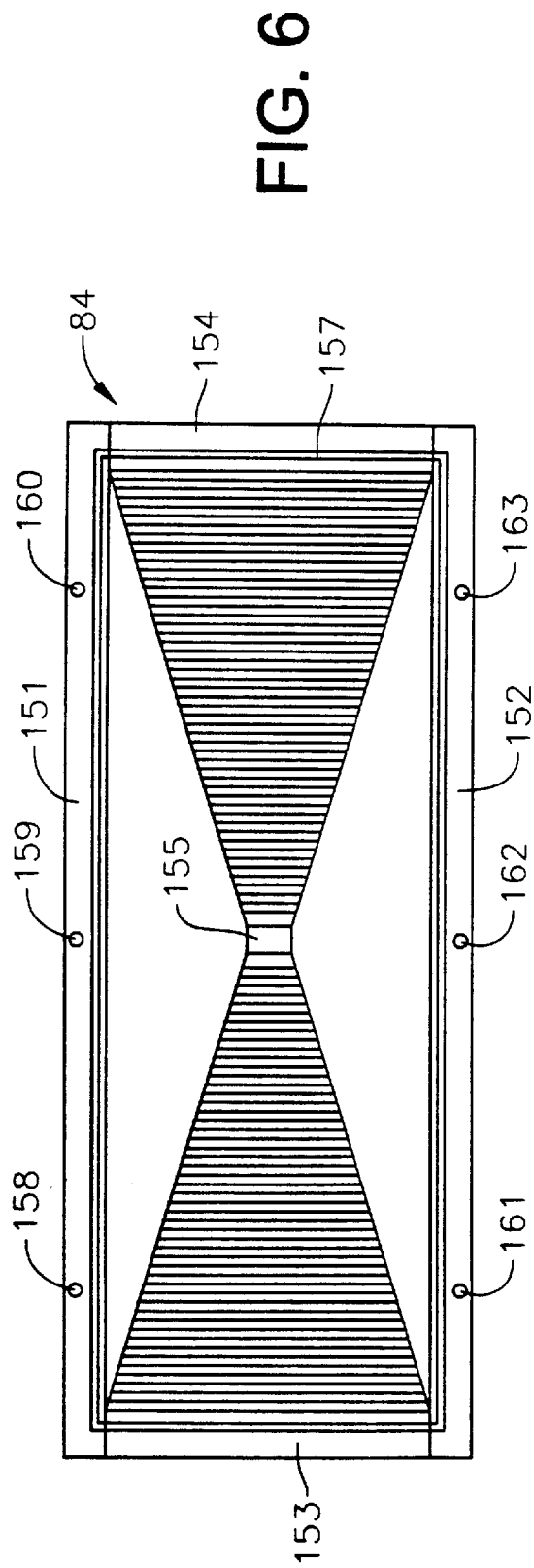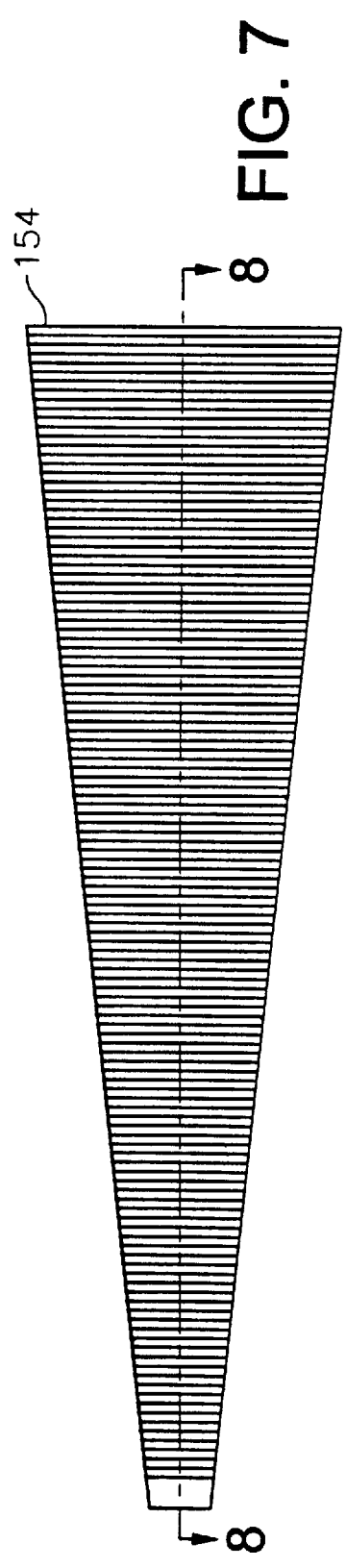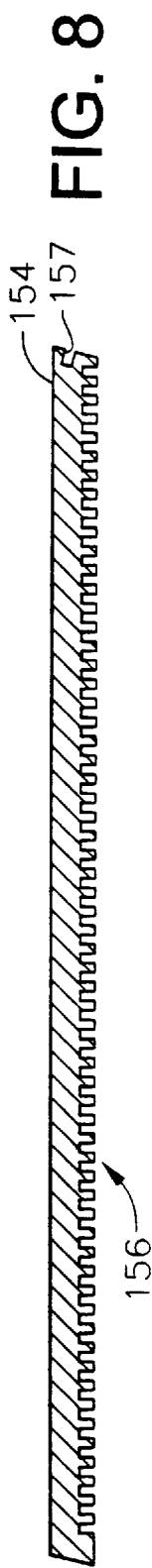

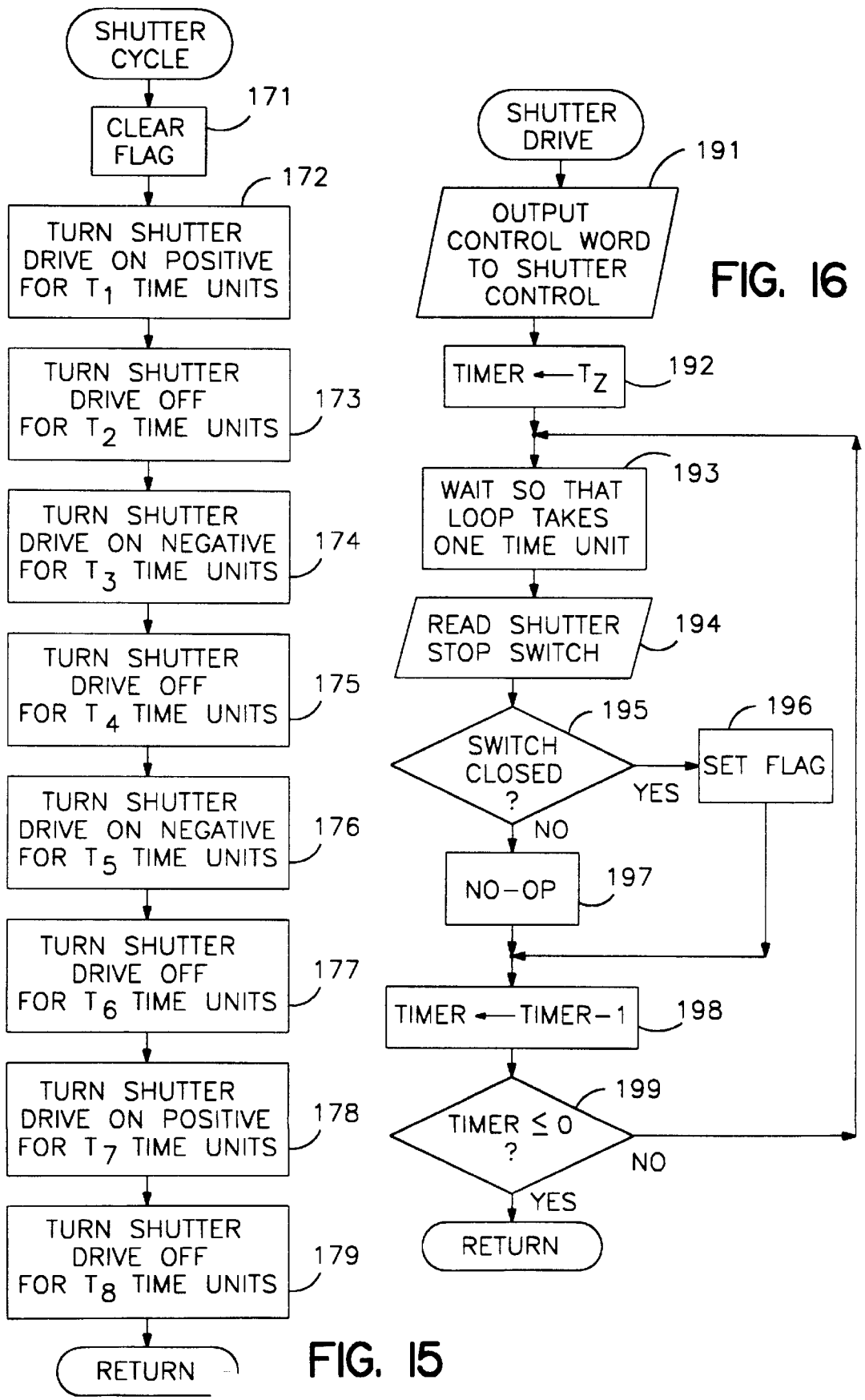

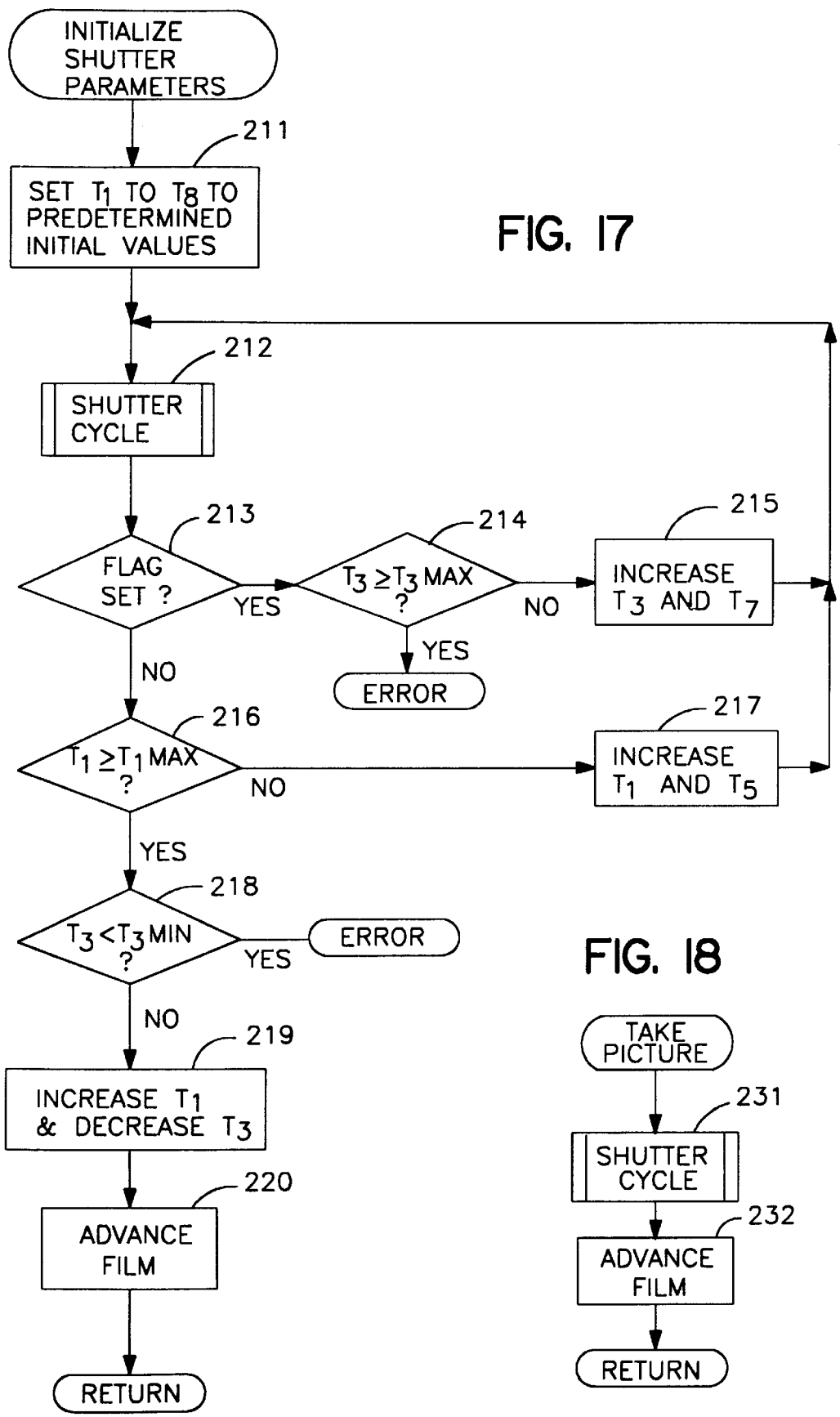

TRAFFIC MONITORING SYSTEM

This application is a continuation of application Ser. No. 08/685,785 filed Jul. 24, 1996 now abandoned which is a continuation of application Ser. No. 08/252,587 filed Jun. 1, 1994 now abandoned.

RELATED APPLICATIONS

The present application includes a disclosure common to the following commonly-assigned applications having the same filing date as the present application: Clint A. Davis and Gary L. Mee, "Doppler Shift Radar Transceiver for Traffic Monitoring System", Ser. No. 08/252,182; Clint A. Davis and Gary L. Mee, "Frequency-Domain Processing of Doppler Signals in a Traffic Monitoring System", Ser. No. 08/730,736 which is continuation of Ser. No. 08/252,331 now abandoned; Clint A. Davis and Gary L. Mee, "High-Speed Camera for Traffic Monitoring System", Ser. No. 08/252,575 no abandoned; and Clint A. Davis and Gary L. Mee, "Annotation of Photographic Film with Alphanumeric Data by Using Fiber Optics", Ser. No. 08/693,509 non abandoned, which is continuation of Ser. No. 08/251,977 now abandoned.

BACKGROUND OF THE INVENTION

1. Field of the Invention

The present invention relates generally to traffic monitoring, and more particularly to recording information about moving vehicles. Specifically, the present invention relates to a traffic monitoring system that automatically measures the speeds of vehicles, photographs vehicles that exceed a specified speed limit, and records prevailing traffic conditions onto video tape.

2. Description of the Background Art

Automatic traffic monitoring systems have been operated in the United States since about 1986. Automatic traffic monitoring systems are used for detecting speed violations, red-light violations, and drunk-driving (DUI) violations. The systems reduce traffic accidents, and generate "fine" revenue that pays for the cost of installing and maintaining the systems.

For detecting and recording speed violations, an automatic traffic monitoring system includes a Doppler-shift radar transceiver and a high-speed camera triggered by the radar transceiver. The high-speed camera takes a picture of the front of the approaching vehicle, and a second camera may be used to take a picture of the rear of the vehicle after the vehicle passes the location of the traffic monitoring system. An alphanumeric data block containing the measured vehicle speed, date, time, and location is also recorded on a portion or edge of the photograph. A video camera may be used to record a motion picture of the traffic, and the alphanumeric data has been interleaved with the video picture on a video display and recorded on a video cassette recorder (VCR). A display may also be deployed at the monitoring site to display the measured speed to those drivers which were photographed. Detailed information from each monitoring session is also recorded on computer diskette. The detailed information can be used in traffic studies, and also in traffic court to demonstrate that a motorist was indeed traveling faster than surrounding traffic.

The accuracy of speed measurement is a primary consideration in the design of any traffic monitoring system intended to detect speed violations. It is well-known that radar reflections from receding traffic can interfere with reflections from approaching traffic. To discriminate between approaching and receding vehicles, the radar transceiver employs a quadrature-detector providing an indication of the direction of travel of the vehicle with respect to the radar transceiver. Reflections from receding vehicles are ignored. Moreover, as a vehicle passes through the radar beam, more than a hundred speed measurements are taken. Any bad readings are recognized and discarded. If the distribution of measurements is not found to match a cosine decay, the measurements are deemed to be inconclusive.

Another important consideration in the design of a traffic monitoring system for detecting moving violations is to obtain a clear picture of the offending vehicle. A high-powered flash fitted with a ruby colored filter has been used to illuminate the vehicle and driver. During the day, the flash helps to reduce glare so that the driver is more visible in the photograph. At night, the flash provides the light required to illuminate the entire scene for the photograph. The flash is also triggered when the vehicle is at a rather precise distance from the camera. The radar beam, for example, is directed by an antenna having a 7 inch dielectric lens providing a narrow half-power beam-width of 5 degrees, and the beam intersects the roadway at a 22½ degree angle. The effective range of the radar is 300 feet, so that the vehicle's location is precisely known when it first enters the radar beam. The first few speed measurements determine if a photograph should be taken. A computer analyzes the complete group of measurements and compares them to an expected cosine decay. The speed of the vehicle is imprinted on the film only when the complete set of measurements has been verified.

SUMMARY OF THE INVENTION

The basic objective of the present invention is to provide a traffic monitoring system that is easy to use and provides a more complete and presentable record of speed violations.

The traffic monitoring system has a common housing including a Doppler radar transceiver, a video camera, and a digital computer for processing a Doppler signal from the radar transceiver. The traffic monitoring system also includes a video cassette recorder, a high-speed photographic camera, and a laptop computer linked to the digital computer in the housing. The traffic monitoring system may also include a video monitor, a second camera, and a speed display sign linked to the digital computer.

An operator uses the laptop computer to operate the traffic monitoring system. A program for the digital computer in the housing is downloaded from a memory device such as a diskette or removable memory card inserted into the laptop computer. Therefore, changes in control settings and program revisions for options or improvements to the system are easily made by distributing a revised diskette or memory card.

The digital computer performs an initial self-test procedure in which a calibration signal that simulate a Doppler signal is injected into electronics that interfaces the Doppler radar transceiver to the digital computer. The digital computer verifies that calibration frequencies above and below the speed measurement range of the system do not cause the detection of a vehicle, and calibration frequencies within the speed measurement range cause the detection of a vehicle at a proper speed.

When monitoring traffic, the Doppler radar transceiver generates Doppler signal having a pair of channels. The phase of one channel with respect to the other indicates whether a vehicle is approaching or receding from the Doppler radar transceiver. To provide a complete record of the Doppler signal in correlation with a video picture of any objects which might interfere with the radar beam, the channels of the Doppler signal are recorded on two audio channels on the video tape. One of the Doppler channels is applied to the "left" audio input of the video cassette recorder, and the other Doppler channel is applied to the "right" audio input of the video cassette recorder.

Also recorded on the video cassette is a picture of a push-down stack of the speeds of vehicles that were measured by the traffic monitoring system. The push-down stack is overlaid on the video picture from the video camera. The push-down stack gives a record of prevailing traffic conditions in a presentable form for use as evidence for prosecuting a speed violator. Therefore, the speed violator cannot claim in court that he or she was merely keeping up with the flow of traffic. The recorded picture may also include a series of successive speed measurements for each vehicle to demonstrate the validity of the speed measured by the system.

The operator may view the video picture and the push-down stack on the video monitor while the video picture is being recorded. The operator could also listen to the Doppler signal, but it is preferred that the digital computer in the housing operates an audio annunciator or loud speaker to emit sounds when vehicles are detected, and to emit a clearly distinct sound when a detected vehicle exceeds a specified speed limit. For example, a click sound is emitted when a vehicle is detected, and a warbly sound is emitted when a detected vehicle exceeds the speed limit.

BRIEF DESCRIPTION OF THE DRAWINGS

Other objects and advantages of the invention will become apparent upon reading the following detailed description and upon reference to the drawings in which:

FIG. 1 is a plan view of a traffic monitoring system of the present invention being used on a roadway;

FIG. 2 is a pictorial view of the various components of the traffic monitoring system used in FIG. 1;

FIG. 3 is a diagram showing how FIGS. 4A, 4B, 4C, and 4D should be arranged to form a single system diagram;

FIG. 5 is plan view of the radar transceiver and video camera in the traffic monitoring system;

FIG. 6 is a front view of a horn antenna of the radar transceiver, as seen when a dielectric lens is removed from the front of the horn antenna;

FIG. 7 is a side view of one of the corrugated vertical side walls of the horn antenna;

FIG. 8 is a section view of the corrugated side wall along line 8—8 in FIG. 7;

FIG. 15 is a flowchart of a procedure for generating the shutter drive voltage as shown in FIG. 14;

FIG. 16 is a flowchart of a procedure for asserting the specified level of shutter drive voltage for a specified duration of time while sensing a "shutter open" stop switch;

FIG. 17 is a flowchart of a procedure for adaptively initializing shutter control parameters;

FIG. 18 is a flowchart of a subroutine for taking a picture;

Figure 4A:
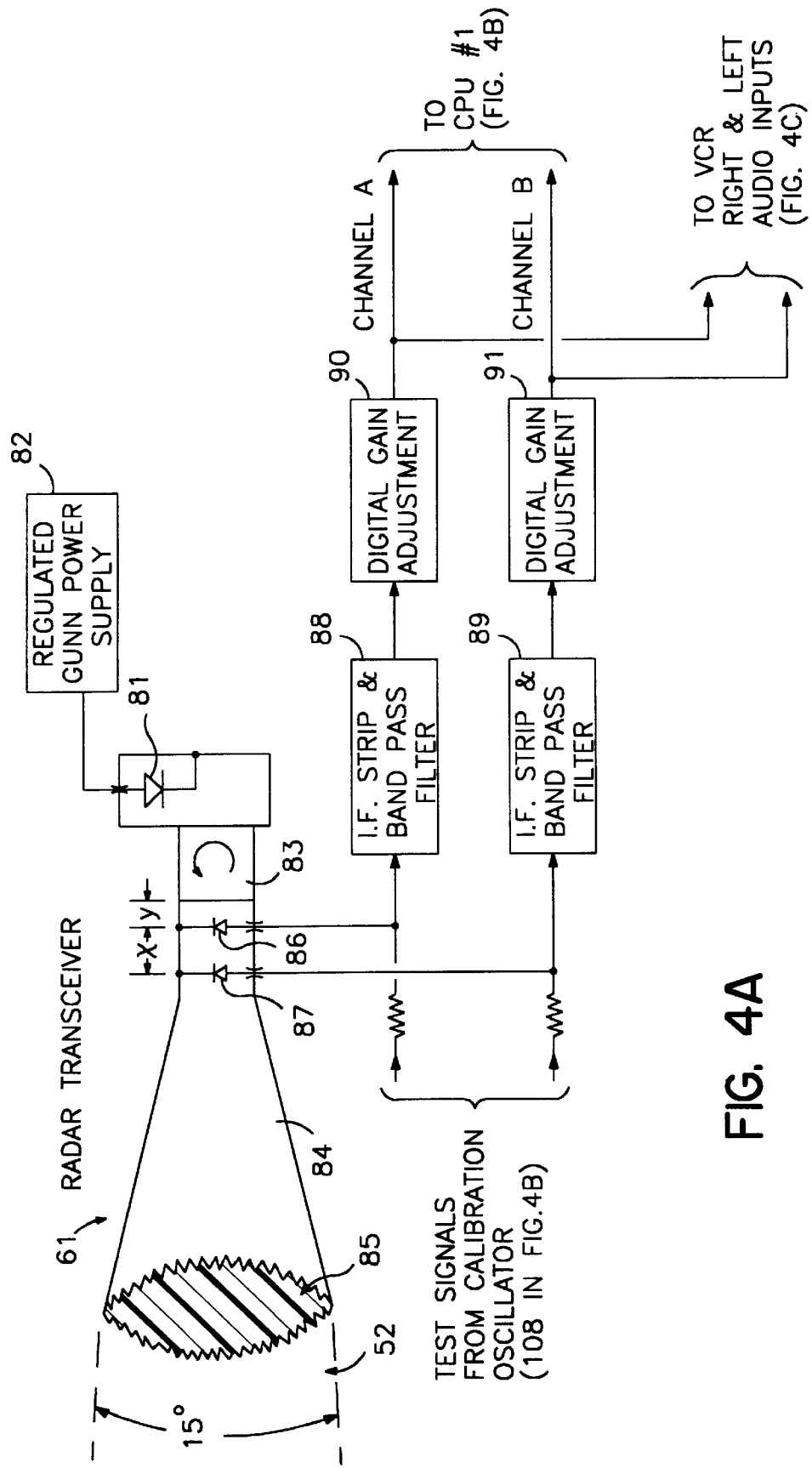
FIG. 4A is a schematic diagram of a radar transceiver used in the traffic monitoring system.

While the invention is susceptible to various modifications and alternative forms, a specific embodiment thereof has been shown by way of example in the drawings and will be described in detail herein. It should be understood, however, that it is not intended to limit the invention to the particular form disclosed, but, on the contrary, the intention is to cover all modifications, equivalents, and alternatives falling within the scope of the invention as defined by the appended claims.

DETAILED DESCRIPTION OF THE PREFERRED EMBODIMENTS

Turning now to FIG. 1, there is shown a section of a roadway generally designated 50 where a traffic monitoring system in accordance with the invention is being used to monitor traffic. Various components of the traffic monitoring system, as will be further described below in FIG. 2, are mounted in, on, or around a surveillance vehicle 51 parked on a side of the road 50.

For detecting the speed and position of traffic, the traffic monitoring system emits a radar beam 52 from the rear of the surveillance vehicle 51. The radar beam 52 has a half-power beamwidth of 5° in the horizontal plane, and a 15° half-power beamwidth in a vertical plane or attitude direction. Therefore, as projected from the rear of the surveillance vehicle 51, the radar beam 52 appears more like a "curtain" than a "spotlight." The center of the radar beam 52 has an angle of about 22½ with respect to the roadway 50 in the horizontal plane. This beam geometry and orientation minimizes the possibility of there being more than one vehicle in the radar beam 52 at any particular time. The 5° beamwidth in the horizontal direction minimizes the chance of having more than one car in the radar beam 52 at any given time. The 15° beamwidth in the vertical direction minimizes the precision required for aiming of the beam. For example, if the beamwidth were 5° in the vertical direction and if the source of the radar beam 52 were at a height of five feet above the roadway 50, then it might be possible for a short approaching vehicle 53 to drive under the beam or just clip the beam with the roof of the vehicle. A 15° beamwidth in the vertical direction ensures that the beam 52 extends from the crown of the road 50 to a point well above the surface of the road.

As shown in FIG. 1, the traffic monitoring system will detect the speed of a vehicle 53 that is approaching the rear of the surveillance vehicle 51 when the vehicle 53 intersects the radar beam 52. There is, however, a possibility that when the approaching vehicle 53 intersects the radar beam 52, a receding vehicle 54 traveling in an opposite direction will also intersect the beam 52. The presence of both an approaching vehicle 53 and a receding vehicle 54 in the beam 52 may cause interference that would prevent the traffic monitoring system from obtaining a precise reading of the speed of the approaching vehicle 53. In this case, however, the traffic monitoring system can detect the presence of the receding vehicle 54 in the beam 52 and discard any measurement of speed for the approaching vehicle 53.

Turning now to FIG. 2, there is shown a pictorial diagram of various components of the traffic monitoring system 60. The radar beam (52 in FIG. 1) is generated by a radar transceiver 61 mounted in a box 62 that also encloses a video camera 63 and a dual-processor digital computer 66. The video camera 63 is aligned with the radar transceiver 61 so that the video camera has its optical axis aligned with the axis of the radar beam. Moreover, the field of view of the video camera 63 is larger than the half-power beamwidth of the radar beam so that any objects which may interfere with the radar beam will be visible in the video picture.

The traffic monitoring system 60 includes a video monitor 64 for viewing the video picture from the video camera 63, and a video cassette recorder 65 for recording the video picture. Preferably, the video cassette recorder 64 is a conventional VHS format video cassette recorder. In addition to recording the video picture, the left and right audio channels of the video cassette recorder 65 are used to record a dual-channel audio signal detected by the radar transceiver 61. Therefore, any argument about possible radar interference can be resolved by playing back the video tape.

A particular frequency in the dual-channel audio signal from the radar transceiver 61 represents radar reflections from a surface having a particular velocity component projected along a ray from the radar transceiver 61 to the reflecting surface. The audio frequency is the so-called "Doppler" shift between the frequency of the transmitted radar beam and the frequency of the reflected beam. For a transmission frequency of 34.6 GHz, the audio frequency is given by a factor of 103 Hz per mile per hour, multiplied by the projected velocity component of the reflecting surface in miles per hour. To determine the audio frequency as a function of the speed of the approaching vehicle 53, one must further multiply by a factor equal to the cosine of the angle between the direction of travel of the approaching vehicle 53 and a ray from the radar transceiver 61 to the approaching vehicle. This angle is approximately the 22½° angle between the roadway and the axis of the radar beam, having a cosine factor of 0.924.

The digital computer 66 analyzes the dual-channel audio signal from the radar transceiver 61 in order to detect the presence of the approaching vehicle (53 in FIG. 1) in the radar beam and to determine the speed of the approaching vehicle. The digital computer 66 is interfaced to an operator via a laptop computer 67. A suitable laptop computer 67 is an IBM compatible 386 or 486 Grid Pad or Notebook Computer, having a 10" diagonal backlit display of 640×400 pixels. A program for the digital computer 66 is downloaded from a 3½" high density floppy (1.44 Mbyte) diskette 68 received in a disc drive of the laptop computer 67. The diskette 68, for example, is a "system diskette" that is automatically loaded and executed when laptop computer 67 is turned on when the diskette is in the disc drive. Execution of the program on this system diskette 88 causes the program for the digital computer 66 to be downloaded from the diskette to the digital computer. The digital computer 66 has some read-only memory that is programmed to receive the down-loaded program from the laptop computer 67, and then to execute the down-loaded program. The program on the diskette 68 is easily adapted to hardware changes or upgrades, or for different operating configurations, such as multi-lane verses single lane roads. Software upgrades are done in the field merely by changing the diskette 68. There is no need to return the digital computer 66 to the factory to change read-only memory to do a software upgrade. Instead of distributing the software upgrades on disc, the software upgrades could be programmed on a static RAM card. In this case, the laptop computer 67 would need to have a slot for receiving the static RAM card, but, in this case, the laptop computer could download the program from a static RAM memory card in a similar fashion as downloading the program from a diskette.

The operator may also enter information into a keyboard of the laptop computer 66 that is transmitted to the digital computer 66. The operator, for example, enters information identifying a new location of the surveillance vehicle (51 in FIG. 1) and the speed limit at the new location, prior to operating the system at the new location. The operator may also turn the radar on and off, and set the date and time, set the film frame numbers. The laptop computer also informs the operator when the film is used up. Moreover, the laptop computer may log on a floppy diskette a record of all of the vehicle speeds that are detected, regardless of whether the speeds exceed the speed limit.

If digital computer 66 finds that the speed of an approaching vehicle is excessive, then the digital computer 66 activates a front-view camera 69 to take a picture of the front of the approaching vehicle and the driver of the approaching vehicle, and also to record on film alphanumeric data including the speed of the approaching vehicle, and the date, time, frame reference number, and location. It is desirable to obtain a very clear picture of the approaching vehicle in order to read the front license plate of the vehicle and to identify the driver. In case the front license plate is missing or obscured, the vehicle monitoring system 60 may include a rear-view camera 70 that is activated some time after the front-view camera 68, depending on the speed of the approaching vehicle, in an attempt to capture a picture of the rear license plate of the approaching vehicle after the approaching vehicle passes the surveillance vehicle. The rear-view camera 70 need not have as wide a field of view as the front-view camera 68, because the rear view camera is not intended to photograph the driver as well as the rear license plate.

The vehicle monitoring system 60 may include a speed display sign 71 for displaying the measured speed to the driver of an offending vehicle. Otherwise, the driver could claim that he or she was unfairly denied the opportunity to check the accuracy of his or her speedometer or to remember traffic or road conditions existing at the time of the speed measurement. The speed display sign 71, for example, is a pair of 7-segment numeric indicators each displaying a digit approximately a foot high. The segments are yellow in color, and each segment has a magnetic latching-type electromagnetic actuator operated by the digital computer system 66 to pivot the segment from a non-visible position to a visible position when the actuator receives a current pulse, and to pivot the segment from the visible position to the non-visible position when the actuator receives a current pulse of opposite polarity. At the operator's discretion, the speed display sign can display the speed of only the vehicles that were photographed, or the speed of each approaching vehicle.

The components of the system 60 are placed or mounted at various locations in, on, or around the surveillance vehicle 51. The box 62 including the radar transceiver 61, video camera 63, and digital computer 66 is preferably mounted at the rear of the surveillance vehicle (51 in FIG. 1). The display sign 71 is preferably located a distance in front of the surveillance vehicle, at a location that will not interfere with the radar beam. The video monitor 64, the video cassette recorder 65, and the laptop computer 67 are preferably mounted over the right-front passenger seat in the vehicle so as to be accessible to the operator when the operator is sitting in the front seat of the surveillance vehicle. The rear-view camera 70 is preferably mounted on the front of the surveillance vehicle.

Figure 4B:
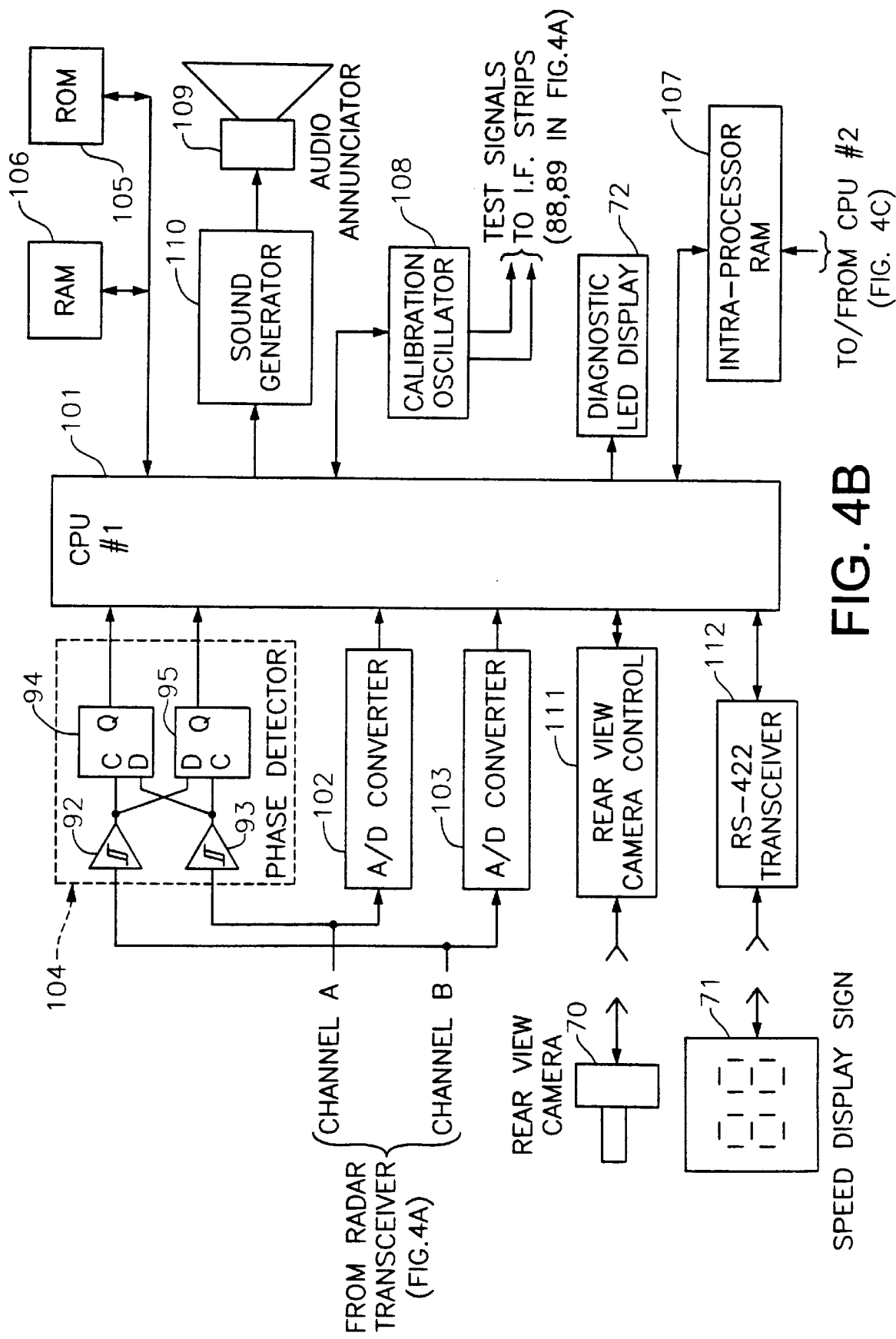
FIG. 4B is a schematic diagram of a first central processing unit and related circuits in the traffic monitoring system.
Figure 4C:
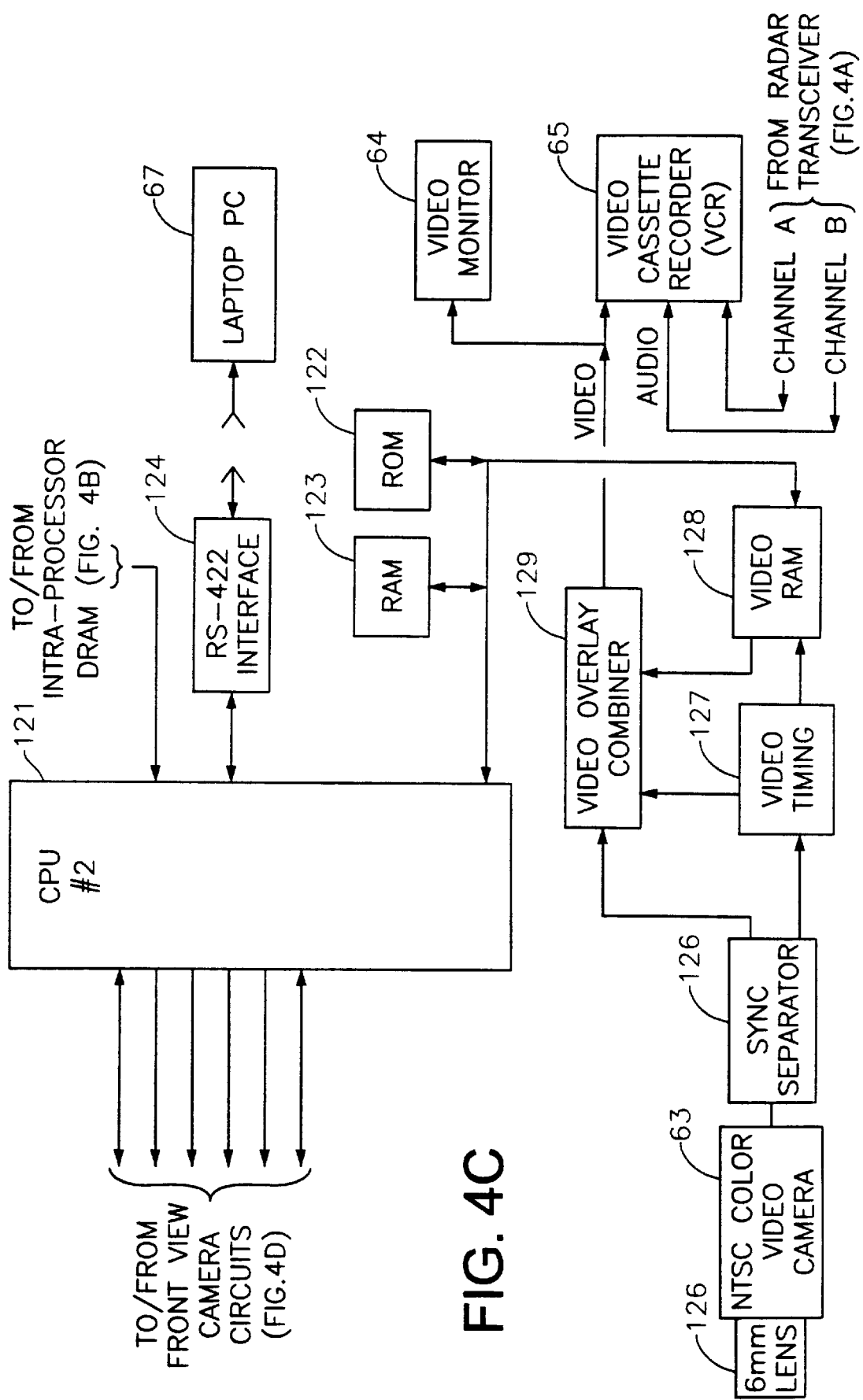
FIG. 4C is a schematic diagram of a second central processing unit and related circuits in the traffic monitoring system.
Figure 4D:
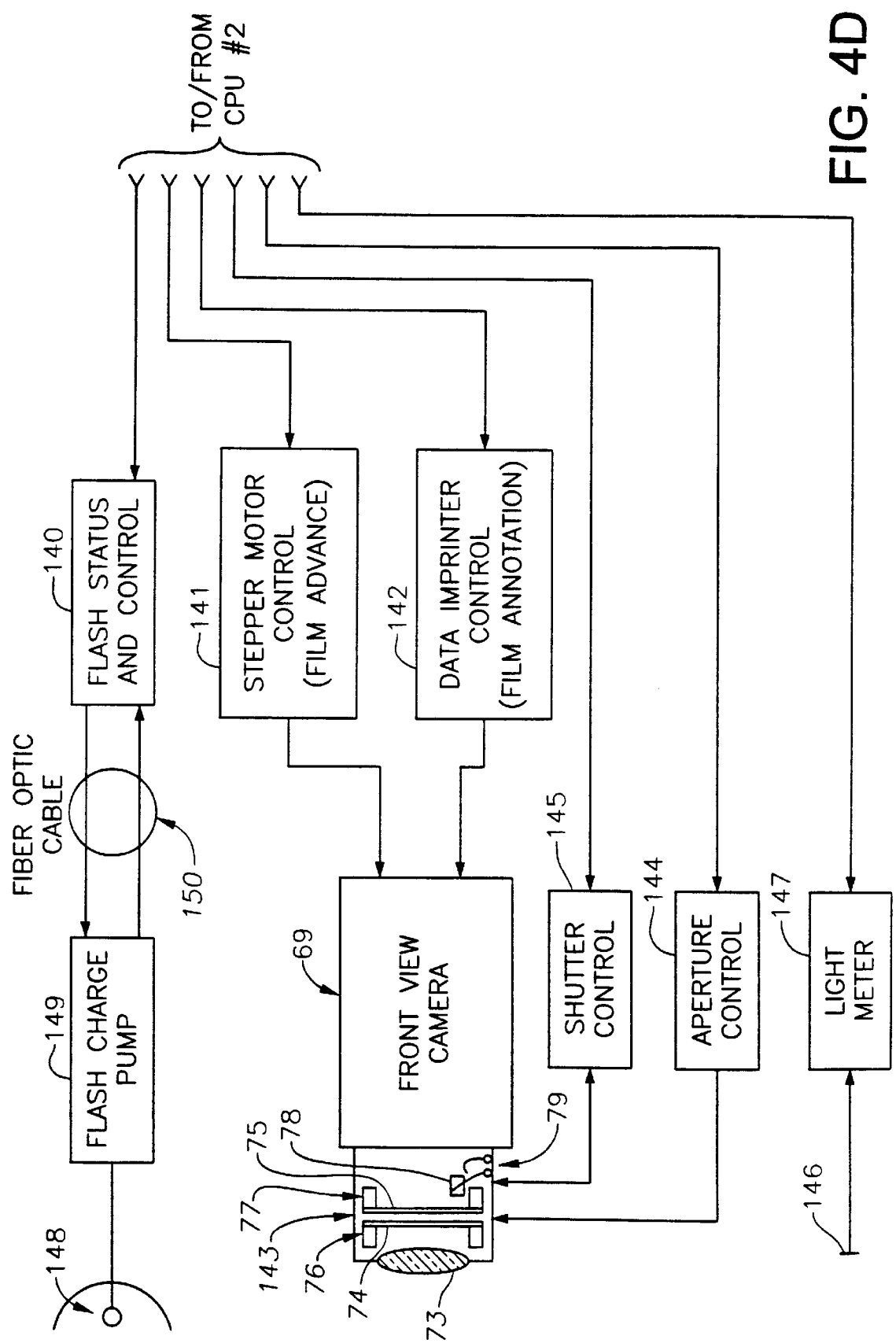
FIG. 4D is a schematic diagram of a front view camera and related circuits in the traffic monitoring system.

FIG. 3 shows the arrangement of a single system diagram formed by the combination of the schematic diagram of the circuits associated with the radar transceiver (61 in FIG. 4A), the circuits associated with a first central processing unit (101 in FIG. 4B), the circuits associated with a second central processing unit (121 in FIG. 4C), and the circuits associated with the front-view camera (68 in FIG. 4D).

Turning now to FIG. 4A, there is shown a schematic diagram of the circuits associated with the radar transceiver 61. The radar beam is generated by a Gunn diode 81 mounted in a cavity tuned to 34.6 gigahertz. The Gunn diode 81 is powered by a regulated power supply 82. The microwave signal from the Gunn diode 81 is fed through a circulator 83 to the throat of a fan-shaped corrugated horn antenna 84. The circulator has three ports; one connected to the Gunn diode 81, one connected to the throat of the horn antenna 84, and an internal port that is terminated with a matching impedance. Therefore, the circulator functions as a directional coupler that allows microwave energy to pass from the Gunn diode 81 to the throat of the horn antenna 84, but energy passing from the horn back into the circulator is absorbed before reaching the Gunn diode 81. This absorption of incoming energy prevents the incoming energy from pulling the frequency of oscillation of the Gunn diode 81.

The microwave energy emitted by the horn antenna 84 is also focused by dielectric lens 85 mounted at the aperture of the horn 84. The transmitted power in the microwave beam 52 is about 2 milliwatts. The half-power beamwidth is 5 degrees horizontal and 15 degrees vertical, and the secondary lobe attenuation is approximately 40 dB.

To reduce the amplitude of standing waves generated by reflections at the surfaces of the lens 85, the lens surfaces are grooved with grooves having a depth of approximately one-quarter of a wavelength at the microwave frequency. Grooving helps to minimize reflections by matching the impedance of free-space to the impedance of the dielectric material of the lens 85.

Radar reflections pass through the lens 85 and back into the horn 84. The reflected microwaves are detected by a pair of detector diodes 86, 87, and some of the energy of the reflected microwaves is absorbed by the circulator 83. It is important that standing waves are suppressed so that nulls do not occur at the locations of the detector diodes 86, 87. The detector diodes must be exposed to microwave energy from both the reflected microwaves and the transmitted microwaves passing from the Gunn diode 81 to the lens 85. If a null occurs at the location of one of the detector diodes, than that detector diode will not be exposed to sufficient microwave energy passing from the Gunn diode 81 to the lens 85 for efficient detection of reflected microwaves. Without the grooving of the dielectric lens 85, for example, nulls occur that may become aligned with either one of the detector diodes because the nulls shift in position with slight changes in the relative position of the lens caused by thermal expansion, and with slight changes in the frequency of oscillation of the Gunn diode 81.

The detector diodes 86, 87 are spaced by an odd multiple of one-eighth guide wavelengths in order to provide a pair of detected signals having a quadrature phase relationship. The detector diodes 86, 87 are mounted in a short section of WR-28 waveguide having UG599 flanging. Although the free-space wavelength of 34.6 GHz microwave radiation is 8.670 mm, the guide wavelength is 10.936 mm. The spacing (x) between the detector diodes is preferably five-eighths of a guide wavelength, or about 6.835 mm. However, the exact location and spacing of the detector diodes 86, 87 should be adjusted somewhat due to second-order effects, such as phase shift due to power absorbed by the diodes, phase shift due to the dielectric constant of the diode housings, unequal amplitude detected signals due to unequal mixing powers, and standing waves created by reflections at the surfaces of the lens 85 and at the interface between the throat of the horn 84 and the circulator 83.

The detected signals from the detector diodes 86, 87 are fed to respective intermediate frequency (I.F.) amplifiers and band pass filters 88, 89, which amplify and pass signals in the audio bandwidth. The IF amplifiers have a voltage gain of about 10,000, and have a flat frequency response over a bandwidth from 1.4 kHz to 12 kHz. The audio signals are fed to respective digital attenuators 90, 91 which normalize and equalize the amplitudes of the detected signals. These digital attenuators 90, 91 function similar to potentiometers, but permit the gain adjustment to be performed automatically by the digital computer system (66 in FIG. 2) when the radar transceiver 61 is operated at a test range or in a test room having walls covered with microwave absorber.

The detected audio signals, denoted as "Channel A" and "Channel B," include frequency components representing velocities of microwave-reflecting surfaces. The frequency component in "Channel B" leads or lags the frequency component in "Channel A" depending on whether the reflecting object is approaching or receding from the radar transceiver 61. Therefore, by a phase comparison or analysis of the "Channel A" and "Channel B" signals, it is possible to discriminate between approaching and receding vehicles, and also to determine quantitatively the effect of any interference between approaching and receding vehicles. The "Channel A" and "Channel B" signals are recorded on the right and left audio inputs of the video cassette recorder (65 in FIG. 2).

As further shown in FIG. 4B, the "Channel A" and "Channel B" signals are also fed to a first central processing unit (CPU) 101 of the digital computer system (66 in FIG. 2). The first CPU 101, for example, is a Motorola part No. 68HC11. The "Channel A" and "Channel B" audio signals are converted to digital form by respective analog-to-digital converters 102, 103, before the audio signals are received and processed by the first CPU 101. The analog-to-digital converters are 8-bit successive-approximation converters having a 5-volt input range and a conversion time of about 15 microseconds. The sampling rate is initially selected to be about 50 kHz, which would be sufficient for measuring the speed of a vehicle traveling up to about 250 miles per hour. For efficient use of memory, however, the sampling rate is decreased once a vehicle is detected and its speed can be measured. The sampling rate is selected to be a particular one of five predetermined rates so that there will be about 4 to 5 samples per cycle at the frequency in the "Channel A" and "Channel B" signals. The sampling continues at the lower rate as the vehicle passes through the radar beam.

The "Channel A" and "Channel B" signals are compared by a phase detector 104 that indicates whether the phase of the "Channel B" signal leads or lags the phase of the "Channel A" signal. The phase detector 104 includes two Schmitt triggers 92 and 93 that have hysteresis and square-up the "Channel A" and "Channel B" signals. The squared-up signals are fed to two flip-flops 94, 95. The flip-flop 94 is clocked by the output of the Schmitt trigger 92 and receives data from the output of the Schmitt trigger 93. The flip-flop 95 is clocked by the output of the Schmitt trigger 93 and receives data from the output of the Schmitt trigger 94. For an approaching vehicle, the flip-flop 94 outputs a 0, and the flip-flop 95 outputs a 1. For a receding vehicle, the flip-flop 94 outputs a 1, and the flip-flop 96 outputs a 0. The first CPU 101 periodically samples the outputs of the flip-flops 94, 95 and decides whether a vehicle is approaching or receding depending on whether a majority of the samples indicate that the vehicle is approaching or receding.

The first CPU 101 is programmed to perform a kind of discrete Fourier analysis of the "Channel A" and "Channel B" signals, and also is responsive to the phase detector 104 to determine whether the "Channel A" and "Channel B" signals indicate the velocity of an approaching vehicle. The first CPU 101 has a read-only memory 105 and a random access memory 106. The read-only memory 105 has two kilobytes of storage, and the random access memory 106 has 48 kilobytes of storage. The read-only memory 105 is programmed with a kind of bootstrap-loader program that receives a control program from the laptop computer (67 in FIG. 2), loads the control program into the random access memory 106, and then executes the control program in the random access memory.

The first CPU 101 periodically performs a discrete Fourier transform upon the "Channel A" and "Channel B" signals. The results of this discrete Fourier transform are a series of spectral energy values for 250 subdivisions within a range of from 15 miles per hour to 125 miles per hour. The results of the discrete Fourier transform are stored in a block of 256 bytes of an intra-processor memory 107, for transfer to a second central processing unit described below with respect to FIG. 4C. The six bytes in the block that do not store spectral energy values store hand-shaking control information and a direction flag (DF) indicating whether a majority of the samples from the phase detector 104 indicate that a vehicle was approaching or receding.

The discrete Fourier transform may employ numerical approximations in order to enhance computational speed. One appropriate numerical approximation is to approximate sine and cosine basis functions, for each sampling instant, as having either a value of 1, 0, or −1, depending on whether the sine or cosine has a value of greater than one-half (coded as a value of one), between one-half and minus one-half (coded as a value of zero), or less than one-half (coded as a value of −1). Each +1 or −1 coefficient for each basis function corresponds to an addition operation or a subtraction operation, so that multiplication operations are not required for correlating the CHANNEL A or CHANNEL B signals with the basis functions. For an nth one of the 250 subdivisions, n=0 to 249, the center speed of each speed interval is $v=15+(n\Delta)$, where $\Delta$ is a speed resolution of (110/249) miles per hour. At a sampling time of t, the sine and cosine basis functions are $\sin(2\pi ft)$ and $\cos(2\pi ft)$, where $f=(103 \text{ Hz/mph})(v)$. The approximated basis functions should also be balanced, if necessary, by changing the values near the thresholds of sine or cosine=½ and −½, so that each basis function has the same number of +1's and the same number of −1's.

A further approximation is to change a certain fraction of both the +1's and −1's of each basis function to zero, to determine a set of quasi-cosine and quasi-sine basis functions. The +1's and −1's to change should be selected to achieve a normalized result for the correlation of the signal samples with each basis function. The computational requirements are reduced in proportion to the fraction of the +1's and −1's that are changed to zero. The size of the discrete Fourier transform program is also reduced, when the program instructions are coded for maximum computational speed. For example, the maximum detected speed of 125 miles per hour has a corresponding frequency of (125 mph) (103 Hz/mph) (cos(22.5°)), or about 11.9 kHz. Therefore, the sampling rate of 50 kHz (20 μsec.) is between 4 and 5 samples per cycle. The minimum detected speed of 15 miles per hour has a corresponding frequency of (15 mph) (103 Hz/mph) (cos(22.5°)), or about 1.43 Khz (700 μsec). Assume that each basis function has about 20 +1's, 20 −1's. Each speed interval has two basis functions, including a quasi-cosine basis function and a quasi-sine basis function. Therefore, the correlation time for a discrete Fourier transform for 250 speed values from one of the two channels, Channel A or Channel B, would be (250 speed values) (2 basis functions) (40 machine operations), or a total of 20,000 machine operations. For a 10 microsecond machine operation time, the correlation time would be 2 milliseconds, or 100 sampling times at the 20 microsecond sampling rate. A computer program using this discrete Fourier transform technique is listed below. Each +1 or −1 coefficient for each basis function is coded as an ADD or SUB instruction, respectively, listed in a subroutine corresponding to the basis function.

```
C*** DISCRETE FOURIER TRANSFORM PROGRAM
1 FOR J=0 to 249
    C*** Note: the following steps 2 to 21 could be replicated
        250
    C*** times with different call instruction destination
    C*** specifiers each time to avoid the need for dynami-
        cally
```

C*** modifying the destination specifiers of the call
C*** instructions.
2 CLEAR R1
3 Set segment pointer register to SEG1
   C*** SEG1 points to CHANNEL A input buffer
3 CALL ACMCOS.J
   C*** NOTE CALL ENTRY POINT CHANGES WITH J
4 MULT R1, R1
5 LOAD R2, R1
6 CLEAR R1
7 CALL ACMSIN.J
   C*** NOTE CALL ENTRY POINT CHANGES WITH J
8 MULT R1, R1
9 ADD R2, R1
10 CLEAR R1
11 Set segment pointer register to SEG2
   C*** SEG2 points to CHANNEL B input buffer
12 CALL ACMCOS.J
   C*** NOTE CALL ENTRY POINT CHANGES WITH J
13 MULT R1, R1
14 ADD R2, R1
15 CALL ACMSIN.J
   C*** NOTE CALL ENTRY POINT CHANGES WITH J
16 MULT R1, R1
17 ADD R2, R1
18 Set segment pointer register to SEG3
   C*** SEG3 points to Intra-Processor Memory
19 STORE M(J), R2
20 NEXT J
21 RETURN
   C*** SUBROUTINE ACMCOS.0
22 ADD R1, M(0)
23 ADD R1, M(1)
24 ADD R1, M(3) . . .
59 SUB R1, M(246)
60 SUB R1, M(247)
61 SUB R1, M(249)
62 RETURN . . . 8,270 RETURN
   C*** SUBROUTINE ACMCOS.249
8,271 ADD R1, M(0)
8,272 SUB R1, M(2)
8,273 ADD R1, M(4) . . .
8,308 ADD R1, M(245)
8,309 SUB R1, M(247)
8,310 ADD R1, M(249)
8,311 RETURN
   C*** SUBROUTINE ACMSIN.0
8,312 ADD R1, M(21)
8,313 ADD R1, M(22)
8,314 ADD R1, M(24)
8,349 SUB R1, M(245)
8,350 SUB R1, M(227)
8,351 SUB R1, M(228)
8,352 RETURN . . .
16,541 RETURN
   C*** SUBROUTINE ACMSIN.249
16,542 ADD R1, M(1)
16,543 SUB R1, M(3)
16,544 ADD R1, M(5)
16,579 SUB R1, M(244)
16,580 ADD R1, M(246)
16,581 SUB R1, M(248)
16,582 RETURN The spectral energy for each speed interval is obtained by summing the squares of the correlations with the quasi-cosine and the quasi-sine basis functions. Moreover, at each speed interval, the spectral energy computed from CHANNEL A can be added to the spectral energy computed from CHANNEL B.

Processing time for the above discrete Fourier transform program can be reduced by reducing the desired number of frequency intervals. For example, if an initial transformation produces a frame of spectral energy values indicating that a vehicle is traveling at 60 miles per hour, then the above program could be invoked to compute the spectral energy for a more restricted speed range from 45 to 75 miles per hour, which would reduce the computational requirement by a factor of about 4. To restrict the speed range to about 45 to 75 miles per hour, the statement in line 1 of the program could be changed to:
1 FOR J=68 to 136

Processing time for the above discrete Fourier transform program can also be reduced by reducing the sampling rate. For example, if an initial transformation produces a frame of spectral energy values indicating that a vehicle is traveling at 45 miles per hour, then the sampling rate could be reduced by one-half simply by loading each input buffer with every other sample from the respective CHANNEL A or CHANNEL B analog-to-digital converter. Also, only one-half of the 255 spectral energy values would need to be computed to obtain the same speed resolution or spacing between the spectral energy values. The speed values associated with each speed interval would be reduced by a factor of two. Therefore, to obtain spectral energy values for speed values ranging from about 15 mph to 62 miles per hour when the sampling rate has been reduced by a factor of two, the statement in line 1 of the program could be changed to:
1 FOR J=34 to 248 BY 2

It is possible to further reduce processor requirements by using a pattern matching technique for transforming the Doppler signal to a frequency-domain signal, but such a pattern matching technique gives acceptable results only when the Doppler signal is a relatively pure sinusoidal signal. Pattern matching can be done rather quickly with comparison operations so long as the Doppler signal has approximately a normalized amplitude. Therefore a pattern matching technique should be used in conjunction with an automatic gain control. The automatic gain control, for example, operates the digital gain adjustments 90 and 91 in FIG. 4A. The digital gain adjustments 90 and 91, for example, are multiplying digital-to-analog converters, such as Analog Devices part No. DAC-08 or DAC-10, manufactured and sold by Analog Devices, One Technology Way, Norwood, Mass. 02062-9106.

The automatic gain control can quickly compile a histogram of signal levels to determine a fairly good estimate of the amplitude of the digitized Doppler signal. An eight-bit digitized Doppler signal, for example, has 256 levels, and therefore a histogram can be compiled in an array HISTO having 256 elements. The following routine, for example, estimates the amplitude, frequency, and dc offset of an eight-bit sinusoidal signal from at least 256 samples and at least one cycle of the sinusoidal signal, and adjusts a gain setting (GAIN) to obtain a normalized peak-to-peak amplitude. Upon returning from the routine, the estimated frequency is roughly proportional to the integer variable CYCLE and is more precisely CYCLE/NS times the sampling rate. The estimate of the frequency could be used, for example, to select a reduced sampling rate for subsequent sampling and processing of the sampled signal. The reduced sampling rate should be at least four times the estimate of the frequency.

```
C**** Clear Histogram Array
10 FOR J=0 TO 255
20 HISTO(J)←0
30 NEXT J
   C**** Initialize sample counter and cycle counter
40 NS←0
50 CYCLE←0
   C**** Wait for a level crossing in the Doppler signal
60 Get next digital sample DOP
70 POL1←DOP AND 80 Hexadecimal
80 Get next digital sample DOP
90 POL2←DOP AND 80 Hexadecimal
100 IF (POL1=POL2) THEN GOTO 80
    C**** Process Next Cycle
110 CYCLE=CYCLE+1
120 NS←NS+1
150 HISTO(DOP)←HISTO(DOP)+1
    C**** Loop until next level crossing
160 Get next digital sample DOP
190 POL2←DOP AND 80 Hexadecimal
200 IF (POL1≠POL2) THEN GOTO 120
210 NS←NS+1
220 HISTO(DOP)←HISTO(DOP)+1
    C**** Loop until next level crossing
230 Get next digital sample DOP
270 POL2←DOP AND 80 Hexadecimal
280 IF (POL1=POL2) THEN GOTO 210
    C**** Process additional cycles until NS≧200
290 IF NS<200 THEN GOTO 110
    C**** Reject signal out of 1.4 kHz–12 kHz bandwidth
    C**** for 50 kHz sampling rate
300 IF CYCLE<5 THEN GOTO 900
310 IF CYCLE>49 THEN GOTO 900
    C**** Find lower and upper peaks in the histogram
320 MAX←0
325 NEG←127
330 FOR J=0 TO 127
340 IF (HISTO(J)≦MAX) THEN GOTO 370
350 MAX←HISTO (J)
360 NEG←J
370 NEXT J
380 MAX←0
385 POS←128
390 FOR J=255 TO 128 BY −1
400 320 IF (HISTO(J)≦MAX) THEN GOTO 430
410 MAX←HISTO (J)
420 POS←J
430 NEXT J
    C**** Compute peak-to-peak amplitude
440 AMPP←NEG+POS
    C**** Reject signal having amplitude less than threshold
450 IF AMPP<16 THEN GOTO 900
    C**** Compute offset
460 OFFSET←(POS—NEG)/2
    C**** Reject signal having offset greater than threshold
470 IF OFFSET>8 THEN GOTO 900
    C**** Adjust gain for a peak-to-peak amplitude of 200
480 GAIN←GAIN * (200/AMPP)
    C**** Return with error flag clear
490 ERROR←0
500 RETURN
    C**** Return with error flag set
900 ERROR←1
920 RETURN
```

A suitable pattern matching technique operates on sixty cycles of the Doppler signal. The sixty cycles are subdivided into twenty wave triplets. Each of the wave triplets is matched by a point-by-point comparison to find a best matching one of 250 tabulated waveforms. The pattern matching can be performed rather quickly because not all of the tabulated waveforms need be compared to any given sample. When a best matching waveform is found, a corresponding entry in a spectral histogram table is incremented. After processing the twenty wave triplets, the sum of the entries in the spectral histogram table is 20. A mean and variance could be computed from this spectral histogram, but due to the fact that the sum of the entries is rather limited, the variance can be deemed excessive if any two non-zero entries in the spectral histogram are spaced from each other by more than one table entry. If there is only one non-zero entry, then the index of that non-zero entry indicates the mean. If there are two non-zero entries, then if they neighbor each other, the mean is indicated by the index of the larger entry; otherwise, the mean is indicated by the index of the entry in-between the nonzero entries. If there are three non-zero entries, then the mean is indicated by the index of the middle entry. This pattern matching technique is illustrated by the following routine.

```
    C**** Clear spectral histogram table
10 FOR J=0 to 249
20 SHIST(J)←0
30 NEXT J Repeat for 20 triplets
40 FOR I=1 to 20
   C**** Process the next three cycles of the signal
   C****
   C**** Buffer filing task
   C**** Get NS samples in array SAMP for three cycles
   C**** Wait for a level crossing in the signal
50 NS←0
60 Get next digital sample DOP
70 POL1←DOP AND 80 Hexadecimal
80 Get next digital sample DOP
90 POL2←DOP AND 80 Hexadecimal
100 IF (POL1=POL2) THEN GOTO 80
    C**** Process Next Cycle
    FOR NCYCLE=1 TO 3
120 NS←NS+1
150 SAMP(NS)←DOP
    C**** Loop until next level crossing
160 Get next digital sample DOP
190 POL2←DOP AND 80 Hexadecimal
200 IF (POL1≠POL2) THEN GOTO 120
210 NS←NS+1
220 SAMP(NS)←DOP
    C**** Loop until next level crossing
230 Get next digital sample DOP
240 POL2←DOP AND 80 Hexadecimal
250 IF (POL1=POL2) THEN GOTO 210
    NEXT NCYCLE
    C****
    C**** Buffer dumping task
    C**** Compute initial index from first sample value
260 J←left shift SAMP(1) by one
    C**** Follow gradient ascent or descent to find best
         match
270 FOR K=2 to NS
    C**** Note: sine tables are programmed with 00 Hexa-
         decimal or
```

```
C****  FF Hexadecimal at an entry between each pair of
C****  neighboring regions of different gradient with
       respect to
C****  the table pointer J as the table pointer J is increased
C****  from 0 to 249 for each sample index K kept
       constant so
C****  that the maxima and minima can be identified, and
       so that
C****  a gradient ascent will always terminate at least at
       the
C****  maxima and a gradient descent will always termi-
       nate at
C****  least at the minima.
280 IF (TABLE(J,K)=FF Hexadecimal) THEN GOTO 505
290 IF (TABLE(J,K)=00 Hexadecimal) THEN GOTO 505
320 L←J
330 IF (J=249) THEN GOTO 335
332 IF (TABLE (J,K) is higher than TABLE(J+1,K)) THEN
    GOTO 430
334 GOTO 340
335 IF (TABLE (J,K) is higher than TABLE(J+1,K)) THEN
    GOTO 430
    C****  Gradient of table region is positive with respect to
           J
340 IF (SAMP(K) is lower than TABLE(J,K)) THEN GOTO
    390
350 FOR J=L to 249
360 IF (SAMP(K) is lower or same as TABLE(J,K)) THEN
    GOTO 510
370 NEXT J
380 GOTO 510
390 FOR J=L to 0 BY −1
400 IF (SAMP(K) is higher or same as TABLE(J,K)) THEN
    GOTO 510
410 NEXT J
420 GOTO 510
    C****  Gradient of table region is negative with respect to
           J
430 IF (SAMP(K) is lower than TABLE(J,K)) THEN GOTO
    480
440 FOR J=L to 0 BY −1
450 IF (SAMP(K) is lower or same as TABLE(J,K)) THEN
    GOTO 510
460 NEXT J
470 GOTO 510
480 FOR J=L to 249
490 IF (SAMP(K) is higher or same as TABLE(J,K)) THEN
    GOTO 510
500 NEXT J
505 NEXT K
C****
C****  Fill Histogram
510 SHIST(J)←SHIST(J)+1
520 NEXT I
C****
C****  Reject spectrum if excessive variance and
C****  determine mean value
C****
C****  Find beginning of non-zero histogram entries
530 FOR J=0 TO 249
540 IF (SHIST(J)≠0) THEN GOTO 560
550 NEXT J
    C****  Reject histogram if any two non-zero entries are
           spaced
C****  from each other by more than one table entry.
560 IF (J>246) THEN GOTO 650
570 L←J+3
580 FOR K=L TO 249
590 IF (SHIST(K)≠0) THEN GOTO 710
600 NEXT K
    C****  Look at highest of group of three entries
620 IF (SHIST(J+2)=0) THEN GOTO 670
    C****  Pick middle of three entries
630 J←J+1
640 GOTO 690
    C****  Special case where mean is at high entry of the
           array
650 IF (J=249) THEN GOTO 690
660 IF (J=247) THEN GOTO 620
    C****  Pick higher entry in group of two consecutive
           entries
670 IF (SHIST(J)≧SHIST(J+1)) THEN GOTO 690
680 J←J+1
690 ERROR←0
700 RETURN
710 ERROR←1
720 RETURN
```

At the expense of additional processing capability, a discrete Fourier transform could be computed as a fast Fourier transform. The fast Fourier transform technique requires multiplications, but the number of computations is much less than the number of computations required for correlating with respective basis functions to achieve a comparable precision. For transforming a series of 256 samples, for example, the fast Fourier transform technique would require about 1024 complex multiplications and additions, and a comparable discrete Fourier transform that correlates with respective basis functions would require 65,536 complex multiplications and additions. Details regarding the fast Fourier transform technique are disclosed in Lawrence R. Rabiner and Bernard Gold, *Theory and Application of Digital Signal Processing,* Prentice-Hall, Inc., Englewood Cliffs, N.J., 1975, pages 356–437 and 573–626, incorporated herein by reference. In particular, on page 367, Rabiner and Gold show a listing of a FORTRAN subroutine for a decimation-in-time, radix 2, in-place fast Fourier transform that could be used for practicing the present invention.

The intra-processor memory 107 is also used to transfer information from the second central processing unit to the first central processing unit 101. The control program from the laptop computer (67 in FIG. 2), for example, is transferred to the first central processing unit 101 via the intra-processor memory 107.

To ensure accurate speed measurements, the first CPU 101 may activate a calibration oscillator 108 to inject test signals into the I.F. strips 88, 89 in FIG. 4A. The calibration oscillator 108 simulates the generation of detected signals by the detector diodes (86, 87 in FIG. 4A). The calibration oscillator can inject test signals having four different test frequencies, and having a proper quadrature phase relationship to simulate a reflected signal from an approaching vehicle. The first test frequency is less than the minimum frequency to be detected as the speed of a vehicle, and is below the lower cut-off frequency of the I.F. band pass filters (88, 89). If the system is operating properly, the system will not detect the presence of a vehicle in response to this first test frequency. The system verifies that the presence of a vehicle is not detected in response to this first test frequency. The second test frequency corresponds to a speed of about 42 miles per hour, at about one-third of the range of speeds to be measured. The system verifies that the presence of a vehicle having a speed of 42 miles per hour is detected in response to this second test frequency. The third test frequency corresponds to a speed of about 90 miles per hour, at about two-thirds of the range of speeds to be measured. The system verifies that the presence of a vehicle having a speed of 90 miles per hour is detected in response to this third test frequency. The fourth test frequency is greater than the maximum frequency to be detected as the speed of a vehicle, and is above the cut-off frequency of the I.F. band pass filters (88, 89). If the system is operating properly, the system will not detect the presence of a vehicle in response to this fourth test frequency. The system verifies that the presence of a vehicle is not detected in response to this fourth test frequency. The program down-loaded from the diskette (68 in FIG. 1) to the digital computer (66 in FIG. 2) includes a "self-test" routine for activating the calibration oscillator 108 in this fashion at the beginning of execution of the down-loaded program. If proper system operation is not verified at each of the four test frequencies, then a system malfunction is reported to the operator (via the laptop computer 67 in FIG. 2 and via the diagnostic LED display 72 on the digital computer 66), and the system is inhibited from further operation.

The first CPU 101 is also programmed to operate an audio annunciator 109, the rear-view camera 70, the speed display sign 71, and the diagnostic LED display 72. Preferably the audio annunciator 109 is a permanent-magnet loudspeaker. The first CPU 101 operates the audio annunciator by selecting audio frequencies generated by a sound generator 110. The sound generator 110 has a digital divider generating four frequencies at about 250 Hz, 500 Hz, 1,000 Hz, and 2000 Hz. The first CPU 101 transmits a four-bit code to the sound generator. Each of the four bits corresponds to one of the four frequencies, and when any one or more of the bits is set, the frequencies corresponding to the set bits are passed to the audio annunciator. If all of the four bits of the four-bit code are cleared, then the audio annunciator is silent. By setting and clearing selected bits of the four-bit code, the first CPU 101 can make various sounds, such as ticks and warbles. For example, a tick sound is made by selecting 1,000 Hz for ten milliseconds whenever an approaching vehicle is detected passing through the radar beam. A warbly sort of sound is made by switching between 250 Hz and 100 Hz at a 2 Hz rate whenever an approaching vehicle is found to be exceeding the speed limit.

The first CPU 101 is interfaced to the rear-view camera 70 through rear-view camera control circuits 111. These rear-view camera control circuits can be similar to the control circuits shown below in FIG. 4D that control the front-view camera. The speed display sign 71 is interfaced to the first CPU 101 by an RS-422 transceiver 112.

Turning now to FIG. 4C, there are shown circuits associated with a second central processing unit 121. The second CPU 121 has a read-only memory 122 and a random access memory 123. The read-only memory 122 has two kilobytes of storage, and the random access memory 123 has 48 kilobytes of storage. The read-only memory 122 is programmed with a kind of "bootstrap loader" for loading in the random-access memory 123 a control program received from the laptop computer 67, and also transferring a control program for the first CPU (101 in FIG. 4B) from the laptop computer 67 to the intra-processor memory (107 in FIG. 4B).

The second CPU 121 receives the frames of discrete Fourier spectral energies from the intra-processor memory (107 in FIG. 4B). For each frame, the second CPU computes a mean value of the speed for the spectral energy distribution, and a variance of the speed the spectral energy distribution. For example, let E(n) represent the spectral energy distribution for a particular frame, where the index n ranges from n=0 to n=249, for a total of N=250 speed intervals. The speed $v_n=15+(n\Delta)$, where $\Delta$ is a speed resolution of (110/249) miles per hour. The mean speed $\bar{v}$ is computed as:

$$\bar{v} = \frac{\sum_{n=0}^{249} E_n v_n}{\sum_{n=0}^{249} E_n}$$

The variance $\sigma^2$ is computed as:

$$\sigma^2 = \frac{\sum_{n=0}^{249} E_n(v-\bar{v})^2}{\sum_{n=0}^{249} E_n}$$

Alternatively, the variance $\sigma^2$ is computed as:

$$\sigma^2 = \overline{v^2} - \bar{v}^2 = \frac{\sum_{n=0}^{249} E_n v^2}{\sum_{n=0}^{249} E_n} - \bar{v}^2$$

If the variance exceeds a predetermined limit, then the frame is disregarded. This method has the advantage of eliminating incorrect speed estimates that could be caused, for example, by reflections from the tires of the vehicle. The reflection from the tires of the vehicle contains frequency components indicating speeds ranging from zero to twice the speed of the vehicle, depending on whether the reflection is from the bottom of the tire or the top of the tire.

If frame of data has an acceptably small variance, then an even better measurement of the speed can be computed by recomputing the mean speed after removing from the spectral energy distribution those spectral energy components for speed intervals having speed values more than about three standard deviations from the initially-computed mean speed. The re-computed mean speed uses the same equation as the initially-computed speed, but the range of the limits of the summations include only those values of the index n for which the absolute value of the difference of the speed $v_n$ and the initially-computed mean speed $\bar{v}$ is less than or equal to three times the variance $\sigma^2$.

Based on a first frame of data having an acceptably small variance, the presence of a vehicle in the radar beam is detected, and the speed of the vehicle is estimated. However, the estimated speed is further verified by following frames of data, depending on whether the following frames also provide speed estimates (i.e., have acceptable standard deviations) and the speed estimates of the following frames follow an acceptable trend (i.e., represent essentially the same speed or a slightly slower speed due to the cosine factor contributing to the Doppler shift). These verification techniques are discussed below with reference to FIGS. 29 to 35.

The second CPU 121 also controls the front-view camera by operating a number of interface circuits that are shown and further described below with reference to FIG. 4D. The second central processing unit 121 is interfaced to the laptop personal computer 67 through a RS-422 interface 124.

The second central processing unit 121 generates alphanumeric data which is combined with the video signal from the video camera 63. The video camera 63, for example, has a six millimeter lens 125, and encodes color information according to the standard NTSC format. The video signal is fed to a sync separator 126 which strips off vertical and horizontal sync pulses received by video timing circuits 127. The video timing circuits include a digital time-base synchronized to the horizontal pulses, and row and column counters which are clocked by the digital time base and which address frame buffer locations in a video random access memory (RAM) 128. The row counters are reset by the vertical sync pulses, and the column counters are reset by the horizontal sync pulses.

Each byte in the video RAM 128, for example, stores two nibbles of four bits, and each nibble defines an attribute for a pixel. A nibble addressed by the concatenation of the row address and the column address is received by a video overlay combiner 129. In this example, the video overlay combiner 129 has four video CMOS analog switches controlled by respective ones of the four bits of the addressed nibble. The outputs of the analog switches are summed to produce the video signal transmitted to the video monitor 64 and video cassette recorder 65. The first analog switch has an input connected to receive the video output of the sync separator 126. The second analog switch has an input connected to receive an attenuated version of the video output of the sync separator 126. The attenuated version of the video output of the sync separator 126, for example, is provided by a potentiometer adjusted so that when the video output of the sync separator is at a "white" or full saturation level, the attenuated version is at a grey level. The third analog switch has an input connected to a dc reference voltage level at the "white" or full saturation level. The fourth analog switch has an input connected to a dc reference voltage level at the "black" or zero saturation level. Therefore, the four bits defining the attribute of a pixel can be programmed for either video, graphics, or various combinations where the video is visible through the graphics or the graphics are visible on top of the video. For example, areas of the picture having video only would be programmed as (1000) for high contrast, and (0100) for low contrast. Areas having graphics would be programmed as (0010) or (0001). Areas having video visible through graphics could be programmed as (1010) or (1001). Areas having graphics on top of video could be programmed as (0010) or (0100). The graphics may include alphanumeric characters created by writing a pixel pattern for each character into the video RAM.

Figure 13:
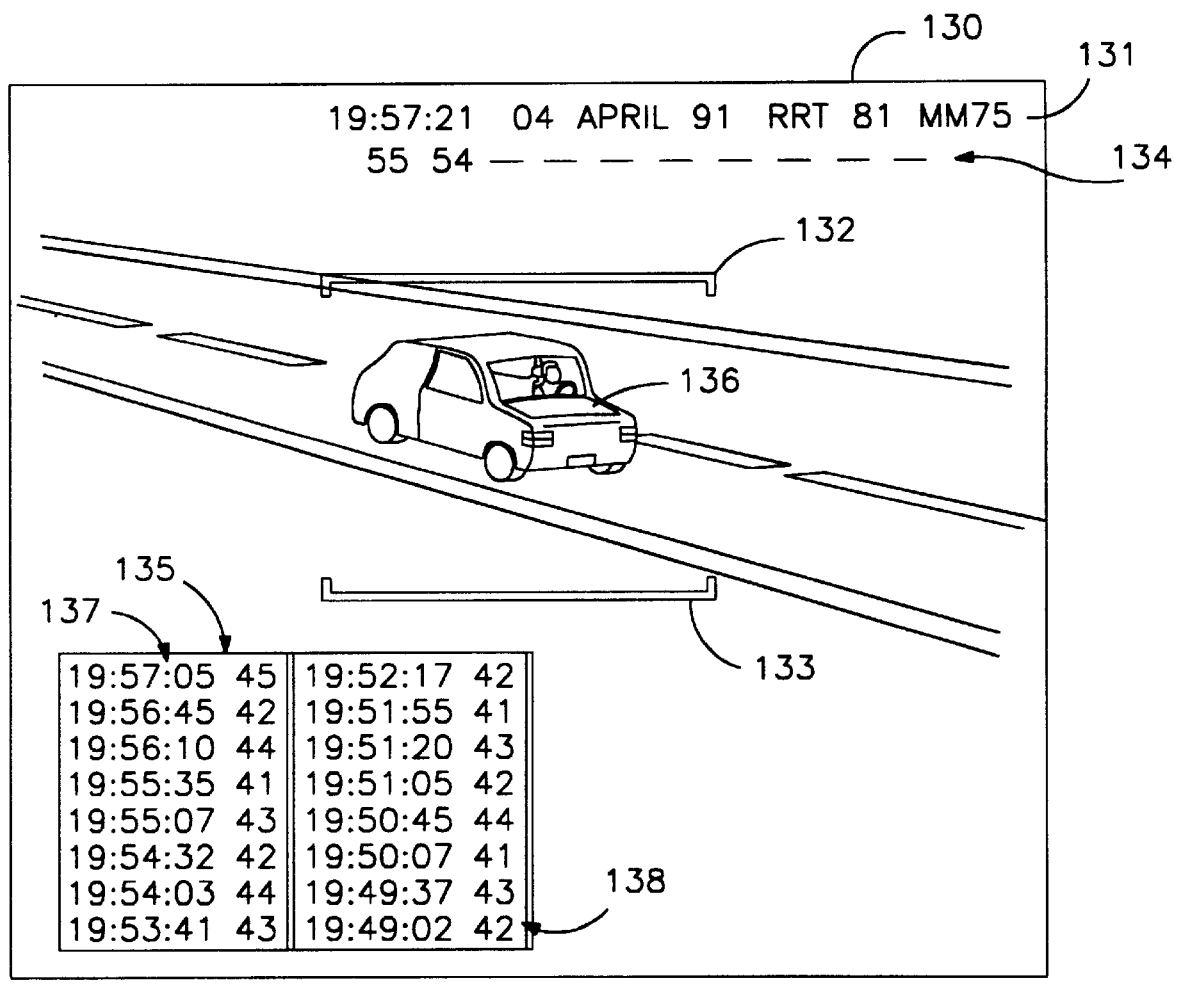
FIG. 13 is a front view of the screen of a video display used in the traffic monitoring system of the present invention.

As shown in the display screen of FIG. 13, the alphanumeric information overlaid on the video frame 130 includes the date, time, location and location in a row 131; a "view finder" 132, 133 corresponding to the field of view of the front-view camera; a histogram of the speed samples for the car in a row 134; and a push-down stack 135 that shows the time and speeds of the last 16 approaching vehicles detected by the system. The push-down stack 135 is useful in court for showing that an offending driver was not merely keeping up with traffic.

In FIG. 13, the speed of the vehicle 136 shown in the view finder 132, 133 is being measured, and therefore the histogram in the row 134 has only two successive speed samples of 55 and 54 miles per hour. Additional speed samples will be added to the histogram as the vehicle 136 passes through the radar beam. Once the vehicle 136 passes completely through the radar beam, then a mean speed would be determined from all of the speed samples in the histogram. This mean speed would be pushed on to the stack 135 along with the time of the speed determination so that this mean speed and time would occupy the first position 138 of the stack. Just prior to placing this new time and speed in the first position 137, the contents of the last entry 138 of the stack are discarded while the contents of the other entries are each pushed down the stack by one position.

Returning now to FIG. 4C, the video RAM 128 could be a dual-port RAM to eliminate the need for synchronizing the loading of the video RAM with the video sync signals. Dual-port RAM, however, is significantly more expensive than single-port RAM, and therefore it is preferred to use a single-port video RAM. When a single-port video RAM is used, the second CPU can be given priority over video RAM such that the second CPU address is asserted on the video RAM whenever the second CPU addresses the video RAM, and otherwise the video RAM address is provided by the video timing circuits 127, and no contention will occur so long as the second CPU accesses the video RAM only during the vertical retrace interval. The video timing circuits 127, for example, provide a vertical retrace interrupt pulse to the second CPU at the start of the vertical retrace interval, and the updating of the video RAM is performed by an interrupt routine invoked upon interrupt of the second CPU by the vertical retrace interrupt pulse.

Turning now to FIG. 4D, there is shown a schematic diagram of circuits associated with the front-view camera 68. The front-view camera 68 has a stepper motor (349 in FIG. 21) controlled by stepper motor control circuits 141 for advancing the film in the camera. One film-winding roller (348 in FIG. 21) in the camera is driven by the stepper motor, and the other film roller (346 in FIG. 21) has a detent switch (347 in FIG. 21) indicating revolutions of this other roller. When the computer is initialized, the computer operates the stepper motor to wind the film to obtain two successive closures of the detent switch, and the computer also counts the steps of the stepper motor between the detent switch closures. This count indicates how much film is wound on each of the rollers, so that the computer can compute how many step of the stepper motor are needed to advance the film by one frame. For each film advance, the computer also keeps track of the number of steps of the stepper motor between closures of the detent switch, because the number of steps that it takes slowly goes down as the depth of the film gets bigger and bigger on the takeup roll, and therefore the number of steps per frame needs to be re-computed as the number of steps changes between detent switch closures.

For example, suppose that the film rollers, when empty, have a circular surface of radius r upon which the film is wound, and the film has a thickness s. Suppose $n_1$ represents the number of turns of film wound on the takeup roller (348 in FIG. 21) driven by the stepper motor (349 in FIG. 21), and $n_2$ represents the number of turns of film wound on the other roller (346 in FIG. 21) having the detent switch (347 in FIG. 21). The amount of film received by the other roller when it last made a complete revolution between detent switch closures was then about $2\pi(r+n_2 s-s)$, and the number of steps of the stepper motor required to supply this amount of film is the number of steps of the stepper motor per revolution of the first roller multiplied by the fraction $\alpha=(r+n_2 s-s)/(r+n_1 s-s)$. Therefore the fraction $\alpha$ is determined by the number of steps required to supply this amount of film divided by the fixed number of steps per revolution of the first roller. Since $\alpha$ becomes known, there is established a first relation between $n_2$ and $n_1$, namely:

$$n_2 = \alpha n_1 + (\alpha-1)(1/s)(r-s)$$

A second relation between $n_1$ and $n_2$ is established by the fact that there is a fixed and known length L of film in the camera, and this amount is the sum of the amount of film on the first roller and the amount of film on the second roller. The total amount of film on the first roller is about $2\pi(n_1 r + n_1(n_1-1)s/2)$, and the amount of film wound on the second roller is about $2\pi(n_2 r + n_2(n_2-1)s/2)$. Therefore $n_1$ is a function of $n_2$ according to:

$$L=2\pi(n_1 r+n_1(n_1-1)s/2)+2\pi(n_2 r+n_2(n_2-1)s/2)$$

and therefore $$n_2=(\tfrac{1}{2})(1-2r/s+SQRT(((2r/s)-1)^2-4(-L/s\pi+(2/s)(n_1 r)+n_1(n_1-1))))$$

Given specific values of r, s and L, the above two equations for $n_2$ can be set equal to each other to solve for $n_1$ as a function of α, for example by an iterative technique such as Newton's method. Alternatively, while winding a roll of film and recording the number of steps of the stepper motor between closures of the detent switch, the value of $n_1$ can be measured manually and tabulated as a function of the number of steps of the stepper motor between closures of the detent switch. In any case, when $n_1$ is known, the number of steps X required to advance a length D of film can be computed as $X=KD/(2\pi(r+n_1 s-s))$, where K is the number of steps required for one revolution of the film take-up roller. Therefore it is possible to program the computer with a table giving the number of steps for one frame of film as a function of the number of steps counted between two successive closures of the detent switch. Alternatively, the numbers in such a table can be fitted to a polynomial expression whereby a rather precise estimate of the number of steps for one frame of the film can be computed from the number of steps counted between two successive closures of the detent switch.

Alphanumeric data is imprinted on the film as the film is advanced. The imprinting signals are generated by eight light-emitting diodes turned on and off by data imprinter control circuits 142. The data imprinter control circuits include, for each light-emitting diode, a driver transistor and a 330 ohm current limiting resistor in series with the light-emitting diode.

The front-view camera 69 has a lens assembly 143 including 150 millimeter lens 73, an associated iris diaphragm 74 for setting the camera aperture, and a shutter 75. The 150 mm lens 73 has a lens speed of ⅟1000th second. The iris diaphragm 74 is controlled by a permanent magnet motor 76, and the shutter 75 is controlled by a permanent-magnet motor 76. The iris diaphragm 74 has a detent mechanism, providing three detents per F-stop. An aperture control circuit 144 adjusts the aperture of the iris diaphragm 74, and a shutter control circuit 145 controls the shutter 78. When the motor 76 for the iris diaphragm 74 receives a positive pulse of current from the aperture control circuit 144, the iris diaphragm is advanced by one detent. The iris diaphragm 74 retracts by one detent when the motor 76 receives a pulse of negative current from the aperture control circuit. The desired aperture setting, and the time that the shutter 78 is open, is a predetermined function of ambient light intensity as measured by a photo-cell or photo-resistor 146 providing a signal to light meter circuits 147.

The shutter 75 is similar to the iris diaphragm 74, but the shutter does not have a detent mechanism. The shutter drive motor 77 includes a ring of permanent magnets, and a fixed coil. When the coil is energized with one polarity of current, the ring rotates in one direction and opens a number of shutter blades, and when the coil is energized with an opposite polarity of current, the ring rotates in the opposite direction and closes the shutter blades. The moving parts of the shutter mechanism have a very low mass. The blades, for example, are made of carbon-fiber composite material, and the teflon is used on the bearing surfaces for reduced friction. The shutter control circuit 145 closes the shutter 78 by firing about a 10 ampere pulse into the shutter drive motor 77, starting at an applied voltage of about 14.4 volts. Although the drive motor is handling about 144 watts of power, the current pulse lasts only about 300 microseconds. To achieve a shutter speed of ⅟1000th of a second, the shutter blades approach the speed of sound. Near the speed of sound, air flow around the shutter blades changes from laminar flow to turbulent flow, and the turbulent flow limits the speed of the shutter 78. This limitation on the speed of the shutter could be removed by evacuating the region around the shutter or filling the region around the shutter with light gas such as helium. Before the shutter mechanism impacts on a "shutter open" stop 78, a reverse current pulse is applied to the shutter motor 77 to decelerate the shutter blades and reduce the impact force to an acceptable level. Impact of the shutter on the shutter stop is sensed by a shutter stop switch 79. The control of the shutter motor is described further below with reference to FIGS. 14 to 19.

The front-view camera has an internal switch (not shown) sensing when the film runs out, and a green light-emitting diode (not shown) that is visible from the back of the film magazine that is lit when the system is energized and there is film in the camera. The digital computer (66 in FIG. 2) can sense the film-sensing switch and reports to the operator, via the laptop computer 67, when the front-view camera runs out of film. The front-view camera also has a "shutter open" stop switch that is closed when the shutter is in an open position.

The front-view camera 69 has an associated flash lamp 148 powered by a flash charge pump 149. The flash lamp 148 has a variable power output, with a maximum power output of 800 watt-seconds and a recycle time of about 1 second. The flash lamp 148 is fitted with a ruby-red filter to illuminate the approaching vehicle and driver. During the daytime, the flash can be used to enhance the image and reduce glare. At night the flash provides sufficient illumination of the scene for the photograph, without disrupting the vision of approaching drivers. The flash lamp is triggered by a signal transmitted over a fiber optic cable 150 from flash status and control circuits 140. The flash charge pump 149 sends a signal over the fiber optic cable back to the flash status and control circuits 140 indicating whether a capacitor in the flash charge pump 149 has been charged to a sufficiently high voltage for powering the flash lamp 148.

The front view camera 69 and the rear-view camera 70 could use charge-coupled devices (CCDs) instead of film. A suitable CCD would have a 3048×2048 pixel array and an equivalent ⅟1000 second electronic shutter. Electronic picture data from the CCD would be stored on an 8 mm cassette data cartridge having a four gigabyte total capacity capable of storing a minimum of 2,000 picture frames per cartridge.

Turning now to FIG. 5, there is shown a scale drawing of the radar transceiver 61 mounted with the video camera 63, the digital computer 66, and a voltage regulator 96 in the common housing 62. The horn antenna 84 is pyramidal in shape and has a rectangular base of 6.13" by 2.34" and a length of 6.53" from the base of the pyramid to the plane where the walls of the horn intersect a rectangular throat having internal dimensions of 0.28"×0.14" matching the internal dimensions of WR 28 rectangular waveguide.

Turning now to FIG. 6, there is shown a front view of the horn antenna 84 as viewed when a dielectric lens (165 in FIGS. 9 to 12) is removed. The internal dimensions at the front of the horn are 5.57"×1.84". The horn antenna includes a metal top plate 151, a metal bottom plate 152, a metal left side plate 153, and a metal right side plate 154. The left and right side plates are corrugated with a series of slots 0.05" in width, a quarterwave (2.17 mm) deep, and having a spacing of 0.10" between the centers of neighboring slots. A quarter-wave deep slot 156 extends around the periphery of the front of the horn. The front of the horn also has six threaded holes, including holes 157, 158, 159 in the top plate 151 and holes 160, 161, 162 in the bottom plate, for receiving six machine screws (not shown) that fasten the dielectric lens (165 in FIGS. 9 to 11) to the front of the horn. The corrugation pattern is further shown in FIG. 7, and the slots 156 and 157 are seen in the cross-section of FIG. 8.

In operation, the horn antenna 84 is aligned the longest dimension of its base aligned horizontally, to provide the 5 degree half-power beamwidth in the horizontal plane, and the 15 degree half-power beamwidth in the vertical plane. The throat of the horn 155 has its 0.28" dimension aligned vertically and its 0.14" dimension aligned horizontally, so that the radar beam is horizontally polarized.

Figure 9:
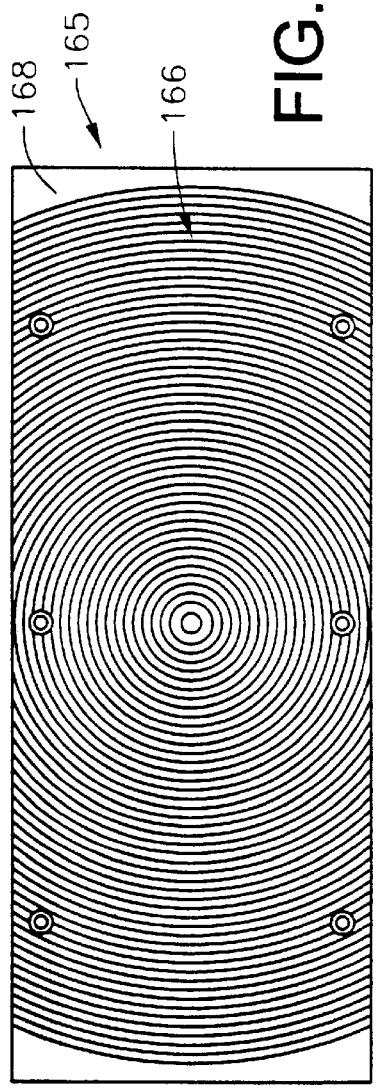
FIG. 9 is a front view of the dielectric lens of the horn antenna.

Turning now to FIG. 9, there is shown a front view of the dielectric lens 165. The front of the lens is flat, and has a series of concentric quarter-wave deep grooves 166 functioning as an impedance matching transformer for matching the impedance of free space to the impedance of the dielectric lens. The centers of neighboring grooves are spaced by 0.05", and width of the grooves is 0.03". The dielectric lens 165, for example, is made of low-loss polystyrene. The length and width of the front of the lens 165 are 6.13" by 2.34", matching the external dimensions of the front of the horn (84 in FIG. 6).

Figure 10:
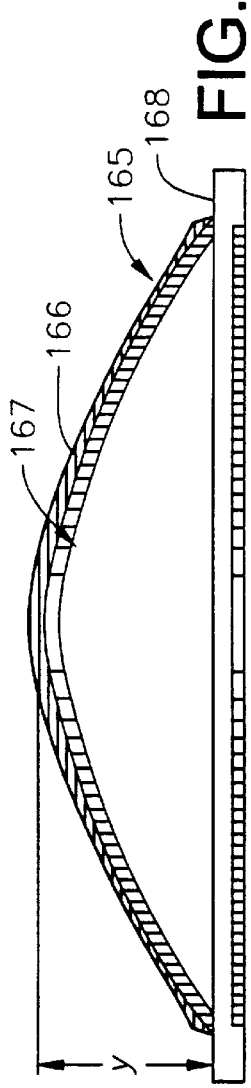
FIG. 10 is a top view of the dielectric lens.
Figure 11:
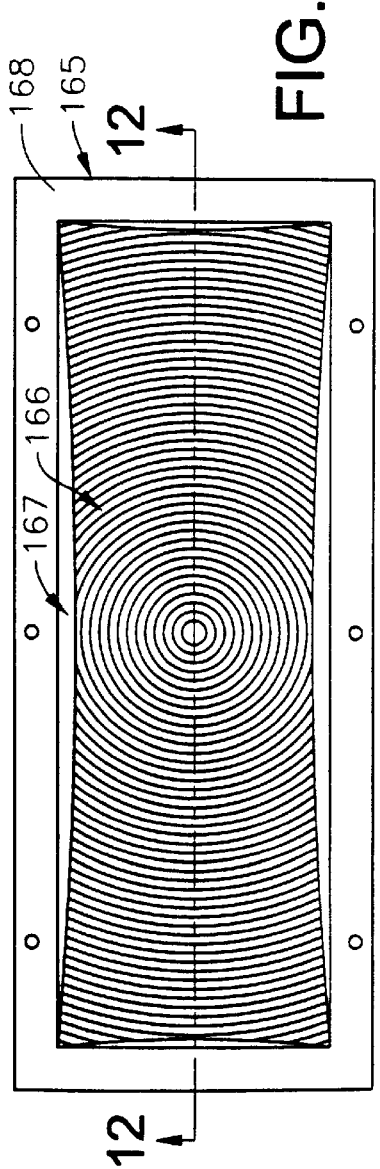
FIG. 11 is a rear view of the dielectric lens.

As shown in the side view of FIG. 10, the lens 165 has a convex portion 167 and a rectangular portion 168. The rectangular portion 168 abuts against the front of the horn (84 in FIG. 6), and the convex portion 167 is received inside the horn. The convex portion 167 is a paraboloid that is truncated by the inner pyramidal planes of the horn (84 in FIG. 6). The axis of the paraboloid is perpendicular to the front surface of the lens shown in FIG. 9, and the axis of the paraboloid becomes aligned with the axis of the horn when the lens is inserted into the horn. The thickness (y) of the convex portion 167 of the lens is 1.20 inches As more clearly seen in the rear view of FIG. 11, the parabolic surface of the convex portion 167 also has a series of concentric quarter-wave deep grooves 166 functioning as an impedance matching transformer for matching the impedance of free space to the impedance of the dielectric lens. The centers of neighboring grooves are spaced by 0.05", and width of the grooves is 0.03".

Figure 12:
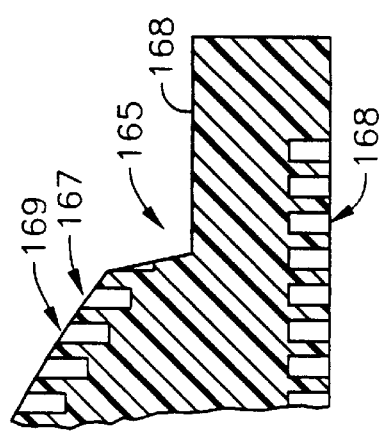
FIG. 12 is a section view of the dielectric lens along line 12 in FIG. 11.

As shown in the magnified section view in FIG. 12, the grooves 168, 169 have a rectangular cross-section. The shape of the cross-section is not critical for impedance matching, and the grooves could be V-shaped or tapered instead of rectangular. Rectangular grooves are easier to machine, whereas V-shaped grooves, or alternatively a waffle-iron pattern of pyramidal indentations, would be easier to mold. The lens 165, for example, is machined from a circular disc of plastic 6.5 inches in diameter and 1.5 inches in thickness. The disc is turned on a numerically-controlled lathe to machine the parabolic surface and to machine the concentric groves. Then the disc is sawed to its rectangular shape, and finally milled to form the planar surfaces of the lens that abut against the planar surfaces of the horn.

The grooves match the impedance of free space to the impedance of the dielectric of the dielectric lens either by forming a quarter-wave transformer in the case of rectangular grooves, or a tapered transformer in the case of V-shaped grooves. A quarter-wave transformer should have an intermediate impedance that is the geometric mean of free space and the impedance of the dielectric lens. Therefore, the grooved region of the lens should have an effective relative dielectric constant that is the square root of the relative dielectric constant of the lens. Denoting the percentage of the grooved region that is free space by P, then the effective relative dielectric constant of the grooved region is $\epsilon_r/(\epsilon_r P+(1-P))$ where $\epsilon_r$ is the relative dielectric constant of the dielectric of the lens. Therefore, the percentage of the grooved region that is free space should be $P=(\sqrt{\epsilon_r}-1)/(\epsilon_r-1)$ for optimum impedance matching. In practice, the grooves can be somewhat wider than the optimum value, and wider grooves are easier to machine. In contrast to a quarter-wave transformer, a tapered transformer does not have a restriction on the intermediate impedance, and the tapered region may have a thickness larger than a quarter wavelength.

Instead of using grooves or indentations for matching the impedance of the lens to the impedance of free space, the parabolic surface and the front surface of the dielectric lens 165 could be faced with quarter-wavelength thick sheets of dielectric having a relative dielectric constant that is the square root of the relative dielectric constant of the dielectric of the lens. Grooves are preferred, however, because grooves can be formed easily in the lens when the lens is machined or molded.

Figure 14A:
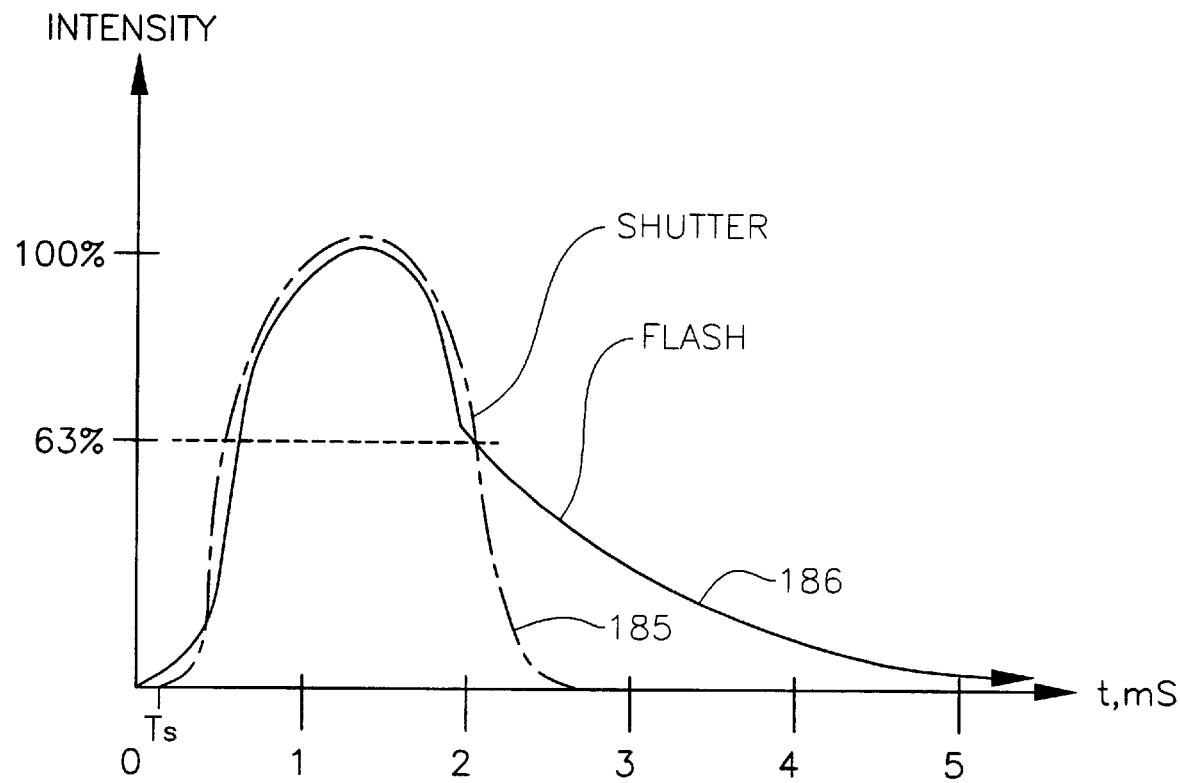
FIG. 14A is a graph of photo-flash intensity and shutter transmittance as a function of time for the front-view camera in the traffic monitoring system.

Turning now to FIG. 14A, there is shown a graph 185 of intensity of the flash lamp (148 in FIG. 2) as a function of time. Superimposed on the flash intensity 185 is a plot 186 in dashed representation of the transmittance of the shutter for the situation where the transmittance of the shutter has been approximately matched to the flash intensity for the first two milliseconds of flash time. It has been found possible to achieve such a match using a camera having a Sonnar 1:4/150 mm. HFT lens, shutter and iris diaphragm assembly sold by Rollei Fototechnic GmbH & Co. KG, P.O. Box 3245, D-3300 Braunschweig, Germany. However, to achieve such a matching, it was necessary to use a timed sequence of pulsed currents to the shutter motor, in a sequence as shown in FIG. 14A, and to activate the flash before activating the shutter. As shown in FIG. 14A, the flash is activated at t=0 mS, and the shutter is activated at $t=T_S>0$. For the operation as shown in FIG. 14A, the shutter preferably is disposed in the "focal plane" of the camera lens (i.e., the plane perpendicular to the axis of the lens and passing through the focal point of the lens, at a location between the lens and the film) so that the film receives approximately a uniform distribution of light when the shutter is moving between its closed position and its open position.

Figure 14B:
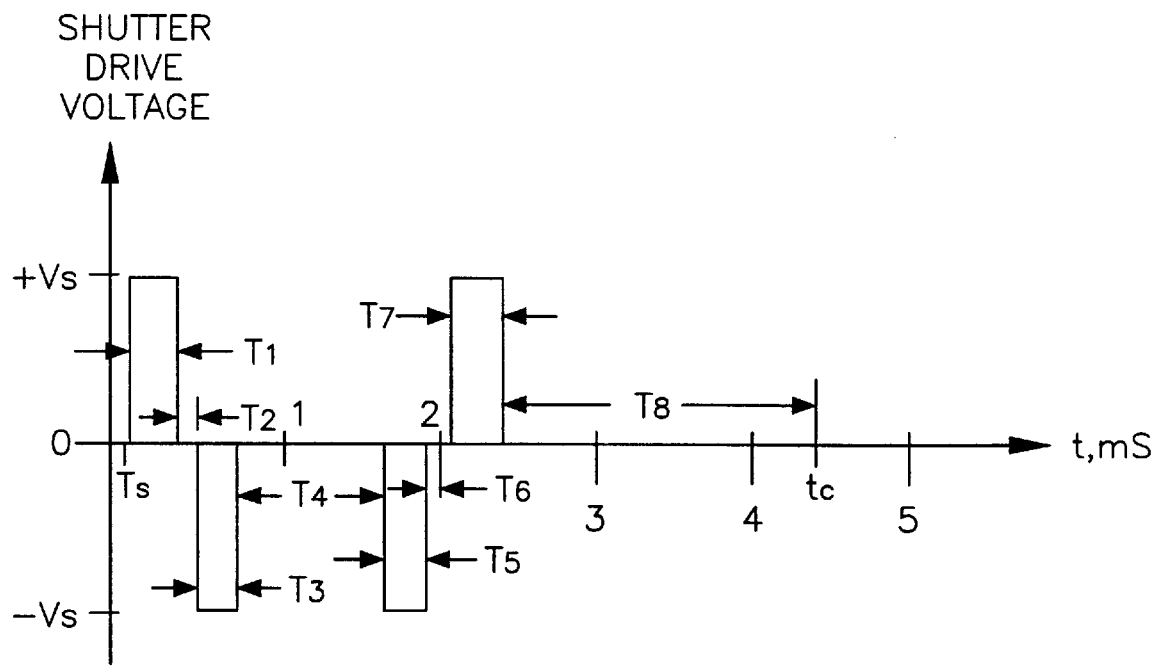
FIG. 14B is a graph of a shutter drive voltage as a function of time during the opening and closing of the shutter of the front-view camera.

As shown in FIG. 14B, starting from the shutter activation time $T_s$, the shutter drive motor is first pulsed positive with a voltage $V_S$ for a length of time $T_1$, in order to accelerate the shutter towards an open position. After the shutter drive motor is turned off for a length of time $T_2$, the shutter drive motor is pulsed with a negative voltage of $-V_S$ for a length of time $T_3$. This causes the shutter to decelerate before hitting a stop at a "shutter open" position. Then the shutter drive motor is turned off for a length of time $T_4$ during which the shutter is open. To close the shutter, the shutter drive motor is pulsed with a negative voltage $-V_S$ for a length of time $T_5$ to accelerate the shutter towards its closed position, and after the shutter drive motor is turned off for a length of time $T_6$, the shutter drive motor is pulsed positive with a voltage $V_S$ for a time $T_7$ in order to decelerate the shutter before the shutter reaches its fully closed position. Finally, the shutter drive motor is shut off for a length of time $T_8$ so that at a time $t_C$, the shutter is stationary in its fully closed position. The shutter, for example, is usually held in its fully closed position by a spring or by magnetic latching.

It is desirable for the shutter control parameters to be adaptively initialized to take into account variable factors such as friction, and so that the shutter will impact the "shutter open" stop with no more, and not much less, than a certain maximum level of force. The shutter will then bounce off the "shutter open" stop at high speed to achieve an overall shutter speed of about 1/1000th of a second. A preferred method of adaptive initialization opens and closes the shutter while monitoring the closing of a shutter switch indicating when the shutter strikes the "shutter open" stop. The acceleration and deceleration times are gradually increased and adjusted to obtain a fast shutter speed and a minimal force of impact upon the "shutter open" stop. Then the shutter control parameters are adjusted by a certain amount to obtain the certain maximum level of force of impact upon the "shutter open" stop.

Turning now to FIG. 15, there is shown a flowchart of a computer-implemented control procedure for opening and closing the shutter while monitoring a "shutter open" stop switch. A "shutter open" stop switch is provided in conventional cameras to activate a flash. The control procedure of FIG. 15 is executed by the second CPU (121 in FIG. 4C) in the digital computer (66 in FIG. 2). In a first step 171, a flag is cleared. This flag becomes set when the shutter closes the "shutter open" stop switch, as further described below with reference to FIG. 16. In the next step 172, the computer turns the shutter drive on positive for $T_1$ time units. This causes the shutter to accelerate towards the "shutter open" position. Then, in step 173, the computer turns the shutter drive off for $T_2$ time units. At this time, the shutter travels with its maximum velocity towards the "shutter open" stop. Then, in step 174, the computer turns the shutter drive on negative for $T_3$ time units, in order to decelerate the shutter before the shutter strikes the "shutter open" stop. In step 175, the computer turns the shutter drive off for $T_4$ time units. During this time, the shutter is in its open position. In step 176, the computer turns the shutter drive on negative for $T_5$ time units. This causes the shutter to accelerate towards the "shutter closed" position. In step 177, the computer turns the shutter drive off for $T_6$ time units. At this time, the shutter travels with its maximum velocity towards the "shutter closed" position. In step 178, the computer turns the shutter drive on positive for $T_7$ time units. This causes the shutter to decelerate, before reaching the "shutter closed" position. Finally, in step 179, the computer turns the shutter drive off for $T_8$ time units, completing a shutter cycle. After step 179, the shutter is at a stationary "shutter closed" position.

Turning now to FIG. 16, there is shown a flowchart of a computer-implemented control procedure for driving the shutter for a predetermined length of time $T_z$ while inspecting the "shutter open" stop switch. This control procedure is executed by the second CPU (121 in FIG. 4C) in the digital computer (66 in FIG. 2). In a first step 191, the computer transmits a selected control word to the shutter control circuits (145 in FIG. 4D). A first control word turns the shutter drive on positive, a second control word turns the shutter drive on negative, and a third control word turns the shutter drive off, as further described below with reference to FIG. 19. Then, in step 192, the computer sets a timer with the predetermined length of time $T_z$. Then, the computer waits for the predetermined length of time $T_z$ to elapse while monitoring the "shutter open" stop switch.

As shown in FIG. 16, the computer waits for the predetermined length of time $T_z$ to elapse by executing a program loop for $T_z$ number of times. In step 193, the computer waits for a predetermined amount of time so that one cycle through the loop takes one time unit. Then, in step 194, the computer reads the "shutter open" stop switch. In step 195, execution branches depending on whether the "shutter open" stop switch is closed. If the switch is closed, then in step 196, the flag is set and execution returns to step 19. Otherwise, in step 197, a "no-op" instruction is executed so that step 197 has the same delay as step 196. In step 198, the value of the timer is decremented by one. In step 199, execution loops back to step 193 unless the timer has a value less than or equal to zero. When the timer reaches the value of zero, execution returns.

Steps 193 to 199 preferably are performed on a priority interrupt and timed-interrupt basis so that the computer may perform other functions over the interval of $T_z$ time units. In particular, the first CPU (101 in FIG. 4C) and the second CPU (121 in FIG. 4C) each has a multi-task operating system that schedules various tasks at different times, including tasks that may be suspended until a scheduled time or that begin at a scheduled time. A currently executing task is interrupted at the next scheduled time to resume one of the suspended tasks or to begin one of the new tasks. The operation of such multi-task operating system is well-know. Multi-tasking is described, for example, in James Martin, *Programming Real Time Computer Systems,* Prentice-Hall, Inc., Englewood Cliffs, N.J., 1965, incorporated herein by reference. In its most elementary form, such a multi-tasking operating system has an interrupt stack for handling interrupts, and a means for recording the status of the tasks that have been suspended until a scheduled time occurs and tasks that are to begin when a scheduled time occurs. In the general case, it is possible that more than one task may be scheduled to be resumed or begun at the same time, so that a queue, ordered by activation time and priority, is typically used for recording the status of the suspended tasks and the tasks that are to begin at a scheduled time. The multi-tasking operating system has a programmable interrupt timer that generates an interrupt to the operating system when a programmed time occurs. In response to the timer interrupt, the operating system removes the task at the head of the queue; this task is the next task to be executed. If the queue does not become empty, the operating system obtains the activation time for the new task at the head of the queue, and loads the interrupt timer with this new activation time. Then the operating system manipulates the interrupt stack so that upon returning from the current interrupt to the operating system, execution will pass to the next task to be executed. Preferably there is always a low-priority "background" task to be executed. For example, the low-priority background task is a program loop that computes a checksum of all fixed-program memory, and that reports an error code and shuts down the system upon finding that the computed checksum does not match the sum that should result in absence of a program memory error.

For programming steps 193 to 199 in a multi-task environment, the flag is an interrupt enable flag for a hardware interrupt activated by the "shutter open" stop switch. This hardware interrupt has an interrupt routine that merely clears the interrupt enable flag. Moreover, the timer that is set in step 192 is the timing mechanism for the multi-tasking operating system. In particular, the time Tz can be added to the current time to compute the activation time for the shutter drive control task, and then the shutter drive control task suspends itself by a call to the operating system and passing the activation time as a parameter to the operating system. The operating system responds by placing the shutter drive task on the queue as a suspended task having the specified activation time, removing context information of the shutter drive task from the interrupt stack (e.g., the program address for resuming the shutter drive task) and linking it to the shutter drive task on the queue, and then returning execution not to the suspended shutter drive control task but to the task that was last interrupted. The linked context information is thereby saved so that the operating system will return control to the suspended shutter drive task once the predetermined length of time $T_z$ has elapsed, when a hardware timer interrupt invokes the operating system.

Turning now to FIG. 17, there is shown a program for adaptively initializing the shutter timing parameters $T_1$ to $T_8$. In step 211, the shutter timing parameters $T_1$ to $T_8$ are set to predetermined initial values. For example, the parameters $T_1$, $T_3$, $T_5$, and $T_7$ could be set to zero, and the other parameters could be set to predetermined operating values. In this case, the procedure of FIG. 17 would adaptively determine the values of $T_3$ and $T_7$ for specified maximum values of $T_1$ and $T_5$. In addition, the procedure of FIG. 17 determines the desired values while repetitively opening and closing the shutter without ever causing the shutter to impact the "shutter open" stop with excessive force.

In step 212, the shutter is opened and closed by calling the "shutter cycle" procedure of FIG. 15. Then, in step 213, the computer tests whether the flag has been set. If so, then there was sufficient acceleration time in the cycle for the shutter to reach the shutter stop (78 in FIG. 4D) and close the shutter stop switch (79 in FIG. 4D), and therefore the deceleration time ($T_3$ and $T_7$) can be increased. The deceleration time $T_7$ could always be equal to the deceleration time $T_3$, or if the shutter is always biased towards the shutter closed position by a spring, then the deceleration time $T_7$ could be slightly larger than the deceleration time $T_3$ by a difference to take into account the impulse imparted to the shutter by the spring over a cycle of opening and closing of the shutter. In step 214, the deceleration time $T_3$ is compared to a predetermined maximum limit T3MAX to determine whether it is permissible to increase the deceleration time. If the deceleration time has reached the maximum limit, then execution returns to an error reporting routine. Otherwise, execution branches to step 215 where the deceleration times $T_3$ and $T_7$ are increased, and execution loops back to step 212.

If in step 213, the flag was not set, then the "shutter open" stop was not reached during the cycle of opening and closing the shutter in step 212. In this case, execution continues to step 216 to determine whether it is permissible to increase the acceleration times $T_1$ and $T_5$. So long as the acceleration time $T_1$ is not greater or equal to the predetermined maximum value T1MAX, then execution branches to step 217 to increase the acceleration times $T_1$ and $T_5$. The acceleration time $T_5$ could always be equal to the acceleration time $T_1$, or if the shutter is biased towards the shutter closed position by a spring, then the acceleration time $T_7$ could be slightly smaller than the acceleration time $T_1$ by a difference to take into account the impulse imparted to the shutter by the spring over a cycle of opening and closing of the shutter. Execution then loops back to step 212.

If the acceleration time $T_1$ was found to be greater or equal to the maximum value of T1MAX in step 216, execution branches to step 218. Once step 218 has been reached, then the deceleration time $T_3$ should not be less than a predetermined maximum value T3MIN. For example, the acceleration time $T_3$ would be less than the predetermined minimum value T3MIN if the shutter were jammed or if the shutter stop switch were inoperative so that the shutter stop switch would never become closed. Therefore, if in step 218 the deceleration time $T_3$ is found to be less than the minimum value T3MIN, execution branches to an error reporting routine. Otherwise, execution branches from step 218 to step 219 where the acceleration time $T_1$ is increased by a predetermined amount and the deceleration time $T_3$ is decreased by the same predetermined amount so that the shutter will impact the "shutter open" stop with a certain maximum level of force. Then, in step 220, the film is advanced so that a fresh frame of film is ready to be exposed the next time that the shutter is opened. After step 219, execution returns.

Turning now to FIG. 18, there is shown a subroutine for taking a picture. In a first step 231, the shutter is opened and closed by calling the "shutter cycle" subroutine of FIG. 15. Then in step 233, the film is advanced by one frame. After step 232, execution returns.

Figure 19:
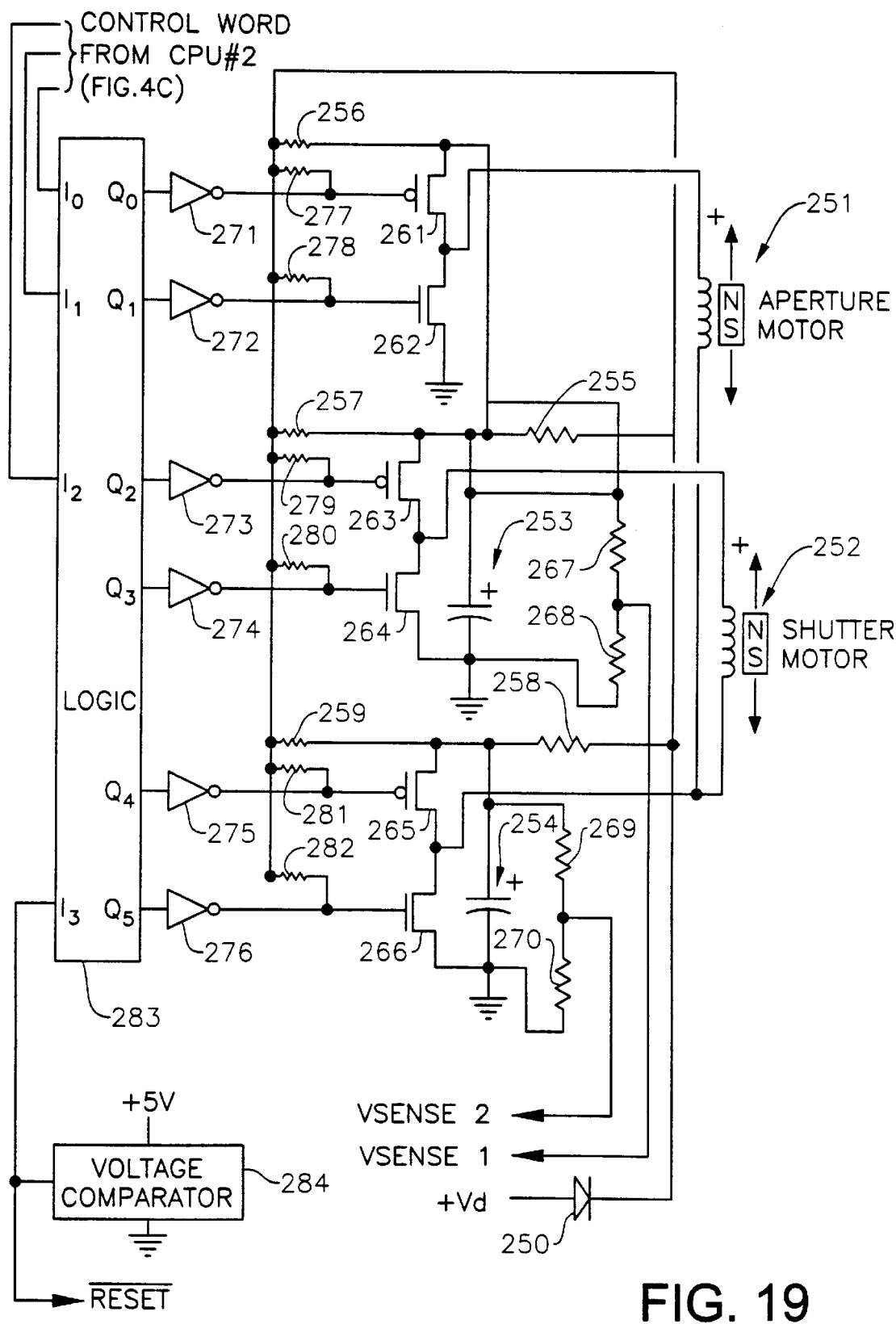
FIG. 19 is a schematic diagram of circuitry for driving the shutter and adjusting the aperture of the front-view camera in the traffic monitoring system.

Turning now to FIG. 19, there is shown a schematic diagram of circuits for driving the aperture adjusting motor 251 and the shutter motor 252. Power for driving these motors is stored in 2200 microfarad electrolytic capacitors 253, 254. The electrolytic capacitor 253 is charged to about 14.4 volts from a supply voltage +Vd of about 15 volts through a reverse-current blocking diode 250 and resistors 255, 256 and 257. The electrolytic capacitor 254 is also charged to about 14.4 volts from the supply voltage +Vd through the diode 250 and resistors 258 and 259. The resistors 255 and 258, for example, each have a value of 240 ohms, and the resistors 256, 257 and 259 each have a value of 1 K ohms. A signal VSENSE1 senses the state of charge of the capacitor 253 through a voltage divider including a 47 K ohm resistor 268 and a 10 K ohm resistor 267. A signal VSENSE2 senses the state of charge of the capacitor 254 through a similar voltage divider including a 47 K ohm resistor 269 and a 10 K ohm resistor 270.

For pulsing the aperture motor 251, a first pair of power P and N MOSFETS 261, 262 are connected in series with the capacitor 253. The drain of the FET 261 is connected to the positive terminal of the capacitor 253, and the source of the FET 261 is connected to the drain of the FET 262 and a line to the aperture motor. The source of the FET 262 is connected to ground. For pulsing the shutter motor, a second pair of power P and N MOSFETS 263, 264 are also connected in series with the capacitor 253. The drain of the FET 263 is connected to the positive terminal of the capacitor 253, and the source of the FET 263 is connected to the drain of the FET 264 and to a line to the shutter motor 252. The source of the FET 264 is connected to ground.

A third pair of power P and N MOSFETS 265, 266 are connected in series with the capacitor 254 in order to pulse either the aperture motor 251 or the shutter motor 252. The FET 265 has a drain connected to the positive terminal of the capacitor 254, and a source connected to the drain of the FET 266 and to a line of the aperture motor 251 and to a line of the shutter motor 252. The gate of each of the FETS 261, 262, 263, 264, 265, and 266 is connected to the output of a respective one of six inverters 271, 272, 273, 274, 275, and 276. The inverters 271 to 276 are, for example, part No. 74LS06, and the output of each of the inverters is also connected to a respective 1 K ohm pull-up resistor 277, 278, 279, 280, 281, and 282. The resistors 256, 257, 259, and 277 to 282, for example, are all contained in a single in-line resistor pack having one common terminal.

The inverters 271 to 276 each have an input connected to a respective one of six outputs $Q_0$ to $Q_5$ of combinational logic 283, which is provided, for example, by a programmed array logic integrated circuit, part No. PAL 16L8. The combinational logic 283 decodes control words for various motor functions. In particular, the logic 283 accepts a number of bits $I_2$, $I_1$, $I_0$ forming a control word selected for either pulsing the aperture motor on positive, pulsing the aperture motor on negative, pulsing the shutter motor on positive, pulsing the shutter motor on negative, turning both motors off, or discharging the capacitors 253 and 254 without pulsing either of the motors.

The combinational logic 283 also accepts a bit $I_3$ that is a system reset signal, asserted low, from a voltage comparator 284, such as a part No. 34064. The voltage comparator asserts the system reset signal when the voltage of a nominally +5 volt supply drops below 4.7 volts. The combinational logic 283 is responsive to this system reset signal to clamp the capacitors 253, 254 to ground, so that the aperture motor 252 and shutter motor 252 are not activated by transients during power-up or power-down when the second CPU is inoperative and being reset by the system reset signal. Suitable combinational logic is specified by the truth-table shown below:

| $I_3$ | $I_2$ | $I_1$ | $I_0$ | $Q_5$ | $Q_4$ | $Q_3$ | $Q_2$ | $Q_1$ | $Q_0$ | Function |
|---|---|---|---|---|---|---|---|---|---|---|
| 0 | 0 | 0 | 0 | 0 | 0 | 1 | 0 | 1 | 1 | Aperture Motor Positive |
| 0 | 0 | 0 | 1 | 1 | 1 | 0 | 0 | 0 | 0 | Aperture Motor Negative |
| 0 | 0 | 1 | 0 | 0 | 1 | 1 | 1 | 1 | 0 | Shutter Motor Positive |
| 0 | 0 | 1 | 1 | 1 | 1 | 0 | 0 | 1 | 0 | Shutter Motor Negative |
| 0 | 1 | 0 | 0 | 1 | 0 | 1 | 0 | 1 | 0 | Motors Off |
| 0 | 1 | 0 | 1 | 0 | 1 | 1 | 0 | 1 | 0 | Discharge Capacitor 254 |
| 0 | 1 | 1 | 0 | 1 | 0 | 0 | 1 | 0 | 1 | Discharge Capacitor 253 |
| 0 | 1 | 1 | 1 | 0 | 1 | 0 | 1 | 0 | 1 | Clamp Capacitors |
| 1 | d | d | d | 0 | 1 | 0 | 1 | 0 | 1 | Clamp Capacitors |

(Note: "d" in the table means "don't care")

The power FETs 261, 262, 263, 264, 265, 266 have sufficient impulse-power handling capability that both of the FETs in any of the three pairs can be turned on simultaneously to quickly discharge the capacitor to which they are connected without harming the FETs. The FETs have significant series "on" resistance compared to the resistance of the winding of the shutter motor 252, because it would be relatively costly to lower this "on" resistance, for example, by a connecting a number of FETs in parallel to effectively lower the "on" resistance. The series resistance of the electrolytic capacitors 253, 254 is also significant in comparison to the resistance of the winding of the shutter motor, when conventional electrolytic capacitors are used. It would be possible to use special "low series resistance" electrolytic capacitors so that the series resistance would not be significant, but such "low series resistance" capacitors are relatively expensive.

The capacitor discharge function and the capacitor clamp function could be used in a power-down routine executed just before power shut-down to insure that the capacitors 253, 254 are discharged before they are clamped. For example, the capacitor 254 could be discharged for 10 milliseconds with a control word of "101", and then FETS could all be shut off for a microsecond with a control word of "100", and then the capacitor 253 could be discharged for 5 milliseconds with a control word of "110", and finally the capacitors would be clamped with a control word of "111".

Figure 20:
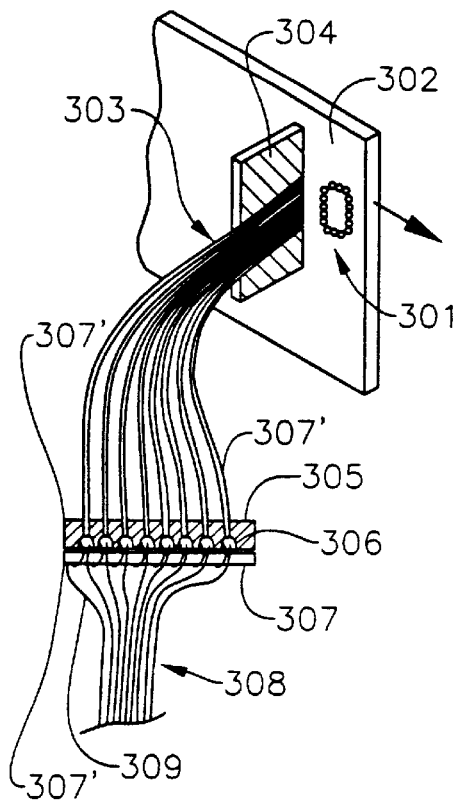
FIG. 20 is a schematic diagram illustrating use of optical fibers for exposing alphanumeric characters on photographic film.

Turning now to FIG. 20, there is shown a method of imprinting alphanumeric characters on photographic film. Such imprinting has been done by using a lens to focusing a image from an alphanumeric display onto the film. Such imprinting has also been done by a linear array of light-emitting diodes that are mounted up against the film. As shown in FIG. 20, however, it is preferable to imprint an alphanumeric character 301 on photographic film 302 by pressing a linear array of the ends of optical fibers 303 against the photographic film, and selectively exciting the optical fibers with light from an array of light-emitting diodes 306. This preferred method has the advantage of introducing less stray light onto areas of the film where imprinting is not desired, because the film is brought into intimate contact with the ends of the optical fibers, and the light is contained by the fibers except at the ends of the fibers.

It is also possible to imprint very small alphanumeric characters on the film, because the optical fibers may have a very small diameter. As shown in FIG. 20, for example, a linear array of eight fibers is made by aligning the fibers in a slot milled into a metal finger 304. Fibers as small as 10 mills in diameter, for example, have been easily aligned by hand into a slot having a width of 80 mills. The fibers are then glued into the slot.

As further shown in FIG. 20, the opposite ends of each of the optical fibers is aligned with a respective light-emitting diode in an array 306. The diodes, for example, are arranged in a linear array on a printed circuit board 307. A rectangular plastic cap 305 is molded or drilled to fit over the linear array of diodes, and a small hole is drilled through the plastic cap 305 for insertion of the opposite end of each of the fibers for alignment with the light-emitting end of a respective one of the diodes in the array 306. The fibers having been inserted into the plastic cap are glued to the plastic cap, and the plastic cap is then glued or otherwise fastened to the printed circuit board 307. The light-emitting diodes are selectively activated by currents in eight wires of a ribbon cable 308. A ninth wire 309 in the ribbon cable provides a common return for the current.

In operation, the eight diodes are selectively actuated by a byte read from a character generator ROM or from a character generator table in memory programmed with the pixel column patterns of the characters. A new byte is read from the character generator ROM or from the generator table each time a stepper motor 349 advances the film by an increment of distance that is on the same order as the diameter of the optical fibers. The stepper motor 349 can be advanced by a different number of steps to obtain the same increment of distance, depending on the amount of film on the film winding roller 348 driven by the stepper motor 349, and as determined by counting steps between closures of the detent switch 347, as described above. The character generator ROM or character generator table is addressed or indexed by the ASCII code of the character to be imprinted and is also addressed or indexed by a modulo-counter or modulo-count that is incremented for each increment of distance by the stepper motor and that counts the number of columns of pixels for each character. Once an entire character has been imprinted on the film, the character generator ROM or character generator table can be addressed or indexed with the ASCII code of a next character to be imprinted on the film. The character generator ROM or character generator table is programmed to represent a matrix having seven rows and five columns of pixels. The optical fiber array 303 has eight fibers instead of seven so that the alphanumeric characters can be selectively underlined by light conveyed through the bottom-most fiber.

Figure 21:
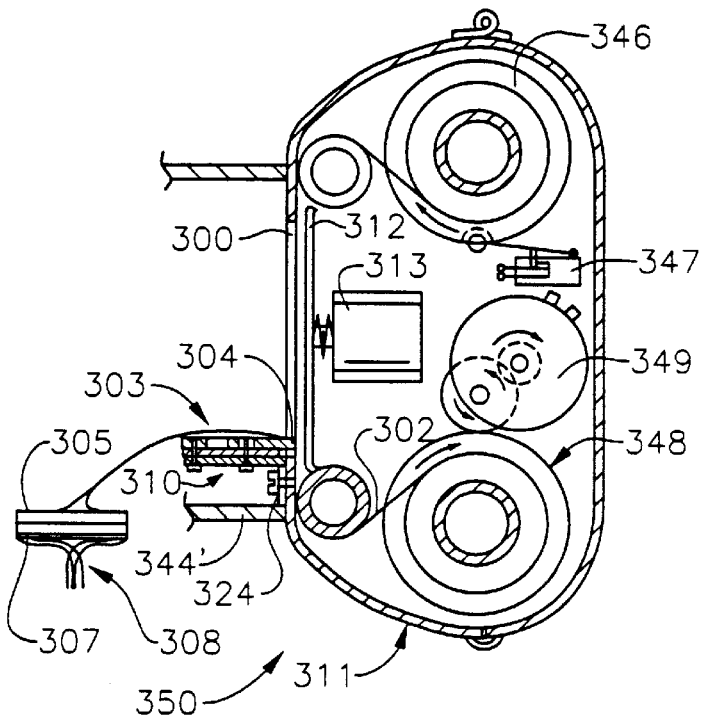
FIG. 21 is a schematic diagram of a camera using optical fibers for exposing alphanumeric characters on photographic film.

As shown in FIG. 21, the metal finger 304 is the end portion of a spring-loaded slide assembly 310 that is mounted in a front housing 344' of a camera 350 in a corner area bordering a rectangular aperture 300 that permits light from the camera lens and shutter assembly (not shown) to strike the film 302 in a magazine 311. The film magazine, for example, is from a "school camera" that holds about 100 feet of 35 mm×45 mm sprocketless type C-41 color or black & white film (about 650 exposures), and that is commonly used in schools to take pictures for student identification cards. The finger 304 is mounted in the slide and spring-loaded so that the film engages the end of the finger when the film is flattened by a spring-loaded pressure-plate 312. A solenoid 313 can be energized to retract the pressure-plate 312 when re-winding the film at relatively high speed. It has also been found that when using this kind of camera, a corner area of the aperture can be slightly enlarged by milling, drilling or filing so that the finger 304 will extend into the enlarged area (341 in FIG. 25) of the rectangular aperture 300 and contact a border area of the film that is not normally exposed through the aperture. Therefore, it is possible to annotate frames of 35 mm film without imprinting over otherwise exposed areas of the picture, and without reducing the area of the film available for recording a picture.

Figure 22:
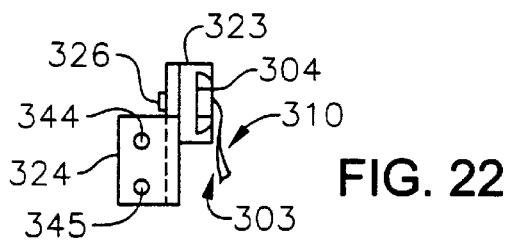
FIG. 22 is an end view of a spring-loaded slide assembly for urging the ends of optical fibers into contact with photographic film.
Figure 23:
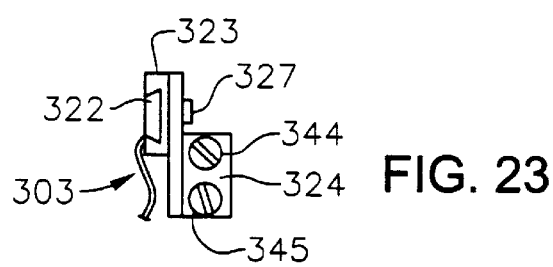
FIG. 23 is a rear view of the slide assembly shown in FIG. 22.
Figure 24:
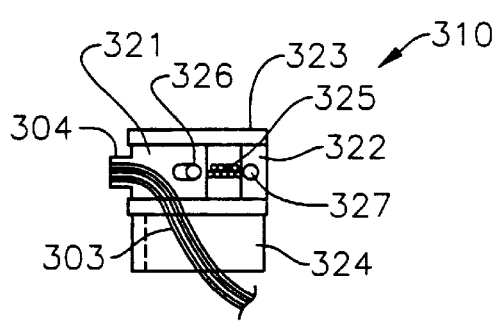
FIG. 24 is an end view of the slide assembly of FIG. 22.

Turning now to FIGS. 22 to 24, there are shown various views of the spring-loaded slide assembly 310. The metal finger 304 is an extension of a metal piece 321 mounted for sliding in a slot milled in a metal bar 323. A compression spring 325 presses the metal finger outward, but the metal finger is prevented from escaping the slot by the end of a screw 326 that extends into an enlarged hole in the metal piece 321. Therefore the finger is free to slide with respect to the metal bar 323 by a distance equal to the amount by which the diameter of the enlarged hole in the metal piece 321 is greater than the diameter of the end of the screw 326. The screw 326 is threadingly engaged to the metal bar 323 and also serves to mount the metal bar 323 to a mounting bracket 324. A second screw 327 threadingly engages a metal end piece 322 that is also engaged in the slot in the metal bar 323. The spring 325 is entrapped between the metal end piece 322 and the metal piece 326. The second screw 327 also serves to mount the metal bar 323 to the mounting bracket 324. The mounting bracket 324 mounts the slide assembly 310 to the camera magazine, as shown in FIG. 21.

Figure 25:
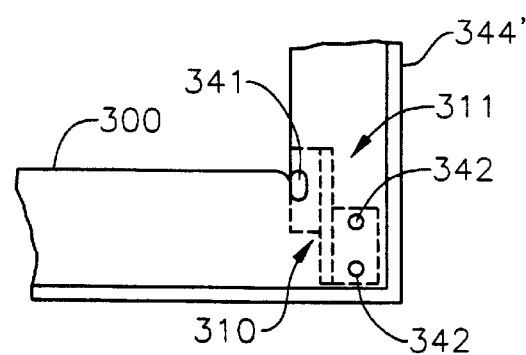
FIG. 25 shows modifications made to the housing of a film magazine for the mounting of the slide assembly of FIG. 22.

The "footprint" of the slide assembly 310 is further illustrated by phantom lines in FIG. 25. The rectangular aperture 300 has been enlarged at the lower-right hand corner to provide an area 341 for receiving the metal finger (304 in FIG. 24). Also, two holes 342, 243 have been drilled and tapped into a front housing 344' of the magazine 311 for receiving screws (344, 345) that secure the mounting bracket (324 in FIGS. 22 to 24) to the housing of the film magazine 311. It should also be apparent that the mounting bracket (324 in FIG. 22) could be modified for mounting the slide assembly in a front housing that would be smaller than the front housing 344' shown in FIG. 25; for example, if space were restricted, then the mounting bracket 324 could be fastened to the front housing 344' instead of the housing of the film magazine 311, or the metal bar 323 of the slide assembly could be fastened by screws directly to the front housing 344'.

Figure 26:
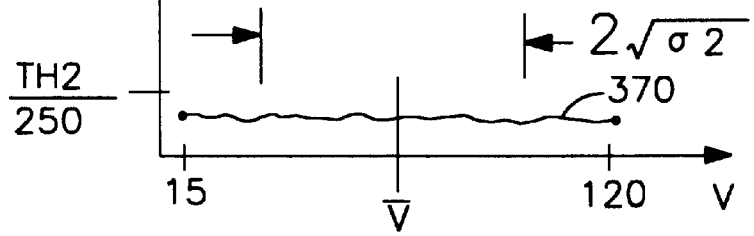
FIG. 26 is a graph of an energy spectrum for a Doppler signal detected in the absence of a vehicle in the radar beam.

Turning now to FIG. 26, there is shown a graph of the energy spectrum for a Doppler signal (Channel A or Channel B in FIG. 4A) in the absence of a vehicle passing through the radar beam (52 in FIG. 1). The spectrum 370 is essentially flat and has a low level, because it is due to background noise from the electronic circuits. Therefore, the presence or absence of a vehicle passing through the radar beam can be detected by comparing the total energy of the energy spectrum 370 to a threshold TH2. For the case where the energy spectrum 370 is resolved for 250 different speed intervals, then the threshold level has a value of TH2/250 in compari-son to the energy from any single level, as shown in FIG. 26. The presence or absence of a single vehicle in the radar beam can also be detected from the variance of the energy spectrum. When the energy spectrum is flat, the square root of the variance $\sigma^2$ is a relatively large fraction of the total width of the spectrum 380.

Figure 27:
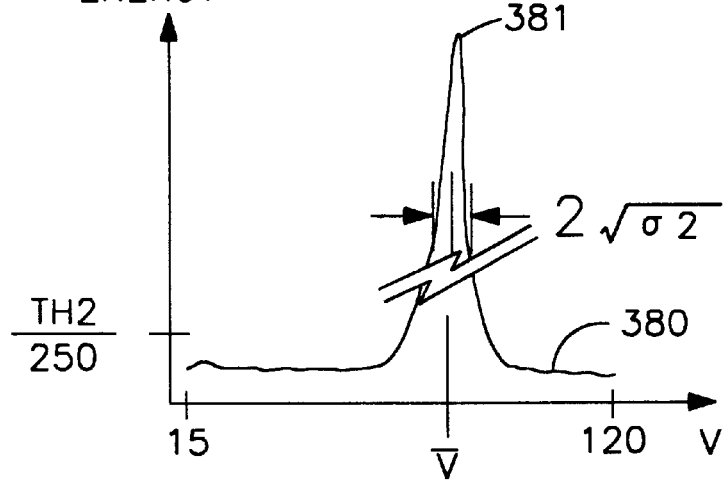
FIG. 27 is a graph of an energy spectrum of a Doppler signal detected when a vehicle is passing through the radar beam.

Turning now to FIG. 27, there is shown a graph of the energy spectrum 380 for a Doppler signal when a single vehicle passing through the radar beam. The total signal energy is in excess of the threshold TH2. The spectrum has a single sharp peak 381 at the velocity of the vehicle, which is approximately the mean velocity $\bar{v}$ of the spectrum. The width of the peak is about twice the square root of the variance $\sigma^2$.

Figure 28:
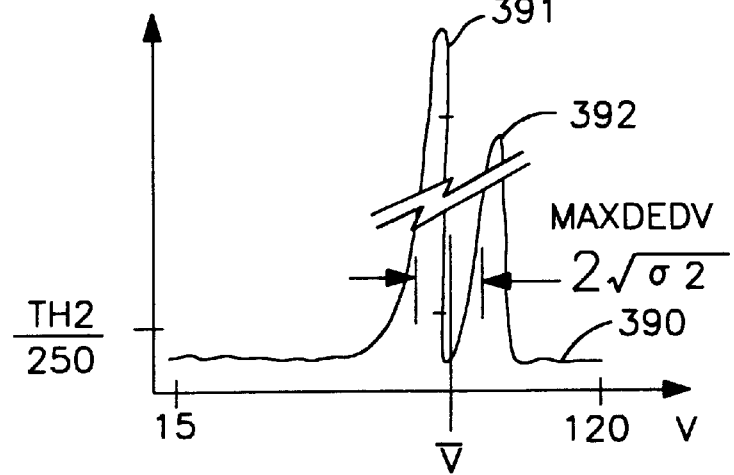
FIG. 28 is a graph of an energy spectrum of a Doppler signal that has been garbled by more than one vehicle passing through the radar beam at the same time.

Turning now to FIG. 28, there is shown a graph of the energy spectrum 390 for a Doppler signal when two vehicles are passing through the radar beam (52 in FIG. 1). The total signal energy is in excess of the threshold TH2. There are two peaks 391, 392 at different velocities, corresponding to the different velocities of the two vehicles. In this case the mean velocity $\bar{v}$ is not representative of the velocity of either of the two vehicles. The variance $\sigma^2$ is greater than the variance in FIG. 27 for the case of a single vehicle passing through the radar beam. Moreover, the two peaks 391, 392 may interfere destructively, causing a null 393 between them, and causing the peak 391 to have a maximum slope (MAXDEDV) alongside the null 393 that is greater than the slope of the peak 381 in FIG. 27 for the case of a single vehicle passing through the radar beam.

FIGS. 26, 27 and 28 illustrate that the presence or absence of a single vehicle in the radar beam, and the velocity of the vehicle, can be determined from statistics such as the mean and variance of the spectrum of the Doppler signal. So that an innocent driver will not ever be charged with a speeding violation, it is important to determine whether or not a velocity measurement is accurate. Therefore, a velocity measurement must pass a number of tests before it is deemed to be accurate.

Shown in FIGS. 29 to 35 is a specific example of a control procedure that is executed by the second CPU (121 in FIG. 4C) to obtain and verify a speed measurement of a vehicle passing through the radar beam. In general, this procedure inspects a series of frames of energy spectrum from the first CPU. A first loop in this procedure, starting at a point called QCENTRY, determines whether or not a frame of energy spectrum indicates that a vehicle has entered the radar beam. A second loop in this procedure, starting at a point called QCINTERMED, inspects following frames of energy spectra as the vehicle passes through the radar beam, and determines when the vehicle exits the radar beam. Once the vehicle exits the radar beam, at a point in the procedure called QCFINAL, statistics are computed from respective speed measurements from the frames of spectra inspected when the vehicle was passing through the radar beam, and these statistics are used to further verify the accuracy of the speed measurement of the vehicle. The basic strategy is that it is better to miss some speeders rather than tag somebody for speeding who's not, and this strategy is followed by requiring a large number of conditions to be satisfied before the measured speed is verified.

Throughout the procedure, the speed measurement can be voided for any number of reasons. When the speed measurement is voided, the reason is indicated by a numerical code stored in a memory location called "VOIDNO". In the specific procedure of FIGS. 29 to 35, "VOIDNO" is initially set to zero, and if no reason is found to void a speed measurement, "VOIDNO" will remain zero. Otherwise, "VOIDNO" is set to a non-zero value as indicated in the following table:

| Void Number | Reason |
|---|---|
| 1 | 2's complement arithmetic overflow in QCENTRY |
| 2 | MAXDEDV exceeds TH3 in QCENTRY |
| 3 | VAR exceeds TH4 in QCENTRY |
| 4 | MEANV is out of range in QCENTRY |
| 5 | Camera out of film |
| 6 | Film has not yet been advanced |
| 7 | Too many frames have signal loss (i.e., dropouts) |
| 8 | Too many frames have excessive variance (garbled) |
| 9 | Too many frames have wrong vehicle direction |
| 10 | Too many frames have a low speed out of range |
| 11 | Too many frames have a high speed out of range |
| 12 | Too many samples taken before QCFINAL |
| 13 | 2's complement arithmetic overflow in QCFINAL |
| 14 | Not enough samples take before QCFINAL |
| 15 | MAXDSDT exceeds TH5 in QCFINAL |
| 16 | VARS exceeds TH6 in QCFINAL |
| 17 | ABSDIF of speed over interval does not exceed TH7 |

The specific reasons listed in the above table will be described in detail below with reference to the steps in the control procedure of FIGS. 29 to 35 that assign the respective values to "VOIDNO".

Figure 29:
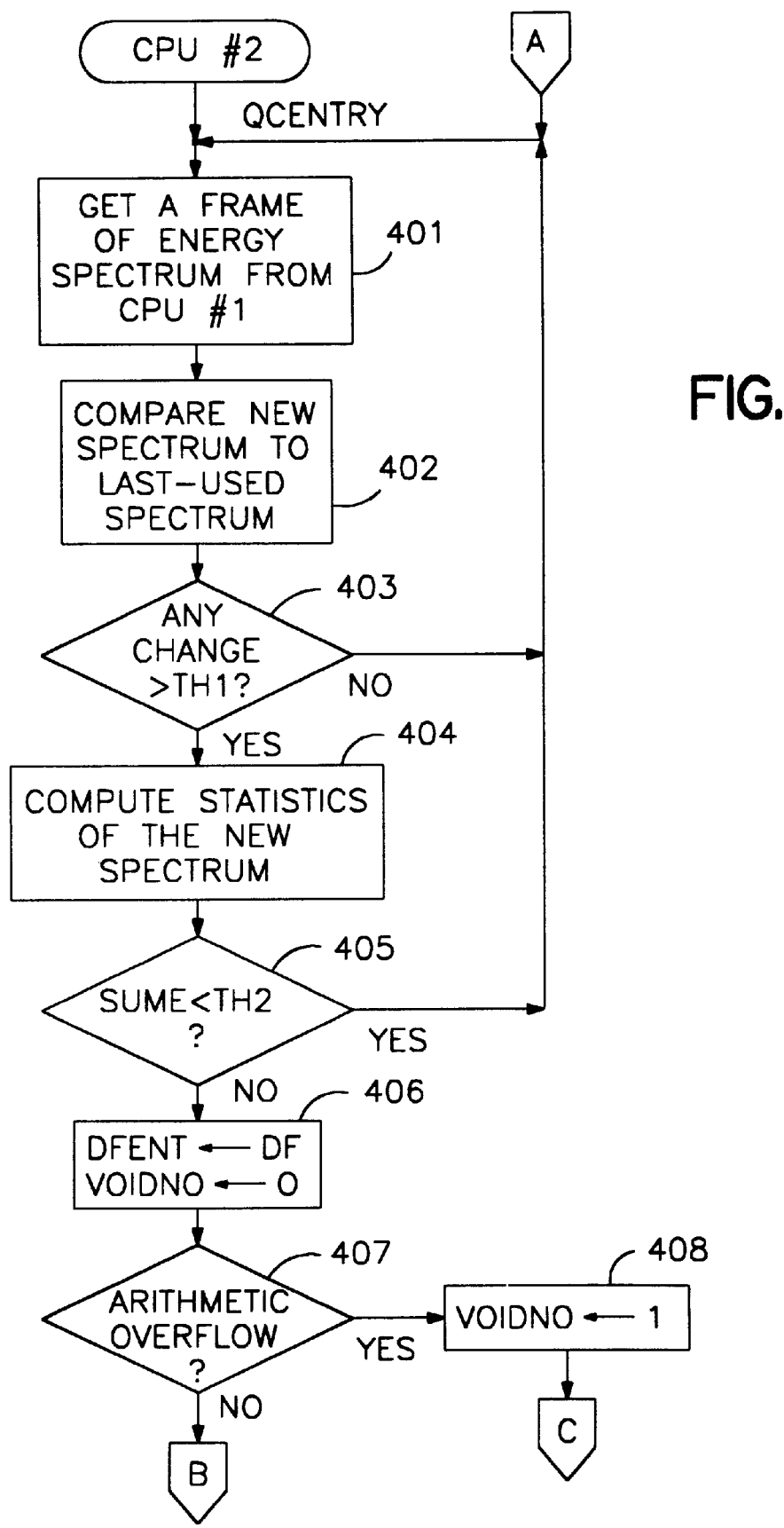
FIGS. 29 to 35 comprise a flowchart of a procedure for processing the energy spectrum of the Doppler signal in order to detect the passing of a vehicle through the radar beam, and to measure the speed of the vehicle and verify that the measured speed is accurate.

Turning now to FIG. 29, the control procedure begins in a first step 401 where the second CPU (121 in FIG. 4A) reads the intra-processor memory (107 in FIG. 4B) to obtain a frame of an energy spectrum computed by the first CPU (101 in FIG. 4B). The frame also includes a direction flag (DF) indicating whether a vehicle passing through the radar beam is approaching or receding the surveillance vehicle. In step 402 the new spectrum just obtained in step 401 is compared to the spectrum last used for computing statistics. (The very first time step 402 is executed, the new spectrum will be compared to a spectrum that has zero energy.) Then in step 403, execution branches back to step 401 if any one of the 250 spectral energy values of the new spectrum differs from the corresponding spectral energy value of the last-used spectrum by a predetermined threshold value TH1. This is done to save computational resources because in the absence of any vehicle in the radar beam, the spectrum does not change significantly, and therefore there is no need to compute the statistics for the spectrum. Otherwise, when a vehicle enters the radar beam, the spectrum does change significantly, and in step 404 the statistics for the new spectrum are computed.

In step 404, the second CPU computes a mean velocity (MEANV), a variance of the velocity about the mean (VAR), and a maximum value (MAXDEDV) of the absolute value of the difference between the energy at one velocity interval and the energy at a neighboring velocity interval. Then in step 405, the total energy of the spectrum is compared to a predetermined threshold TH2 to initially decide whether there is a vehicle in the radar beam. If the total energy is less than the threshold TH2, then it is assumed that there is not a vehicle in the radar beam, and execution branches back to step 401. Otherwise, execution continues to step 406.

Steps 401 to 405 may comprise a single subroutine (called QCENTRY) that is called to fetch statistics for a frame of energy spectrum of the Doppler signal of a vehicle entering the radar beam. A listing of such a subroutine is shown below:

C*** SUBROUTINE QCENTRY
10 Load the next frame of energy spectra into the array E
20 FOR J=0 TO 155
30 DEDT←ABS(E1(J)—E(J))
40 IF (DEDT>TH1) THEN GOTO 70
50 NEXT J
60 GOTO 10
70 MAXDEDV←0
80 E1(0)←E(0)
90 SUME←E(0)
100 V←15
110 SUMEV←E(0) * V
120 FOR J=1 TO 255
130 E1(J)←E(J)
140 DEDV←ABS(E(J)—E(J−1))
150 IF (DEDV>MAXDEDV) THEN MAXDEDV←DEDV
160 SUME←SUME+E(J)
170 V←V+DELTA
180 SUMEV←SUMEV+(E(J) * V)
190 NEXT J
200 IF (SUME<TH2) THEN GOTO 10
210 MEANV←SUMEV/SUME
220 V←15
230 DEV←V—MEANV
240 DEVSQ←DEV * DEV
250 SUMVAR←DEVSQ * E
260 FOR J=1 TO 255
270 V←V+DELTA
280 DEV←V—MEANV
290 DEVSQ←DEV * DEV
300 SUMEVAR←DEVSQ * E
310 NEXT J
320 VAR←SUMEVAR/SUMEV
330 RETURN Returning now to FIG. 29, in step 406, a flag DFENT is set to the value of the direction flag DF so that DFENT indicates the direction of the vehicle entering the radar beam. Also in step 406, VOIDNO is set to zero. Then in steps 407 to 415, the second CPU applies a number of tests to verify that the statistics computed in step 404 are appropriate for indicating the speed of a single vehicle in the radar beam.

Step 407 checks whether arithmetic overflow occurred during the computation of statistics in step 404. Absent a processor malfunction, overflow should not occur for the signal range of the analog-to-digital converters (102, 103 in FIG. 4B). For two's complement arithmetic, for example, arithmetic overflow occurs during addition of two positive numbers having a total that is too large to be represented as a positive two's complement number. Arithmetic overflow is indicated by a bit becoming set in a status register of the second CPU. By checking the status register bit after an arithmetic operation, the second CPU is responsive to arithmetic overflow in step 407, and if arithmetic overflow occurs, then in step 408, the second CPU sets VOIDNO to one. If arithmetic overflow is not found in step 407, then execution continues to step 409 of FIG. 30.

Figure 30:
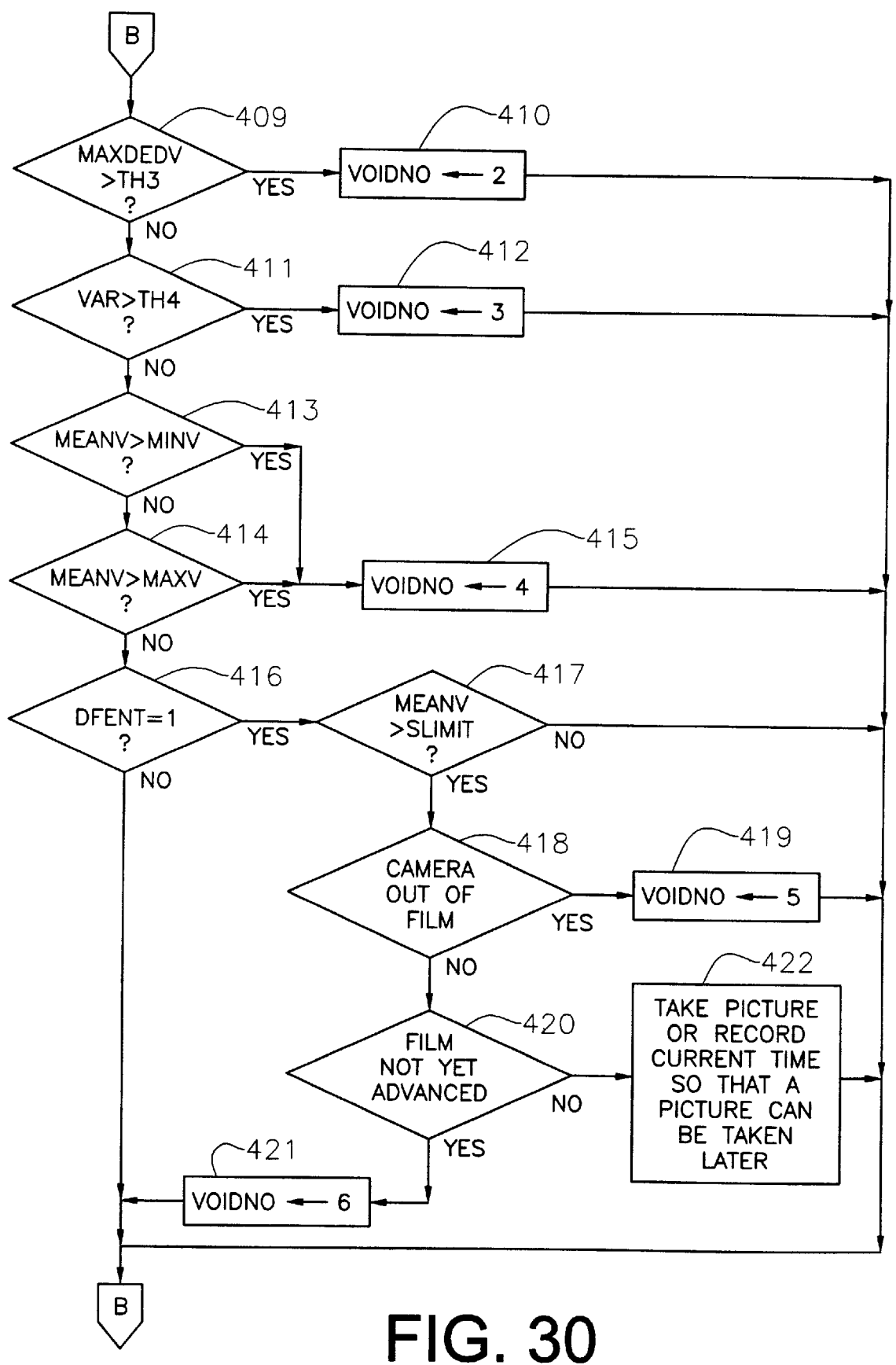

As shown in FIG. 30, in step 409, the second CPU checks for excessive slope in the energy spectrum, by comparing MAXDEV to a predetermined threshold TH3. As explained above with reference to FIGS. 27 and 28, excessive slope is an indication of more than one vehicle in the radar beam. The threshold TH3 is selected so that TH3 is less than the slope from a signal having a single peak. Therefore, if in step 409 the second CPU finds that MAXDEDV exceeds TH3, then in step 410 the second CPU sets VOIDNO to 2.

In step 411, the second CPU checks for excessive variance in the energy spectrum, by comparing VAR to a predetermined threshold TH4. As explained above with reference to FIGS. 27 and 28, excessive variance is an indication of more than one vehicle in the radar beam. The threshold TH4 is selected so that TH4 is less than the variance from a signal having a single peak. Therefore, if in step 411 the second CPU finds that VAR exceeds TH4, then in step 412, the second CPU sets VOIDNO to 3.

In steps 413 and 414, the second CPU determines whether the mean velocity MEANV falls within a valid speed range, for example, between 17 m.p.h. and 118 m.p.h. In step 413, the second CPU compares MEANV to a predetermined minimum value MINV, and in step 414, the second CPU compares the mean value MEANV to a predetermined maximum value MAXV. If the mean velocity falls outside the range, then in step 415, the second CPU sets VOIDNO to 4.

If the mean velocity computed in step 404 has not been voided in steps 408, 410, 412, or 415, then in step 416, execution branches depending on whether the vehicle in the radar beam is approaching or receding from the surveillance vehicle. As described above, the traffic monitoring system is configured for photographing only approaching vehicles, and therefore execution branches from step 416 to step 417 only when DFENT equals one, indicating that the vehicle in the radar beam is approaching the surveillance vehicle. The traffic monitoring system could be configured for also photographing receding vehicles by including an additional camera, and in this case execution would continue from step 416 to additional steps (not shown) that would be similar to steps 417 to 421 but which would check for violation of a speed limit for receding traffic, and would check the status of the additional camera for photographing receding vehicles.

In step 417 the mean velocity is compared to a speed limit (SLIMIT) for approaching traffic to determine whether a vehicle entering the radar beam is violating the posted speed limit. Although additional tests will be performed to verify a speed violation, at this point at least the time of entry of the vehicle into the radar beam should be recorded in order to determine when a photograph of the front of the vehicle should be taken. Alternatively, the photograph can be taken at this time, but, in this case, the photograph must be voided if the additional tests indicate that the measured speed of the vehicle is not accurate. If the picture is not taken immediately, then it is necessary to schedule the taking of the photograph at a later time, in dependence upon the speed of the vehicle, so that the picture will be taken when the front of the vehicle is aligned in the field of view of the front-view camera. If the photograph is taken immediately, then film will be wasted when the photograph is voided by the following tests.

In any case, a photograph cannot be taken if the front-view camera is out of film, as tested in step 418, or if the camera film in the front-view camera is being advanced so that a fresh frame of film will not be in place in the film magazine at the time that the photograph needs to be taken. Therefore, if step 417 determines that the mean velocity exceeds the speed limit (SLIMIT), then execution branches to step 418. In step 418, the second CPU checks whether the front-view camera is out of film, and, if so, execution branches to step 419 where the second CPU sets VOIDNO to 5. If in step 418 the second CPU finds that the front-view camera is not out of film, then execution branches to step 420 where the second CPU checks whether the film is being advanced in the front-view camera. If so, then in step 421, the second CPU sets VOIDNO to 6. Otherwise, in step 422, the second CPU either activates the front-view camera to take a picture, or records the current time so that the picture can be taken later, once the speed of the vehicle has been verified. If the second CPU finds in step 417 that the mean velocity does not exceed the speed limit, or after steps 408, 410, 412, 415, 415, 417, 418 or 421, execution continues in step 430 of FIG. 31.

Figure 31:
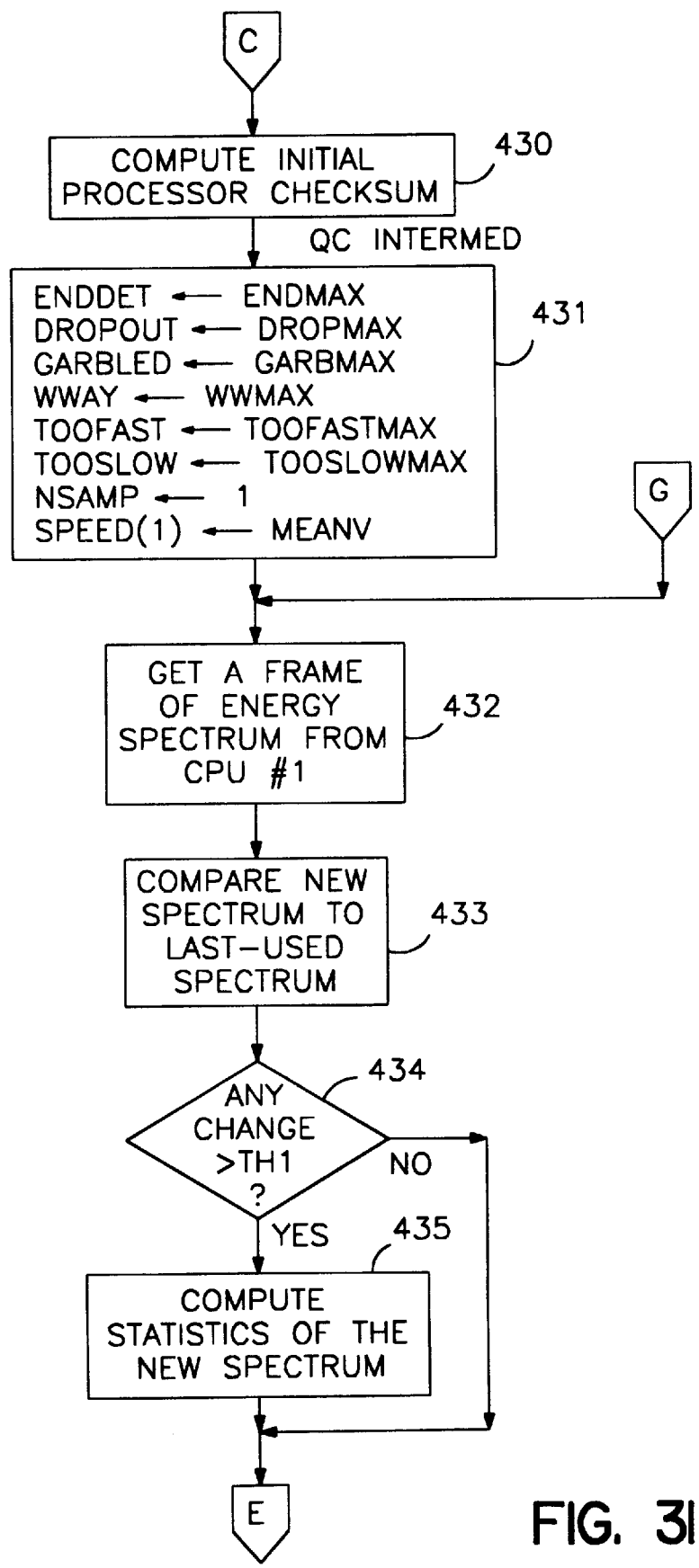

Turning now to FIG. 31, in step 430, the second CPU computes an initial processor checksum by reading a few constants from memory, and performing on the constants a series of addition, subtraction, shift, load, and store operations similar to the operations used in the computation of the first speed sample. In other words, a check is made for malfunction of the second CPU and its associated memory (133, 123 in FIG. 4C) that could cause an error in the speed sample.

In step 431, the second CPU begins processing for intermediate frames of spectrum by setting a number of down-count variables to initial values. A first down-count variable ENDDET keeps track of the number of successive frames with a drop-out in energy level. For example, after two successive frames where there is a drop-out in energy, it is assumed that the vehicle has exited the radar beam. In this case, the initial value ENDMAX of ENDDET is equal to 1.

In step 431, a number of other count-down variables are set to initial values, and each time a new frame of energy spectrum is inspected and found to satisfy a condition associated with the down-count variable, then the down-count variable is decremented, and when the down-counted variable reaches a value of zero, then the speed measurement is voided. The down-count variables include DROPOUT, being decremented upon a drop-out in signal energy; a variable GARBLED, being decremented when an energy spectrum possibly indicates more than one vehicle in the radar beam; a down-count variable WWAY, decremented when a direction flag for a new frame of energy spectrum is different from the direction indicated by the vehicle entry flag DFENT; a down-count variable TOOFAST, decremented when the mean velocity computed for a new frame of energy spectrum indicates a velocity that is too fast; and a down-count variable TOOSLOW, decremented when the mean velocity computed for a new frame of energy spectrum indicates a velocity that is too slow. In step 431, these down-count variables are set to respective initial values DROPMAX, GARBMAX, WWMAX, TOOFASTMAX, and TOOSLOWMAX, which have values, for example, of 1. Also in step 431, a sample counter value NSAMP is set equal to 1, and the first element of an array named SPEED is set equal to the previously-computed mean velocity MEANV.

In the next step 432, the second CPU obtains a frame of energy spectrum computed by the first CPU, as was described above with reference to step 401. Then in step 433, the new spectrum is compared to the last used spectrum, as was described above with reference to step 402. Next, in step 434, execution branches depending on whether the absolute value of the difference between any energy value in the new spectrum and its corresponding energy value in the old spectrum is greater than the predetermined threshold TH1, as was described above with reference to step 403. If there is an energy value having a difference greater than TH1, then execution continues to step 435; otherwise, step 435 is bypassed. In step 435, the second CPU computes statistics of the new spectrum, in the same manner as was described above with reference to step 404.

Figure 32:
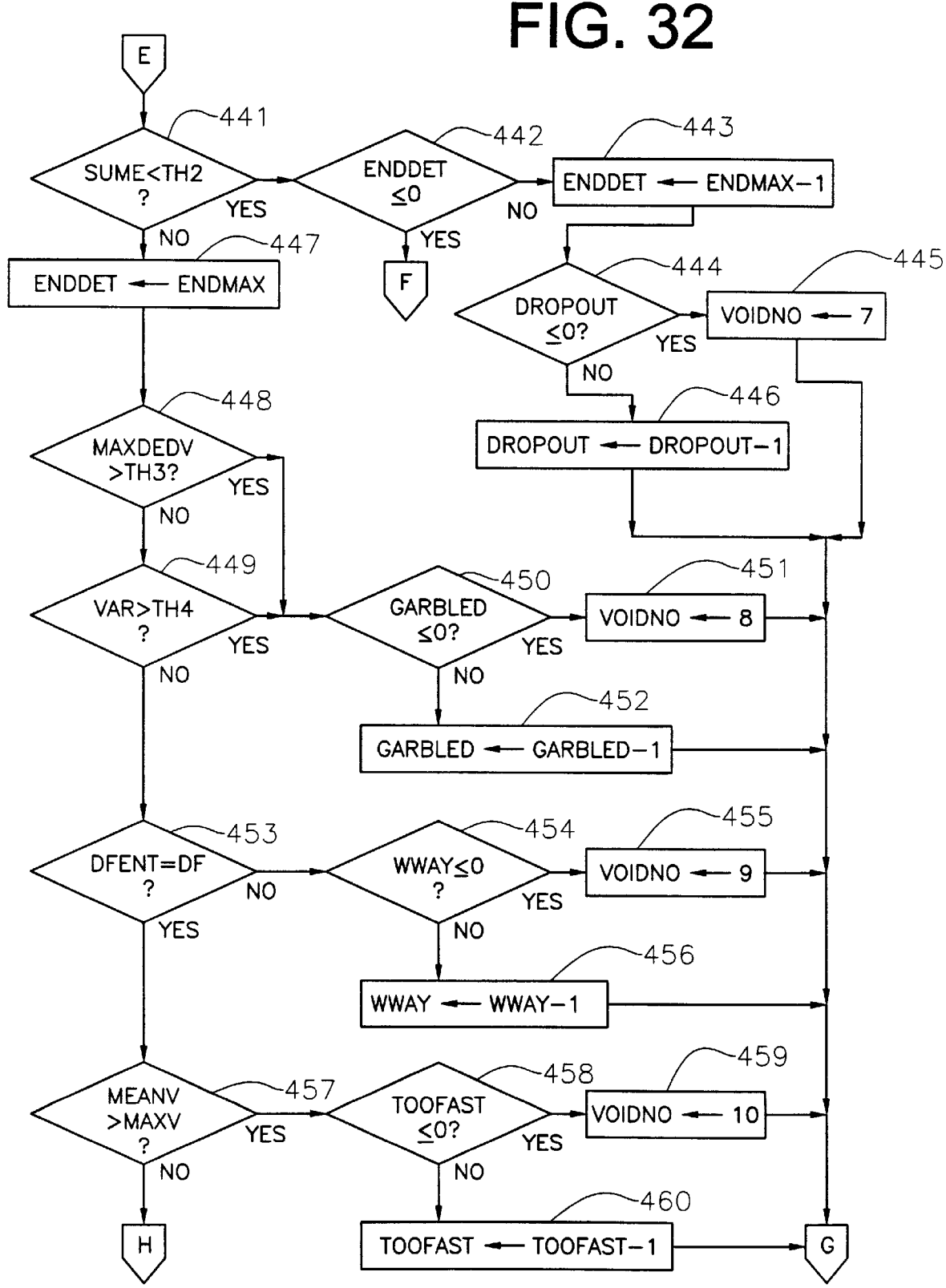

Continuing now to step 441 in FIG. 32, the second CPU checks whether the total energy in the spectrum (indicated by the variable SUME) is less than the predetermined threshold TH2. If so, then a "drop-out" has occurred, and execution branches from step 441 to step 442. In step 442, the second CPU checks whether the down-count variable ENDDET is less than or equal to zero. If so, then the vehicle has exited the radar beam, and execution branches to the QCFINAL portion of the control procedure shown in FIG. 33. Otherwise, execution branches from step 442 to step 443, where the second CPU decrements the down-count variable ENDDET. From step 443, execution continues to step 444 where the down-count variable DROPOUT is compared to zero. If the down-count variable DROPOUT is less than or equal to zero, then execution branches to step 445 where VOIDNO is set equal to 7. Otherwise, execution continues from step 444 to step 446, where the down-count variable DROPOUT is decremented by 1.

If in step 441 the total energy SUME is not less than TH2, then execution continues to step 447 where the down-count variable ENDDET is set equal to its predetermined initial value ENDMAX. Then in step 448, execution branches depending on whether the value of MAXDEDV for the new spectrum is greater than the predetermined threshold TH3. If so, then execution branches to step 450. Otherwise, execution continues to step 449, where execution also branches to step 450 if the variance VAR for the new spectrum is greater than the predetermined threshold TH4. In step 450, execution branches to step 451 if the down-count variable GARBLED is less than or equal to zero. If so, then in step 451, VOIDNO is set equal to 8. Otherwise, execution continues from step 450 to step 452, where the CPU decrements the down-count variable GARBLED by 1.

If in step 449 the variance VAR is not greater than the threshold TH4, then execution continues to step 453. In step 453, the second CPU compares the direction flag DF for the new frame to the direction flag DFENT to determine whether a reversal of vehicle direction is indicated. If DFENT is not equal to DF, then execution branches to step 454. In step 454, execution branches to step 455 if the down-count variable WWAY is less than or equal to zero. In step 455, the second CPU sets VOIDNO to 9. Otherwise, execution continues from step 454 to step 456, where the second CPU decrements the down-count variable WWAY by 1.

If in step 453, DFENT equals DF, then execution continues to step 457. In step 457, execution branches to step 458 if the mean velocity MEANV for the new spectrum is greater than the predetermined maximum value MAXV. In step 458, execution branches to step 459 if the down-count variable TOOFAST is less than or equal to zero. In step 459, the second CPU sets VOIDNO to 10. Otherwise, execution branches from step 458 to step 460 where the second CPU decrements the down-count variable TOOFAST by 1. If in step 457 the mean value MEANV is not greater than MAXV, then execution continues to step 471 in FIG. 33.

Figure 33:
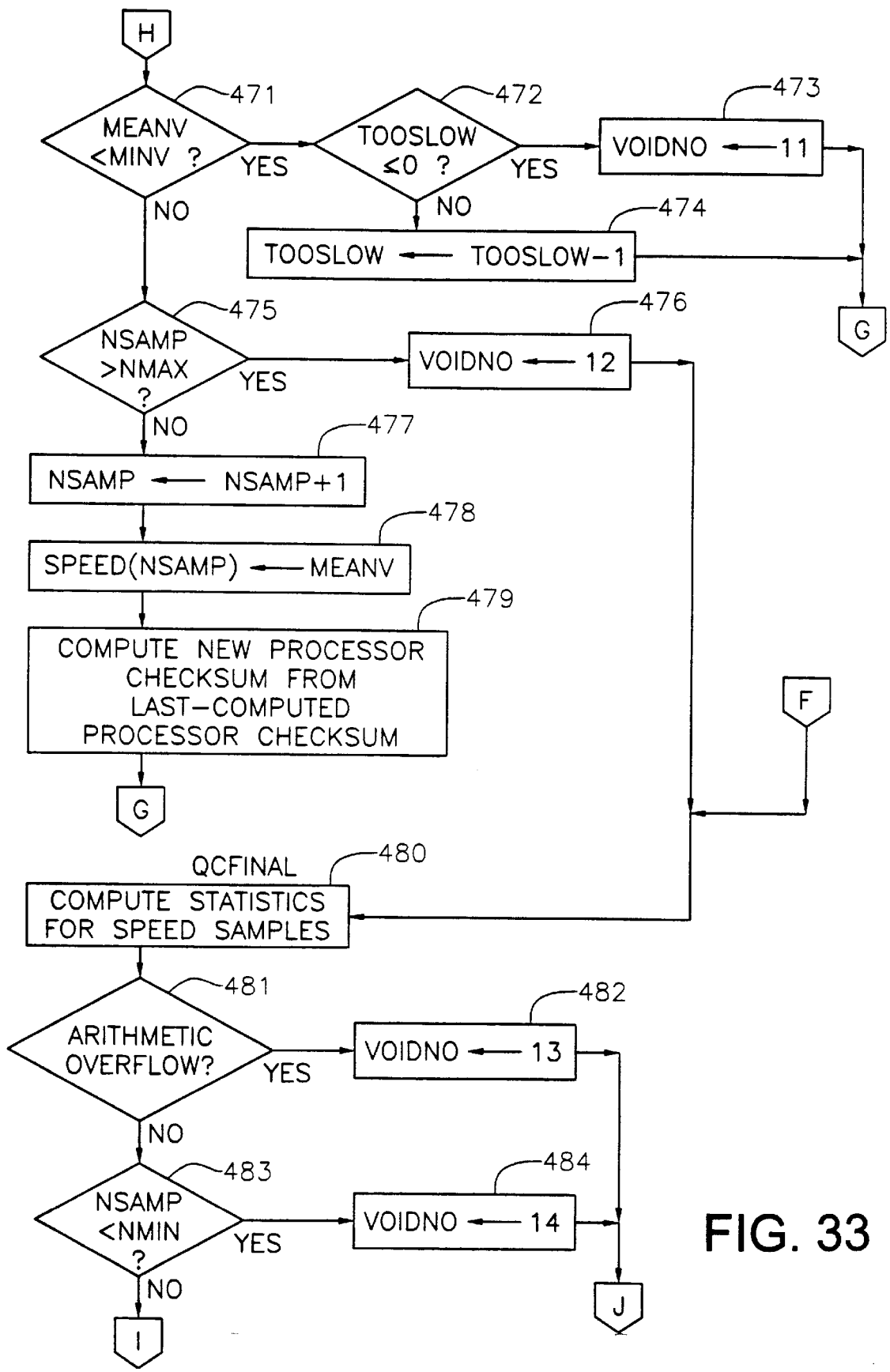

Turning to FIG. 33, in step 471, execution branches when the mean velocity MEANV is less than the predetermined minimum value MINV. If so step 472, the second CPU branches to step 473 if the down-count variable TOOSLOW is less than or equal to zero. In step 473, the second CPU sets VOIDNO to 11. Otherwise, execution continues from step 472 to step 474, where the second CPU decrements the down-count variable TOOSLOW by 1.

Otherwise, in step 471, execution continues to step 475 if the mean velocity MEANV is not less than the minimum value MINV. In step 475, execution branches to step 476 if the sample counter variable NSAMP is greater than NMAX. In step 476, the second CPU sets VOIDNO to 12, and then execution branches to step 480.

If in step 475 the sample counter variable NSAMP is not greater than NMAX, then execution continues in step 477 where the second CPU increments NSAMP by 1. Then in step 478, the second CPU loads the mean velocity MEANV into the array SPEED at the location NSAMP. Then in step 479, the second CPU computes a new processor checksum from the last-computed processor checksum, again using a series of addition, subtraction, shift, load, and store operations similar to the operations used in the computation of the mean velocity MEANV. After step 479 and also after steps 445, 446, 451, 452, 455, 456, 459, 460, 473, or 474, execution loops back to step 432.

In step 480, the second CPU computes statistics for the speed values in the array SPEED. The statistics, for example, are computed by a subroutine as listed below:

500 MAXDSDT←0
510 SUM←SPEED(1)
520 FOR J=1 TO NSAMP
530 DSDT←ABS(SPEED(J)—SPEED (J−1))
540 IF (DSDT>MAXDSDT) THEN MAXDSDT←DSDT
550 SUM←SUM+SPEED(J)
560 NEXT J
570 MEANS←SUM/NSAMP
580 DEV←SPEED(1)—MEANS
590 SUMSVAR←DEV * DEV
600 FOR J=2 TO NSAMP
610 DEV←SPEED(J)—MEANS
620 DEVSQ←DEV * DEV
630 SUMVAR←SUMVAR+DEV * DEV
640 NEXT J
650 VAR←SUMVAR/NSAMP

After step 480, execution continues in step 481. In step 481, execution branches to step 482 if there is an arithmetic overflow error from the computation of the statistics in step 480. The arithmetic overflow error is detected as described above with reference to step 407 of FIG. 29. If an arithmetic overflow error is detected, then execution branches to step 482 of FIG. 33 where the second CPU sets VOIDNO to 13. Otherwise, execution continues from step 481 to step 483. In step 483, execution branches to step 484 if the sample counter variable NSAMP is less than a predetermined minimum value NMIN. In step 484, the second CPU sets VOIDNO to 14. Otherwise, execution continues from step 483 to step 491 in FIG. 34.

Figure 34:
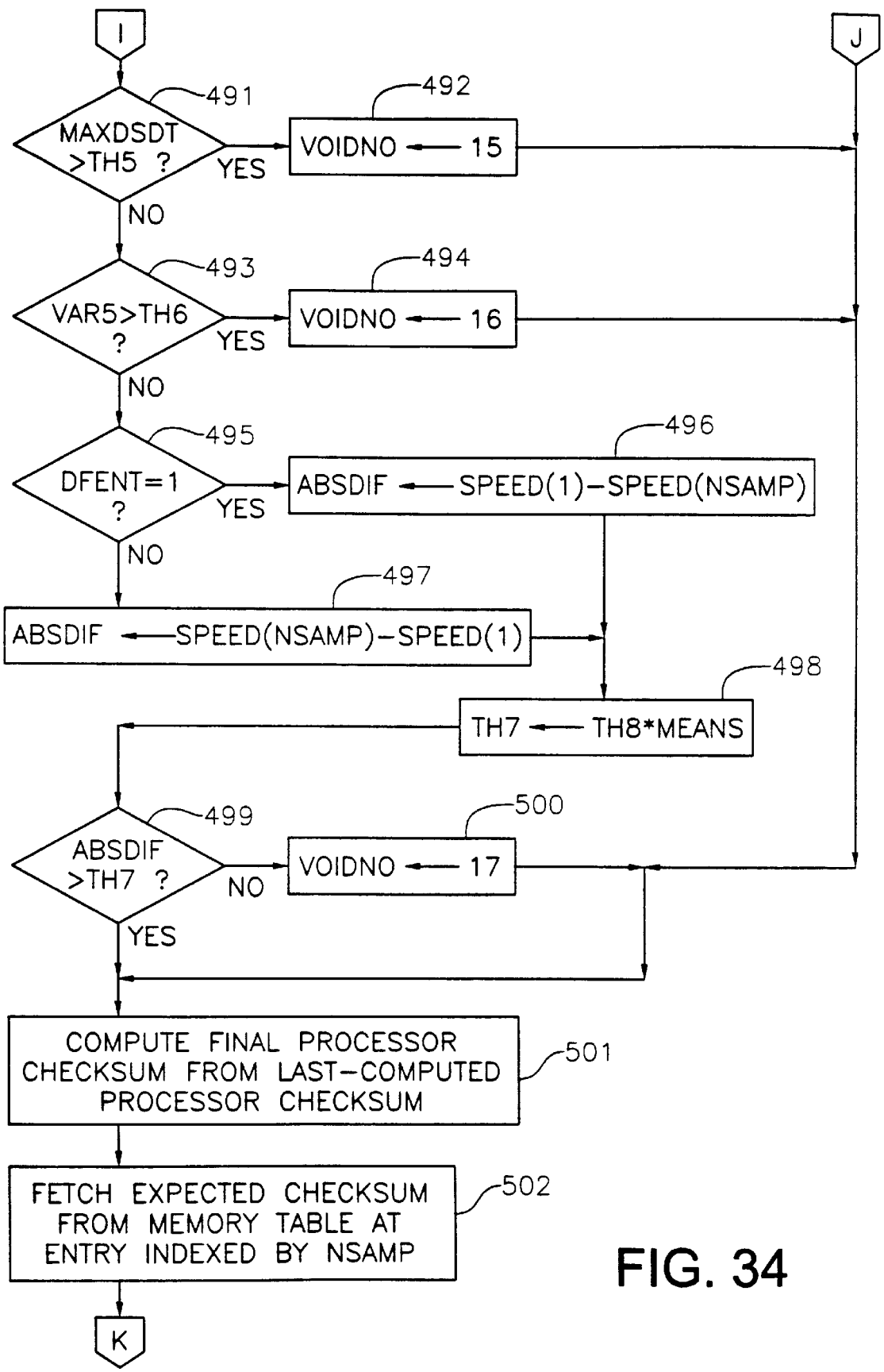

Turning now to FIG. 34, in step 491, execution branches to step 492 if MAXDSDT is greater than a predetermined threshold TH5. This occurs when there is a large discontinuity between excessive speed measurements. For example, suppose the speed samples in the array SPEED were 48, 48, 48, 48, 55, 55, 55, 55. The big difference between the fourth sample at 48 miles per hour and the fifth sample at 55 miles per hour indicates that two vehicles were in the radar beam, one having a speed of 48 miles per hour or lower, and the other having a speed of at least 55 miles per hour. A value of about 0.5 miles per hour for the threshold TH5 would cause such a sequence of speed samples to be voided.

In this case, in step 492, the second CPU sets VOIDNO to 15. Otherwise, execution continues from step 491 to step 493.

In step 493, execution branches to step 494 if the variance in the speed measurements (VARS) is greater than a predetermined threshold TH6. In step 494, the second CPU sets VOIDNO to 16. Otherwise, execution continues from step 493 to step 495. In step 495, execution branches to step 496 if the direction flag DFENT is equal to 1. In this case, the vehicle passing through the radar beam is approaching the surveillance vehicle. Due to the cosine factor affecting the relationship between the velocity of the vehicle passing through the radar beam and the frequency of the Doppler signal, the measured speed should decrease so that the first speed measurement is greater than the last speed measurement by at least a predetermined threshold TH7. Therefore, in step 496, the difference in speed ABSDIF is computed by subtracting the last speed measurement SPEED(NSAMP) from the first speed measurement SPEED(1). Otherwise, execution continues from step 495 to step 497 when the vehicle passing through the radar beam is receding from the surveillance vehicle. In step 497, the first speed sample SPEED(1) is subtracted from the last speed sample SPEED (NSAMP) to compute the difference ABSDIF. After step 496 or step 497, execution continues in step 498. In step 498, the threshold TH7 is determined from a constant threshold value TH8 prior to the time that the threshold is used in step 499. In particular, the threshold TH7 is obtained in step 498 by multiplying TH7 by the mean speed MEANS, because the change in speed due to the cosine dependence is proportional to the speed of the vehicle in the radar beam. Execution continues from step 498 to step 499, where execution branches to step 500 if the difference ABSDIF is not greater than the predetermined threshold TH7. In step 500, the second CPU sets VOIDNO to 17, and execution continues in step 501. Execution also continues to step 501 from step 499 when ABSDIF is greater than TH7. Moreover, execution continues to step 501 from steps 482 and 484 of FIG. 33, and from steps 492 and 494 of FIG. 34.

In step 501, the second CPU computes a final processor checksum from processor checksum that was last computed in step 479 of FIG. 33. The computations in step 501 also include addition, subtraction, shift, load, and store operations similar to the operations performed by the second CPU in computing the mean speed (MEANS). Then in step 502, the sample counter NSAMP is used as an index to fetch from a table an expected checksum that should be equal to the final processor checksum but for a malfunction of the second CPU or its associated memory (122, 123 in FIG. 4C). Execution then continues to step 511 of FIG. 35.

Figure 35:
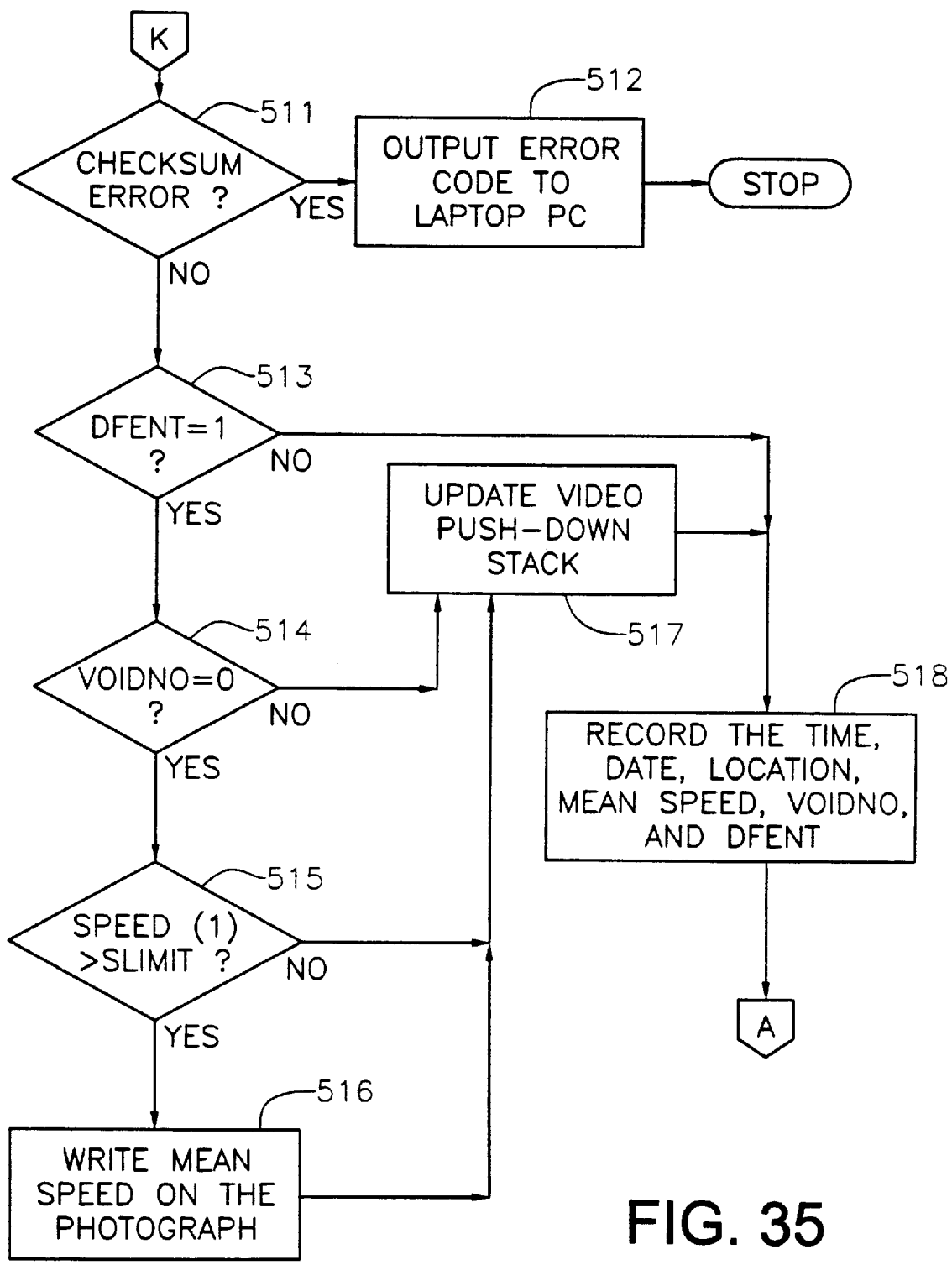

In step 511 of FIG. 35, the final processor checksum computed in step 501 of FIG. 34 is compared to the checksum fetched in step 502 of FIG. 35, and if the checksums do not match, then there is a checksum error and execution branches to step 512. In step 512, an error code identifying the processor checksum error is transmitted to the laptop computer (67 in FIG. 2), and then the second CPU is shut down by executing a stop or halt instruction. This is an example of one of a number of abnormal conditions that cause the system to shut down and that should not occur but for a system failure that might affect a speed measurement or otherwise should require repair of the system. For example, the system is shut down if the second CPU reads an illegal hand-shaking code from the intra-processor RAM 107, or if a number of parity, frame, or overrun errors occur in the serial communication between the second CPU and the laptop computer.

When the checksums match in step 511, execution continues to step 513. In step 513, execution branches to step 518 if DFENT is not equal to one, because the traffic monitoring system has been configured to photograph only the approaching vehicles. Otherwise, execution continues from step 513 to step 514. In step 514, execution branches to step 517 if VOIDNO is not equal to zero. Otherwise, execution continues to step 515, which checks whether the first speed sample is greater than the specified speed limit (SLIMIT). If not, execution branches to step 517. If so, then step 422 of FIG. 30 was reached previously, and therefore execution continues to step 516 of FIG. 35, where the mean speed is written on the photograph. If a photograph was already taken of the front of the vehicle in step 422, then in step 516, the mean speed is written on the photograph, and if a photograph has not yet been taken of the front of the vehicle, then a photograph is scheduled to be taken of the front of the vehicle, and the mean speed is written on the photograph after the photograph has been taken. After step 516, execution continues to step 517. In step 517, the video push-down stack is updated by pushing the time and mean speed on the stack if VOIDNO is zero, and if VOIDNO is not zero, pushing the time and "" on the stack to indicate that the approaching traffic included a vehicle at that time, but the speed of that vehicle was not verified. After step 517, and after step 513 if DFENT is not equal to one, execution continues to step 518. In step 518, the second CPU records the time, date, location, mean speed, void number (VOIDNO), and the vehicle direction (DFENT), in order to have a record of all of the cases in which a vehicle was detected passing through the radar beam. From step 518, execution returns to step 401 in FIG. 29** in order to monitor the passing of another vehicle through the radar beam.

In view of the above, there has been described a traffic monitoring system that is easy to use and that provides a more complete and presentable record of speed violations. Programming for the digital computer is downloaded from a diskette or memory card inserted into the laptop computer. The digital computer initially operates the calibration oscillator to check the interface between the radar transceiver and the digital computer. After the "self-test", the digital computer monitors vehicles passing through the radar beam, and operates the audio annunciator to emit a click each time that a vehicle passes through the radar beam, and to emit a warble sound for each vehicle found to be exceeding the specified speed limit. A vehicle is not tagged as speeder unless the measure speed passes a number of verification criterion. The operator's discretion is eliminated as a factor in identifying speed violators. The prevailing traffic conditions, including a push-down stack of vehicle speeds, are recorded on video tape. The dual channels of the Doppler signal are recorded on the stereo audio track of the video tape, in case of any dispute as to the possibility of radar interference.

What is claimed is:

1. A traffic monitoring system for monitoring speeds of moving vehicles, the traffic monitoring system comprising:
    a housing;
    a Doppler radar transceiver, within the housing, for producing Doppler signals responsive to one or more moving vehicles in a radar beam;
    a digital computer connected to the Doppler radar transceiver, the digital computer including (a) a converter for transforming the Doppler signals from one or more moving vehicles in the radar beam into multiple-bit digital form signals, and (b) a processor that determines: (i) whether the Doppler signals were produced in response to more than one vehicle in the radar beam; (ii) the speed of a single vehicle corresponding to the Doppler signals and (iii) whether the single vehicle has violated a speed limit.

2. The traffic monitoring system as claimed in claim 1, wherein the connection between the Doppler radar transceiver and the digital computer is an electronic interface circuit having a bandpass filter for passing frequencies within a passband corresponding to a range of vehicle speeds, and wherein the traffic monitoring system includes a calibration oscillator connected to the electronic interface circuit for injecting a calibration signal into the electronic interface circuit in lieu of the Doppler signal; the calibration oscillator being connected to the digital computer so that the calibration signal has a frequency selectable by the digital computer and the digital computer is operable to (i) select a first frequency below the passband and verify that the first frequency does not cause the digital computer to detect a vehicle having a speed within the range of vehicle speeds, (ii) select a second frequency within the passband and verify that the second frequency causes the digital computer to detect a vehicle having a proper speed within the range of vehicle speeds, and (iii) select a third frequency above the passband and verify that the third frequency does not cause the digital computer to detect a vehicle having a speed above the range of vehicle speeds.

3. The traffic monitoring system as claimed in claim 1, wherein the Doppler signals have two channels, one channel having a relative phase with respect to the other channel indicating whether a vehicle is approaching the Doppler radar transceiver, and wherein the traffic monitoring system further comprises a video camera mounted to produce a video picture of vehicles monitored by the Doppler radar transceiver and a video tape recorder, the video tape recorder has a video input connected to the video camera for recording the video picture on video tape, and the video tape recorder has a pair of audio inputs connected to the Doppler radar transceiver for receiving the one channel of the Doppler signal on one of the audio inputs and receiving the other channel of the Doppler signal on the other of the audio inputs, and recording the first and second channels of the Doppler signal on the video tape together with the video picture.

4. The traffic monitoring system as claimed in claim 1, further comprising a video camera mounted to produce a video picture of vehicles monitored by the Doppler radar transceiver and a video overlay combiner connected to the video camera and the digital computer for overlaying alphanumeric data from the digital computer onto the video picture, the alphanumeric data including a push-down stack of the speeds of the vehicles monitored by the Doppler radar transceiver.

5. The traffic monitoring system as claimed in claim 1, further comprising a photographic camera connected to the digital computer for taking a photograph of a vehicle detected by the Doppler radar transceiver.

6. The traffic monitoring system as claimed in claim 1, wherein the digital computer converts the digital form signals into frequency domain signals to determine the speed of a vehicle.

7. The traffic monitoring system as claimed in claim 1, additionally comprising a laptop computer and an interface that links the laptop computer to the digital computer for downloading from the laptop computer a program for processing the Doppler signals.

8. The traffic monitoring system as claimed in claim 7, wherein the program is recorded on a memory device inserted into the laptop computer, and the laptop computer is programmed to download the program on the memory device to the digital computer when the laptop computer is turned on at a time when the memory device is in the laptop computer.

9. The traffic monitoring system as claimed in claim 1, further comprising an audio annunciator connected to the digital computer for emitting a first sound when the digital computer determines that one of the vehicles is being monitored by the Doppler radar transceiver, and for emitting a distinct second sound when the digital computer determines that the speed of one of the vehicles exceeds specified speed.

10. The traffic monitoring system as claimed in claim 9, wherein the first sound is a click, and the second sound is a warble.

11. The traffic monitoring system as claimed in claim 1, wherein the converter for transforming the Doppler signals into digital form signals comprises an A/D converter.

12. The traffic monitoring system as claimed in claim 11, wherein the system additionally comprises at least one Schmitt trigger for squaring at least one of the Doppler signals.

13. The traffic monitoring system as claimed in claim 11, wherein the system additionally comprises a video camera mounted to produce a video picture of vehicles monitored by the Doppler radar transceiver and a video overlay combiner for adding data to the video picture.

14. The traffic monitoring system as claimed in claim 13, further comprising a photographic camera connected to the digital computer for taking a photograph of a vehicle detected by the Doppler radar transceiver, and wherein the data overlaid on the video picture defines a viewfinder on the video picture delimiting a field of view of the photographic camera.

15. The method as claimed in claim 14, further comprising the step of the digital computer determining from the Doppler signal a series of successive speed readings for the one of the vehicles, and the step of overlaying on the video picture the series of successive speed readings for the one of the vehicles before the video picture is recorded, and wherein the video picture recorded on the video tape includes the overlaid series of successive speed readings, so that the series of successive speed readings are displayed when playing back the video tape.

16. The method as claimed in claim 14, wherein the Doppler signal has two channels and the relative phase of one of the channels with respect to the other of the channels indicates whether a vehicle is approaching the Doppler radar transceiver, and wherein the method further comprises recording the Doppler signal on a stereo audio track of the video tape, and playing back the video tape to demonstrate that the recorded Doppler signal indicates an absence of radar interference.

17. A traffic monitoring system for monitoring speeds of moving vehicles, the traffic monitoring system comprising:

a Doppler radar transceiver;

a digital computer connected to the Doppler radar transceiver for processing Doppler signals from the Doppler radar transceiver to determine speeds of the vehicles monitored by the Doppler radar transceiver; and an audio annunciator connected to the digital computer for emitting a first sound when the digital computer determines that one of the vehicles is being monitored by the Doppler radar transceiver, and for emitting a distinct second sound when the digital computer determines that the speed of one of the vehicles exceeds a specified speed, wherein:

the digital computer includes: (a) a converter for transforming the Doppler signals from one or more moving vehicles in a radar beam into multiple-bit digital form signals, and (b) a processor that determines: (i) whether the Doppler signals were produced in response to more than one vehicle in the radar beam; (ii) the speed of a single vehicle corresponding to the Doppler signals and (iii) whether the single vehicle has violated a speed limit.

18. The traffic monitoring system as claimed in claim 17, wherein the first sound is a click, and the second sound is a warble.

19. A method of monitoring speeds of motor vehicles, the method comprising the steps of:

generating, with a Doppler radar transceiver, Doppler signals having frequencies proportional to the speeds of the vehicles moving within a radar beam;

processing the Doppler signals in a digital computer by converting the Doppler signals from the vehicle into multiple-bit digital form signals to determine the speeds of the vehicles, and to identify vehicles that exceed a specified speed limit when the Doppler signals are produced in response to a single vehicle, but to not identify vehicles that exceed a specified speed limit when the Doppler signals are produced in response to more than a single vehicle;

operating a video camera aligned with the Doppler radar transceiver to generate a video picture of the vehicles monitored by the Doppler radar transceiver;

overlaying on the video picture alphanumeric data produced by the digital computer, the alphanumeric data defining a stack of the speeds of the vehicles monitored by the Doppler radar transceiver;

recording on video tape the video picture including the overlaid alphanumeric data; and playing back the video tape to display the stack and demonstrate traffic conditions existing when one of the vehicles was found to exceed the specified speed limit.

* * * * *